United States Patent
Taguchi et al.

(10) Patent No.: US 7,059,715 B2
(45) Date of Patent: Jun. 13, 2006

(54) SHEET FOR INK JET RECORDING, INK FOR INK JET RECORDING, MANUFACTURING METHOD OF INK FOR INK JET RECORDING, INK SET FOR INK JET RECORDING, AND INK JET RECORDING METHOD

(75) Inventors: Toshiki Taguchi, Shizuoka (JP); Toshiaki Aono, Shizuoka (JP); Masanobu Takashima, Shizuoka (JP); Manabu Ogawa, Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 118 days.

(21) Appl. No.: 10/660,653

(22) Filed: Sep. 12, 2003

(65) Prior Publication Data
US 2004/0080595 A1    Apr. 29, 2004

(30) Foreign Application Priority Data
Sep. 13, 2002 (JP) .................. P. 2002-269170
Sep. 13, 2002 (JP) .................. P. 2002-269171

(51) Int. Cl.
*B41J 2/01* (2006.01)
(52) U.S. Cl. .............. 347/105; 347/101; 428/32.1
(58) Field of Classification Search ............. 347/105, 347/101; 428/195, 32.1
See application file for complete search history.

(56) References Cited

U.S. PATENT DOCUMENTS

| | | | |
|---|---|---|---|
| 5,389,133 A | | 2/1995 | Gundlach et al. |
| 5,500,668 A | * | 3/1996 | Malhotra et al. ........... 347/105 |
| 5,540,765 A | | 7/1996 | Gundlach et al. |

FOREIGN PATENT DOCUMENTS

| | | |
|---|---|---|
| EP | 0 280 650 A1 | 8/1988 |
| EP | 0 924 272 A1 | 6/1999 |
| EP | 1 080 936 A2 | 3/2001 |
| EP | 1080936 A2 * | 3/2001 |
| JP | 2001-246838 A | 9/2001 |
| WO | WO 01/38102 A1 | 5/2001 |

OTHER PUBLICATIONS

European Search Report dated Mar. 5, 2004.
European Search Report dated Dec. 3, 2003.
U.S. Appl. No.: 10/600,831, filed Jun. 23, 2003.
U.S. Appl. No.: 10/611,990, filed Jul. 3, 2003.

* cited by examiner

*Primary Examiner*—Manish S. Shah
(74) *Attorney, Agent, or Firm*—Sughrue Mion, PLLC

(57) ABSTRACT

The present invention provides a sheet for ink jet recording, ink for ink jet recording, manufacturing method of ink for ink jet recording, ink set for ink jet recording, and ink jet recording method, which hardly blot even under high humidity conditions, and includes a betaine compound having a specific structure and a compound capable of taking a betaine structure.

10 Claims, No Drawings

SHEET FOR INK JET RECORDING, INK FOR INK JET RECORDING, MANUFACTURING METHOD OF INK FOR INK JET RECORDING, INK SET FOR INK JET RECORDING, AND INK JET RECORDING METHOD

FIELD OF THE INVENTION

The present invention relates to a sheet for ink ket recording, an ink and ink set for ink jet recording excellent in the durability of an image under high humidity conditions, and to an ink jet recording method.

BACKGROUND OF THE INVENTION

With the rapid expansion of information technology industry in recent years, various information processing systems have been developed, and recording methods and recording apparatus suitable for these information processing systems have also been developed and put to practical use.

Of these recording methods, an ink jet recording method has been widely used not only in offices but also in homes from the advantages that recording is possible on various kinds of materials, hardware (apparatus) is relatively inexpensive, compact, and excellent in quietness.

With the achievement of high resolution of the ink jet printer in recent years, it becomes possible to obtain printed matters of so-called photograph-like high image quality, and with the advancement of hardware (apparatus), various kinds of recording sheets for ink jet recording have been developed.

The characteristics required of the recording sheet for ink jet recording generally include that (1) a drying speed is quick (the ink absorption speed is high), (2) the diameter of an ink dot is appropriate and uniform (free of blotting), (3) graininess is good, (4) the roundness of a dot is high, (5) color density is high, (6) saturation is high (free of lackluster), (7) the waterproofness, light fastness and ozone resistance of a print part are good, (8) the brightness of a recording sheet is high, (9) the storage stability of a recording sheet is good (yellowing discoloration is not brought about even in long term preservation, an image is not blurred under long term preservation (blurring due to aging hardly occurs)), (10) a sheet is difficult to be deformed and dimensional stability is good (curling and dimensional change are sufficiently small), and (11) the traveling performances of hardware are good (e.g., smooth feeding of sheets).

Further, in the use of photo-glossy paper used for obtaining a printed matter of so-called photograph-like high image quality, the recording sheet is also required to have glossiness, a surface smoothness, and a photographic paper-like touch analogous to that of a silver salt photograph in addition to the above various characteristics.

Sheets for ink jet recording using a coloring material-receiving layer having a porous structure are developed and put to practical use in recent years with the intention of the improvement of the above various characteristics. Such ink jet recording sheets are excellent in ink receptivity (a quick drying property) and have high glossiness due to the porous structure.

For example, JP-A-10-119423 (the term "JP-A" as used herein means an "unexamined published Japanese patent application") and JP-A-10-217601 suggest a sheet for ink jet recording comprising a support having provided thereon a coloring material-receiving layer containing fine inorganic pigment particles and a water-soluble resin and having a high porosity.

These sheets for recording, in particular, ink jet recording sheets provided with a coloring material-receiving layer comprising a porous structure in which silica is used as the inorganic pigment fine particles are excellent in ink absorption due to their structure, have ink receptivity capable of forming an image of high resolution, and have high glossiness.

However, a coloring material-receiving layer having a porous structure has two problems. In relation to the fact that a trace amount of gas in the air, in particular ozone, causes the discoloration of a printed image with the lapse of time, one problem is that a printed image is susceptible to discoloration by ozone gas in the air, since a coloring material-receiving layer having a porous structure has many pores. Accordingly, recording materials having a coloring material-receiving layer of porous structure are required to have resistance against ozone in the air (ozone resistance). Another problem is that blotting of ink is great by printing, since a coloring material-receiving layer having a porous structure has many pores. It is strongly demanded to solve the former problem mainly by the improvement of inks from the viewpoint of the development of fast coloring materials, and to solve the latter problem by the improvement of recording sheets.

In addition to the above, since many kinds of inks contain water-soluble dyes from various necessary conditions, such as operation characteristics, the defect that a printed image is liable to blot under high humidity conditions is also promoted from this aspect.

As ink jet recording methods, a method of pressurizing ink by a piezoid and discharging ink droplets, a method of generating bubbles in ink by heat and discharging ink droplets, a method of using ultrasonic waves, and a method of sucking and discharging ink droplets by electrostatic force are known. As the ink compositions for these ink jet recording methods, water-based inks, oil-based inks and solid inks (a melting type) are used. Of these inks, water-based inks are mainly used from the points of handling properties, odor and safety.

Colorants for use in the inks for these ink jet recording methods are required to be high in solubility in a solvent, capable of high density recording, good in hue, fast to light, heat, air, water and chemicals, good in fixing ability to image-receiving materials and not liable to blot, excellent in storage stability as inks, nonpoisonous, high in purity, and available inexpensively. However, it is extremely difficult to find out colorants which satisfy these requirements on high levels. Various kinds of dyes and pigments have been suggested and brought into practical use for ink jet recording, however, a colorant which satisfies all of these requirements is not found yet under the present conditions. In conventionally well-known dyes and pigments attached with color index Nos. (C.I. Nos.), those which sufficiently satisfy necessary characteristics required of the ink for ink jet recording including hue and fastness have not been found yet. The development of dyes and pigments having good hue and fastness as the colorants for ink jet recording has been advanced aggressively, but, additionally, the solution stability and dispersion stability of ink are also important characteristics concerning the stable operation of apparatus and the storage stability of ink.

With respect to this point, although water-soluble dyes are substituted with water-soluble groups and these water-soluble groups are excellent in the point of their contribution to the stability of water-soluble dyes in water-based ink, water-soluble groups also have a weak point that they are liable to cause blotting of recorded images, and images formed are liable to blot under high humidity conditions when the number of water-soluble groups of dyes and pigments is increased for improving the stability of ink. Therefore, there is a problem of incompatibility of the stability in ink with blotting resistance.

SUMMARY OF THE INVENTION

The present invention has been done based on the above background, and an object of the present invention is to provide a sheet for ink jet recording which hardly blots even under high humidity conditions, especially to provide a sheet for ink jet recording which hardly blots even when an image-receiving layer has a porous structure.

The another objects of the present invention are to provide an ink for ink jet recording which hardly causes blotting of an image even under high humidity conditions while maintaining the advantages as water-based ink (handling properties, stability, producing properties, hue), a manufacturing method of the ink for ink jet recording, an ink set and an ink jet recording method.

As a result of eager investigation to solve the above problems, the present inventors have found that a betaine compound having a specific structure and a compound capable of taking a betaine structure can effectively prevent blotting of an image, and the above problems have been solved on the basis of the discovery. That is, the present invention was achieved by the ink jet recording sheets, the ink and ink set for ink jet recording, and the ink jet recording method described in the followings.

1. A sheet for ink jet recording, comprising:
a support; and
a coloring material-receiving layer containing a mordant and a compound represented by the following formula (1):

wherein R represents an alkyl group, an aryl group or a heterocyclic group; when a plural number of Rs are present, the plurality of Rs may be the same or different; at least two of a plurality of R's may be linked with each other to form a cyclic structure; L represents a divalent or higher linking group; M represents a hydrogen atom, an alkali metal cation, an ammonium ion, an organic amine cation, or a negative ion sign; q and r each represents an integer of 1 or more; k and m each represents 0 or an integer of 1 or more; n represents an integer of 1 or more; p represents 0 or an integer of 1 or more; (p+r) is 3 or 4, and when (p+r) is 4, the N atom represents a quaternary ammonium cation and one of the M's represents a negative ion sign.

2. The sheet for ink jet recording as described in the item 1, wherein at least one of R and L in the formula (1) contains a hydrocarbon group having 8 or more carbon atoms.

3. The sheet for ink jet recording as described in the item 1 or 2, wherein the coloring material-receiving layer further contains a water-soluble resin.

4. The sheet for ink jet recording as described in the item 3, wherein the water-soluble resin is at least one resin selected from the group consisting of polyvinyl alcohol resins, cellulose resins, resins having an ether bond, resins having a carbamoyl group, resins having a carboxyl group, and gelatins.

5. The sheet for ink jet recording as described in any one of the items 1 to 4, wherein the coloring material-receiving layer further contains a fine particle.

6. The sheet for ink jet recording as described in the item 5, wherein the fine particle is at least one fine particle selected from the group consisting of silica, colloidal silica, alumina and pseudo-boehmite.

7. The sheet for ink jet recording as described in the item 3, wherein the coloring material-receiving layer further contains a crosslinking agent capable of crosslinking the water-soluble resin.

8. The sheet for ink jet recording as described in any one of the items 1 to 7, wherein the coloring material-receiving layer is a layer obtained by crosslinking a coated layer of a coating solution containing a fine particle, a water-soluble resin and a crosslinking agent, and the crosslinking is performed by applying a basic solution having a pH value of 8 or more to the coated layer, in which the application of the basic solution is performed (1) simultaneously with the coating of the above coating solution, or (2) in the middle of a drying of the coated layer of the coating solution and before the coated layer shows falling-rate-drying.

9. The sheet for ink jet recording as described in any one of the items 1 to 8, wherein the compound represented by the formula (1) is a compound represented by the following formula (2):

wherein R, L and M each has the same meaning as described in claim 1.

10. The sheet for ink jet recording as described in the item 7, wherein the crosslinking agent is a boron compound.

11. An ink for ink jet recording, which comprises a dye, water, a water-miscible organic solvent and a compound represented by the following formula (1):

$(R_k)_p$—N-$[L_m$-$(COOM_n)_q]_r$   (1)

wherein R represents an alkyl group, an aryl group or a heterocyclic group; when a plural number of Rs are present, the plurality of Rs may be the same or different; at least two of a plurality of R's may be linked with each other to form a cyclic structure; L represents a divalent or higher linking group; M represents a hydrogen atom, an alkali metal cation, an ammonium ion, an organic amine cation, or a negative ion sign; q and r each represents an integer of 1 or more; k and m each represents 0 or an integer of 1 or more; n represents an integer of 1 or more; p represents 0 or an integer of 1 or more; (p+r) is 3 or 4, and when (p+r) is 4, the N atom represents a quaternary ammonium cation and one of the M's represents a negative ion sign.

12. The ink for ink jet recording as described in the item 11, wherein at least one of R and L in formula (1) contains a hydrocarbon group having 8 or more carbon atoms.

13. The ink for ink jet recording as described in the item 11, wherein the compound represented by the formula (1) is a compound represented by the following formula (2):

wherein R, L and M each has the same meaning as described in claim 11.

14. The ink for ink jet recording as described in any one of the items 11 to 13, wherein the dye includes a compound represented by the following formula (1):

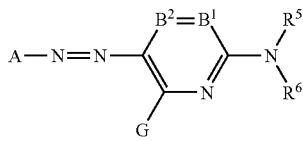

wherein A represents a 5-membered heterocyclic group;

$B^1$ and $B^2$ each represents a nitrogen atom, $=CR^1—$ or $—CR^2=$, and when either one of $B^1$ and $B^2$ represents a nitrogen atom, the other represents $=CR^1—$ or $—CR^2=$; $R^5$ and $R^6$ each represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and the hydrogen atom of each substituent may be substituted;

G, $R^1$ and $R^2$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, and the hydrogen atom of each substituent may be substituted;

$R^1$ and $R^5$, or $R^5$ and $R^6$ may combine to form a 5- or 6-membered ring.

15. The ink for inkjet recording as described in any one of the items 11 to 14, wherein the dye includes a compound represented by the following formula (I):

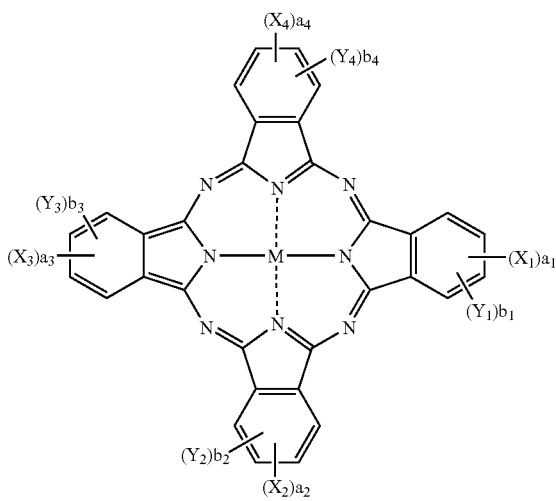

wherein $X_1$, $X_2$, $X_3$ and $X_4$ each represents $—SO—Z$, $—SO_2—Z$, $—SO_2NR_1R_2$, a sulfo group, $—CONR_1R_2$ or $—CO_2R_1$; Z represents an alkyl group, a cycloalkyl group, an alkenyl group, an aralkyl group, an aryl group or a heterocyclic group, which are substituted or unsubstituted; $R_1$ and $R_2$ each represents a hydrogen atom, an alkyl group, a cycloalkyl group, an alkenyl group, an aralkyl group, an aryl group or a heterocyclic group, which are substituted or unsubstituted; when a plural number of Zs are present, the plurality of Zs may be the same or different; $Y_1$, $Y_2$, $Y_3$ and $Y_4$ each represents a monovalent substituent; when a plural number of $X_1$s, $X_2$s, $X_3$s, $X_4$s, $Y_1$s, $Y_2$s, $Y_3$s or $Y_4$s are present, the plurality of $X_1$s, $X_2$s, $X_3$s, $X_4$s, $Y_1$s, $Y_2$s, $Y_3$s or $Y_4$s may be the same or different; M represents a hydrogen atom, a metal atom, or an oxide, hydroxide or halide thereof; $a_1$ to $a_4$ and $b_1$ to $b_4$ each represents the number of substituent $X_1$, $X_2$, $X_3$, $X_4$, $Y_1$, $Y_2$, $Y_3$ or $Y_4$, and $a_1$ to $a_4$ each represents an integer of 0 to 4 but all of $a_1$ to $a_4$ are not 0 at the same time; $b_1$ to $b_4$ each represents an integer of 0 to 4.

16. A concentrated ink composition comprising a dye, water, and a compound represented by the following formula (1):

wherein R represents an alkyl group, an aryl group or a heterocyclic group; when a plural number of Rs are present, the plurality of Rs may be the same or different; at least two of a plurality of R's may be linked with each other to form a cyclic structure; L represents a divalent or higher linking group; M represents a hydrogen atom, an alkali metal cation, an ammonium ion, an organic amine cation, or a negative ion sign; q and r each represents an integer of 1 or more; k and m each represents 0 or an integer of 1 or more; n represents an integer of 1 or more; p represents 0 or an integer of 1 or more; (p+r) is 3 or 4, and when (p+r) is 4, the N atom represents a quaternary ammonium cation and one of the M's represents a negative ion sign.

17. The concentrated ink composition as described in the item 16, which comprises the compound represented by the formula (1) in an amount of from 0.001 to 30 wt %.

18. The concentrated ink composition as described in the item 16 or 17, which comprises the dye in an amount of from 0.01 to 50 wt %.

19. A method for manufacturing an ink for ink jet recording, which comprises manufacturing the ink by using the concentrated ink composition as described in any one of the items 16 to 18.

20. An ink set for ink jet recording, which comprises the ink for ink jet recording as described in any one of the items 11 to 15.

21. An ink jet recording method which comprises recording an image by using the sheet for ink jet recording as described in any one of the items 1 to 10.

22. An ink jet recording method which comprises recording an image by using the ink for ink jet recording as described in any one of the items 11 to 15 with an ink jet printer.

23. An ink jet recording method which comprises recording an image by using the ink set as described in the item 20 with an ink jet printer.

DETAILED DESCRIPTION OF THE INVENTION

The present invention is described in detail below.

The ink jet recording sheet in the present invention contains a compound represented by formula (1) in a coloring material-receiving layer.

In the first place, a compound represented by formula (1) is described. A compound represented by formula (1) is a betaine compound containing a carboxyl group and a nitrogen atom and having surface activity, and a compound capable of taking a betaine structure.

Ink for use in the ink set in the present invention comprises a dye dissolved in water or an organic solvent. The ink is preferably a water-soluble ink comprising a water-soluble dye.

The ink for ink jet recording in the present invention is characterized in that it contains a betaine type compound represented by formula (1). That is, although the ink is water-based ink, blotting of ink of a printed matter is effectively prevented by containing a compound represented by formula (1). Further, since even a dye or a pigment having a great number of water-soluble groups which generally cause blotting of ink can be used in the ink without causing blotting, the stability of ink can be improved and the hue of a printed image can be maintained or improved.

Concentrated ink is ink in which the concentration of a dye or a pigment is made higher than the concentration of the dye or the pigment in the ink in a working state for convenience of transportation and handling, or for profitability, and working ink can be prepared by diluting with water or liquid for dilution obtained by excluding the dye, the pigment and one or more other components from the ink composition.

In formula (1), R represents an alkyl group (preferably an alkyl group having from 1 to 20 carbon atoms which may be substituted, e.g., methyl, ethyl, propyl, butyl, hexyl, octyl, dodecyl, cetyl, stearyl and oleyl), an aryl group (preferably an aryl group having from 6 to 20 carbon atoms which may be substituted, e.g., phenyl, tolyl, xylyl, naphthyl, cumyl and dodecylphenyl), or a heterocyclic group (preferably a heterocyclic group having from 2 to 20 carbon atoms which may be substituted, e.g., pyridyl and quinolyl), and they may be linked with each other to form a cyclic structure. An alkyl group is particularly preferred.

L represents a divalent or higher linking group. As the examples of such linking groups, divalent or higher linking groups containing an alkylene group or an arylene group as a fundamental constitutional unit are preferred. Heteroatoms, e.g., an oxygen atom, a sulfur atom and a nitrogen atom, may be contained at the linking principal chain part.

R and L may be substituted with various substituents. The examples of these substituents include, e.g., an alkyl group (an alkyl group preferably having from 1 to 20, more preferably from 1 to 12, and particularly preferably from 1 to 8, carbon atoms, e.g., methyl, ethyl, isopropyl, tert-butyl, n-octyl, n-decyl, n-hexadecyl, cyclopropyl, cyclopentyl and cyclohexyl), an alkenyl group (an alkenyl group preferably having from 2 to 20, more preferably from 2 to 12, and particularly preferably from 2 to 8, carbon atoms, e.g., vinyl, allyl, 2-butenyl and 3-pentenyl), an alkynyl group (an alkynyl group preferably having from 2 to 20, more preferably from 2 to 12, and particularly preferably from 2 to 8, carbon atoms, e.g., propargyl and 3-pentynyl), an aryl group (an aryl group preferably having from 6 to 30, more preferably from 6 to 20, and particularly preferably from 6 to 12, carbon atoms, e.g., phenyl, p-methylphenyl and naphthyl), an amino group (an amino group preferably having from 0 to 20, more preferably from 0 to 12, and particularly preferably from 0 to 6, carbon atoms, e.g., amino, methylamino, dimethylamino, diethylamino, diphenylamino and dibenzylamino), an alkoxyl group (an alkoxyl group preferably having from 1 to 20, more preferably from 1 to 12, and particularly preferably from 1 to 8, carbon atoms, e.g., methoxy, ethoxy and butoxy), an aryloxy group (an aryloxy group preferably having from 6 to 20, more preferably from 6 to 16, and particularly preferably from 6 to 12, carbon atoms, e.g., phenyloxy and 2-naphthyloxy), an acyl group (an acyl group preferably having from 1 to 20, more preferably from 1 to 16, and particularly preferably from 1 to 12, carbon atoms, e.g., acetyl, benzoyl, formyl and pivaloyl), an alkoxycarbonyl group (an alkoxycarbonyl group preferably having from 2 to 20, more preferably from 2 to 16, and particularly preferably from 2 to 12, carbon atoms, e.g., methoxycarbonyl and ethoxycarbonyl), an aryloxycarbonyl group (an aryloxycarbonyl group preferably having from 7 to 20, more preferably from 7 to 16, and particularly preferably from 7 to 10, carbon atoms, e.g., phenyloxycarbonyl), an acyloxy group (an acyloxy group preferably having from 2 to 20, more preferably from 2 to 16, and particularly preferably from 2 to 10, carbon atoms, e.g., acetoxy and benzoyloxy), an acylamino group (an acylamino group preferably having from 2 to 20, more preferably from 2 to 16, and particularly preferably from 2 to 10, carbon atoms, e.g., acetylamino and benzoylamino), an alkoxycarbonylamino group (an alkoxycarbonylamino group preferably having from 2 to 20, more preferably from 2 to 16, and particularly preferably from 2 to 12, carbon atoms, e.g., methoxycarbonylamino), an aryloxycarbonylamino group (an aryloxycarbonylamino group preferably having from 7 to 20, more preferably from 7 to 16, and particularly preferably from 7 to 12, carbon atoms, e.g., phenyloxycarbonylamino), a sulfonylamino group (a sulfonylamino group preferably having from 1 to 20, more preferably from 1 to 16, and particularly preferably from 1 to 12, carbon atoms, e.g., methanesulfonylamino and benzenesulfonylamino), a sulfamoyl group (a sulfamoyl group preferably having from 0 to 20, more preferably from 0 to 16, and particularly preferably from 0 to 12, carbon atoms, e.g., sulfamoyl, methylsulfamoyl, dimethylsulfamoyl and phenylsulfamoyl), a carbamoyl group (a carbamoyl group preferably having from 1 to 20, more preferably from 1 to 16, and particularly preferably from 1 to 12, carbon atoms, e.g., carbamoyl, methylcarbamoyl, diethylcarbamoyl and phenylcarbamoyl), an alkylthio group (an alkylthio group preferably having from 1 to 20, more preferably from 1 to 16, and particularly preferably from 1 to 12, carbon atoms, e.g., methylthio and ethylthio), an arylthio group (an arylthio group preferably having from 6 to 20, more preferably from 6 to 16, and particularly preferably from 6 to 12, carbon atoms, e.g., phenylthio), a sulfonyl group (a sulfonyl group preferably having from 1 to 20, more preferably from 1 to 16, and particularly preferably from 1 to 12, carbon atoms, e.g., mesyl and tosyl), a sulfinyl group (a sulfinyl group preferably having from 1 to 20, more preferably from 1 to 16, and particularly preferably from 1 to 12, carbon atoms, e.g., methanesulfinyl and benzenesulfinyl), a ureido group (a ureido group preferably having from 1 to 20, more preferably from 1 to 16, and particularly preferably from 1 to 12, carbon atoms, e.g., ureido, methylureido and phenylureido), a phosphoric acid amido group (a phosphoric acid amido group preferably having from 1 to 20, more preferably from 1 to 16, and particularly preferably from 1 to 12, carbon atoms, e.g., diethylphosphoric acid amido and phenylphosphoric acid amido), a hydroxyl group, a mercapto group, a halogen atom (e.g., fluorine, chlorine, bromine and iodine), a cyano group, a sulfo group, a carboxyl group, a nitro group, a hydroxamic acid group, a sulfino group, a hydrazino group, an imino group, a heterocyclic group (a heterocyclic group preferably having from 1 to 30, and more preferably from 1 to 12, carbon atoms, and the hetero atoms include a nitrogen atom, an oxygen atom and a sulfur atom, e.g., imidazolyl, pyridyl, quinolyl, furyl, thienyl, piperidyl, morpholino, benzoxazolyl, benzimidazolyl, benzothiazolyl, carbazolyl and azepinyl), and a silyl group (a silyl group preferably having from 3 to 40, more preferably from 3 to 30, and particularly preferably from 3 to 24, carbon atoms, e.g., trimethylsilyl and triphenylsilyl). These substituents may further be substituted. When there are two or more substituents, they may be the same or different, and they may be linked with each other to form a ring, if possible. The cases where a plurality of structures represented by formula (1) are contained via R or L are also included in formula (1).

M represents a hydrogen atom, an alkali metal cation (e.g., a sodium ion, a potassium ion, a lithium ion and a cesium ion), an ammonium ion (in the case of a quaternary ammonium salt, the ammonium ion represents a quaternary nitrogen cation, e.g., a tetramethylammonium ion, a tetraethylammonium ion, a trimethylbenzylammonium ion, a methylpyridinium ion, and a benzylpyridinium ion), an organic amine cation (i.e., a nitrogen cation of a quaternary amine salt, e.g., a quaternary nitrogen cation of protonated methylamine, dimethylamine, ethylamine, diethylamine, triethylamine, diaza-bicycloundecene, diaza-bicyclo-octane, piperidine, pyrrolidine, morpholine, N-methylpiperidine, N-methylmorpholine, pyridine, pyrazine, aniline, and N,N-dimethyl-aniline), or a negative ion sign. A plurality of M's in the same molecule may be the same or different. An alkali metal ion and a hydrogen atom are preferred.

q and r each represents an integer of 1 or more; k and m each represents an integer of 0 or more; n represents an integer of 1 or more; and p represents an integer of 0 or more, wherein p+r is 3 or 4, and when p+r is 4, the N atom represents a quaternary ammonium cation, and one of the M's represents a dissociated anion.

It is preferred that a hydrocarbon group having 8 or more carbon atoms be contained in R or L, and a compound represented by the following formula (2) is most preferably used.

R—N-(L-COOM)$_2$ (2)

wherein R and L each has the same meaning as described above. R particularly preferably represents an alkyl group, and L preferably represents an alkylene group.

The preferred examples of compounds represented by formula (1) in the present invention are shown below, but the invention is not limited thereto.

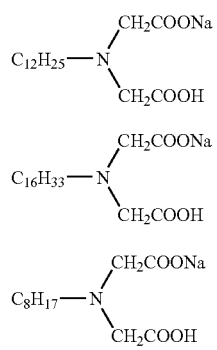

X-1

X-2

X-3

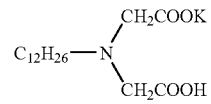

X-4

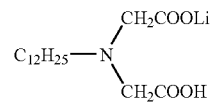

X-5

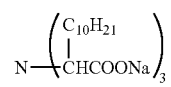

X-6

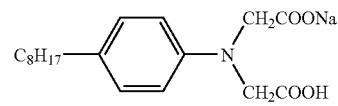

X-7

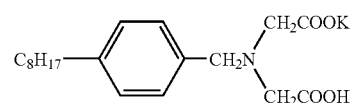

X-8

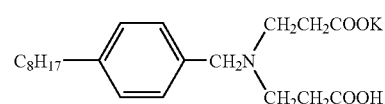

X-9

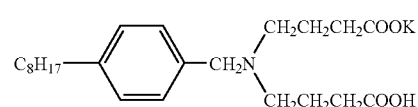

X-10

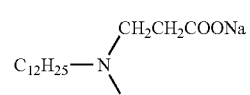

X-11

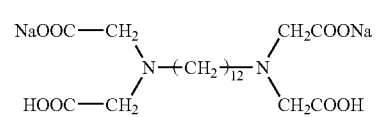

X-12

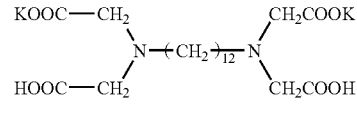

X-13

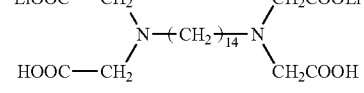

X-14

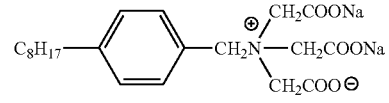

X-15

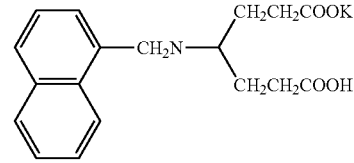

X-16

-continued

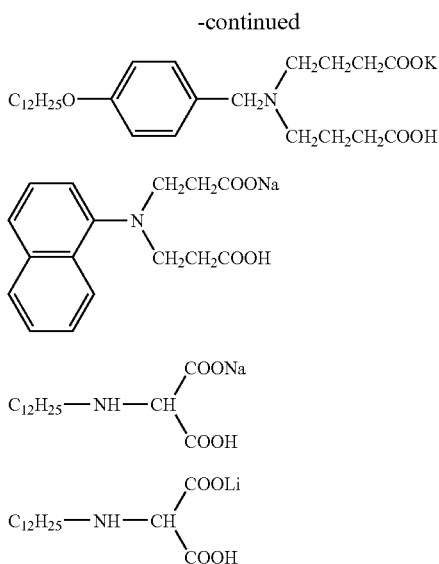

The compound represented by formula (1) of the present invention is used in an amount of from 0.0001 to 10 g/m² of an ink jet recording sheet, preferably from 0.001 to 5 g/m², and particularly preferably from 0.01 to 2 g/m². When coating solutions for two layers are used for coating an inkjet recording sheet, the compound may be added to either layer, but it is preferred to add the compound to the uppermost layer coating solution from the viewpoint of coating property.

A compound represented by formula (1) is contained in the ink in the invention in an amount of from 0.01 to 20 wt %, preferably from 0.1 to 10 wt %, and more preferably from 0.5 to 5 wt %.

The sheet for ink jet recording of the present invention is described in detail below.

When the compound represented by formula (1) in the present invention is added to a coloring material-receiving layer, for the purpose of increasing the affinity with water, the compound may be added as the mixture with a water-soluble organic solvent, e.g., an alcohol compound (methanol, ethanol, isopropyl alcohol, ethylene glycol, diethylene glycol, diethylene glycol monobutyl ether, polyethylene glycol, polypropylene glycol, glycerol, diglycerol, trimethylolpropane, or trimethylolbutane), an ether compound (tetrahydrofuran or dioxane), an amide compound (dimethylformamide, dimethylacetamide, or N-methylpyrrolidone), or a ketone compound (acetone).

When the compound represented by formula (1) in the present invention does not have sufficient water solubility, the compound may be added as the mixture with a hydrophobic organic solvent, e.g., an ester compound (ethyl acetate, dioctyl adipate, butyl phthalate, methyl stearate, or trirecsyl phosphate), an ether compound (anisole, hydroxyethoxybenzene, hydroquinone or dibutyl ether), a hydrocarbon compound (toluene, xylene, or diisopropylnaphthalene), an amide compound (N-butylbenzenesulfonamide or stearic acid amide), an alcohol compound (2-ethylhexyl alcohol, benzyl alcohol or phenethyl alcohol), a ketone compound (hydroxyacetophenone, benzophenone or cyclohexane), or with the above-described water-soluble organic solvent. The addition may be performed by oil droplet dispersion, latex dispersion, solid dispersion or polymer dispersion.

Water-soluble Resin:

In the ink jet recording sheet in the present invention, it is preferred for the coloring material-receiving layer to contain a water-soluble resin together with the compound represented by formula (1) of the invention.

As the examples of the above water-soluble resins, polyvinyl alcohol resins having a hydroxyl group as the hydrophilic constitutional unit [polyvinyl alcohol (PVA), acetoacetyl-modified polyvinyl alcohol, cation-modified polyvinyl alcohol, anion-modified polyvinyl alcohol, silanol-modified polyvinyl alcohol, and polyvinyl acetal], cellulose resins [methyl cellulose (MC), ethyl cellulose (EC), hydroxyethyl cellulose (HEC), carboxymethyl cellulose (CMC), hydroxypropyl cellulose (HPC), hydroxyethylmethyl cellulose, and hydroxypropylmthyl cellulose], resins having chitins, chitosans, starch, or an ether bond [polyethylene oxide (PEO), polypropylene oxide (PPO), polyethylene glycol (PEG), and polyvinyl ether (PVE)], and resins having a carbamoyl group [polyacrylamide (PAAM), polyvinyl pyrrolidone (PVP) and polyacrylic acid hydrazide] can be exemplified.

In addition to the above, polyacrylate, maleic resin, alginate and gelatins having a carboxyl group as the dissociating group can also be exemplified as water-soluble resins.

Of the above resins, polyvinyl alcohol resins are particularly preferred. The examples of the polyvinyl alcohol resins are disclosed in JP-B-4-52786 (the term "JP-B" as used herein means an "examined Japanese patent publication"), JP-B-5-67432, JP-B-7-29479, Japanese Patent No. 2537827, JP-B-7-57553, Japanese Patent Nos. 2502998, 3053231, JP-A-63-176173, Japanese Patent No. 2604367, JP-A-7-276787, JP-A-9-207425, JP-A-11-58941, JP-A-2000-135858, JP-A-2001-205924, JP-A-2001-287444, JP-A-62-278080, JP-A-9-39373, Japanese Patent No. 2750433, JP-A-2000-158801, JP-A-2001-213045, JP-A-2001-328345, JP-A-8-324105 and JP-A-11-348417.

As the examples of water-soluble resins other than polyvinyl alcohol resins, the compounds disclosed in JP-A-11-165461, paragraph Nos. [0011] to [0014] are also exemplified.

These water-soluble resins may be used alone or in combination of two or more.

The content of the water-soluble resin of the present invention is preferably from 9 to 40 wt % based on the total solid content mass of the coloring material-receiving layer, and more preferably from 12 to 33 wt %.

Fine Particles:

In the ink jet recording sheet in the present invention, it is further preferred for the coloring material-receiving layer to contain a water-soluble resin and fine particles together with the betaine surfactant of the invention.

A porous structure can be formed by adding fine particles to a coloring material-receiving layer, thus the ink absorption performance of the layer is improved. In particular, when the solid content of fine particles in the coloring material-receiving layer is 50 wt % or more, more preferably 60 wt % or more, it becomes possible to obtain a better porous structure, as a result, an ink jet recording sheet having sufficient ink absorption performance can be obtained. Here, the solid content of fine particles in the coloring material-receiving layer is the content computed on the basis of the components in the composition constituting the coloring material-receiving layer excluding water.

Organic and inorganic fine particles can be used as such fine particles, but it is preferred to use inorganic fine particles from the point of ink absorption and image stability.

As the organic fine particles, polymer fine particles obtained by emulsion polymerization, micro-emulsion polymerization, soap-free polymerization, seed polymerization, dispersion polymerization and suspension polymerization are preferably used, e.g., powders, latex or emulsion-state polymer fine particles of polyethylene, polypropylene, polystyrene, polyacrylate, polyamide, silicone resin, phenol resin, and natural high polymer are exemplified.

As the inorganic fine particles, e.g., silica fine particles, colloidal silica, titanium dioxide, barium sulfate, calcium silicate, zeolite, kaolinite, halloysite, mica, talc, calcium carbonate, magnesium carbonate, calcium sulfate, pseudo-boehmite, zinc oxide, zinc hydroxide, alumina, aluminum silicate, calciumsilicate, magnesiumsilicate, zirconiumoxide, zirconium hydroxide, cerium oxide, lanthanum oxide and yttrium oxide are exemplified. Of these inorganic fine particles, silica fine particles, colloidal silica, alumina fine particles and pseudo-boehmite are preferred from the viewpoint of capable of forming good porous structures. These fine particles may be used as primary particles as they are or may be used in the state of the secondary particles formed. The average primary particle size of these fine particles is preferably 2 μm or less, and more preferably 200 nm or less.

Silica fine particles having an average primary particle size of 20 nm or less, colloidal silica having an average primary particle size of 30 nm or less, alumina fine particles having an average primary particle size of 20 nm or less, and pseudo-boehmite having an average pore radius of from 2 to 15 nm are more preferred, and silica fine particles, alumina fine particles and pseudo-boehmite are particularly preferred.

In general, silica fine particles are classified roughly into wet process particles and dry process particles (a gas phase process) according to their manufacturing processes. In the wet process, a process of forming an active silica by acid decomposition of silicate, appropriately polymerizing, aggregating and precipitating the active silica, thereby obtaining hydrous silica is mainstream. On the other hand, in the gas phase process, a process by gas phase thermal hydrolysis (flame hydrolysis) of silicon halide, and a process of reduction gasification of silicious sand and cokes on heating in an electric furnace by arcs, and oxidizing the product with air (an arc process), thereby obtaining anhydrous silica are mainstream. "Gas phase process silica" means anhydrous silica fine particles which is obtained by the above gas phase process. As the silica fine particles for use in the present invention, gas phase process silica fine particles are particularly preferred.

The above gas phase process silica differs from hydrous silica in the density of silanol groups on the surface and the presence or absence of voids and shows different properties, and the gas phase process silica is suitable for forming a three dimensional structure having a high void ratio. The reason for this is not clearly known but, in the case of hydrous silica, the density of silanol groups on the surface of a particle is as many as from 5 to 8/$nm^2$, and so the silica fine particles are liable to aggregate densely. On the other hand, in the case of the gas phase process silica, the density of silanol groups on the surface of a particle is as few as from 2 to 3/$nm^2$, and the fine particles are liable to flocculate sparsely, and so it is presumed that a structure having a high void ratio is formed.

Since the gas phase process silica has an especially large specific surface area, the absorption and retentivity of ink are high, and further, since it has a low refractive index, transparency can be given to a coloring material-receiving layer by performing dispersion until particles reach suitable particle sizes, and so high color density and a good coloring property can be obtained. The fact that a coloring material-receiving layer is transparent is important not only in the case where transparency is required, e.g., OHP, but in the case of being applied to a sheet for recording, e.g., a photo-glossy paper, in the point of obtaining high color density and a good coloring glossiness.

The gas phase process silica preferably has an average primary particle size of 30 nm or less, more preferably 20 nm or less, particularly preferably 10 nm or less, and most preferably from 3 to 10 nm. The particles of the gas phase process silica are liable to attach to each other due to hydrogen bonding by silanol groups, thus a structure having a high void ratio can be formed when the average primary particle size is 30 nm or less, and an ink absorbing characteristic can be effectively improved.

The silica fine particles may be used in combination with the above-described other fine particles. When the gas phase process silica is used in combination with the above other fine particles, the content of the gas phase process silica in all the fine particles is preferably 30 wt % or more, and more preferably 50 wt % or more.

As the inorganic fine particles for use in the present invention, alumina fine particles, alumina hydrate, and the mixtures and composites of these compounds are also preferably used. Of these compounds, alumina hydrate is preferred for well absorbing and fixing ink, and pseudo-boehmite ($Al_2O_3 \cdot nH_2O$) is especially preferred. Various forms of alumina hydrates can be used, and it is preferred to use boehmite in a sol state as the starting material for capable of obtaining a smooth layer.

Pseudo-boehmite has an average pore radius of preferably from 1 to 30 nm, and more preferably from 2 to 15 nm, and a pore volume of preferably from 0.3 to 2.0 ml/g, and more preferably from 0.5 to 1.5 ml/g. These pore radius and pore volume are measured according to nitrogen adsorption desorption method, for example, they can be measured by a gas adsorption desorption analyzer (e.g., "Omnisoap 369", a trade name, manufactured by Beckman Coulter, Inc.).

Of alumina fine particles, gas phase process alumina fine particles are preferred for their large specific surface area. The average primary particle size of the gas phase process alumina is preferably 30 nm or less, and more preferably 20 nm or less.

When the above fine particles are used in a sheet for ink jet recording, they can also be used preferably in the modes disclosed, e.g., in JP-A-10-81064, JP-A-10-119423, JP-A-10-157277, JP-A-10-217601, JP-A-11-348409, JP-A-2001-138621, JP-A-2000-43401, JP-A-2000-211235, JP-A-2000-309157, JP-A-2001-96897, JP-A-2001-138627, JP-A-11-91242, JP-A-8-2087, JP-A-8-2090, JP-A-8-2091, JP-A-8-2093, JP-A-8-174992, JP-A-11-192777, and JP-A-2001-301314.

The water-soluble resins and fine particles mainly constituting the coloring material-receiving layer of a sheet for ink jet recording in the present invention may be used respectively alone or a plurality of materials may be used as mixture.

From the viewpoint of maintaining transparency, the kind of water-soluble resin to be combined with fine particles, in particular, silica fine particles, is important. When the above gas phase process silica is used, a polyvinyl alcohol resin is preferably used as the water-soluble resin. Above all, polyvinyl alcohol resins having a saponification degree of from 70 to 100% is more preferred, and polyvinyl alcohol resins having a saponification degree of from 80 to 99.5% is especially preferred.

The polyvinyl alcohol resins have hydroxyl groups as the constitutional unit, and the hydroxyl groups and the silanol groups on the surface of the silica fine particles form hydrogen bonding, therefore, a three dimensional network structure is easily formed with the secondary particles of the silica fine particles as the network chain unit. It is thought that a coloring material-receiving layer having a high void ratio and sufficient strength can be formed by the formation of the three dimensional network structure.

In ink jet recording, a porous coloring material-receiving layer obtained as described above rapidly absorbs ink by a capillary phenomenon, thus a dot free of blotting of ink and having high roundness can be formed.

Polyvinyl alcohol resins may be used in combination with the above-described other water-soluble resins. When the polyvinyl alcohol resins are used in combination with the above other water-soluble resins, the content of polyvinyl alcohol resins in all the water-soluble resins is preferably 50 wt % or more, and more preferably 70 wt % or more.

Content Ratio of Fine Particles to Water-soluble Resin:

The ratio by weight of fine particles (x) to a water-soluble resin (y) [PB ratio (x/y)] greatly affects the film structure and the film strength of a coloring material-receiving layer. That is, when the ratio by weight (PB ratio) becomes great, the void ratio, pore volume and surface area (per unit mass) become great, but the density and strength are liable to lower.

As the ratio by weight [PB ratio (x/y)] in the coloring material-receiving layer of the invention, from 1.5/1 to 10/1 is preferred with the intention of preventing the reduction of film strength and cracking by drying due to excessively large PB ratio, and also preventing the reduction of void ratio by clogging of voids with the resin and the succeeding reduction of ink absorption due to excessively small PB ratio.

On the other hand, it is necessary for a coloring material-receiving layer to have sufficient film strength, since sometimes stress is applied to a recording sheet when traveling through the carrier system of an ink jet printer. It is also necessary for a coloring material-receiving layer to have sufficient film strength to prevent cracking and peeling of the coloring material-receiving layer by a cutting process to sheets. Taking these cases into consideration, the ratio by weight (x/y) is more preferably 5/1 or less (the case where the numerical value before the mark "/" is decreased means "lower"), on the other hand, from the viewpoint of ensuring high speed ink absorption in an ink jet printer, the ratio by weight is more preferably 2/1 or more.

For example, when a coating solution obtained by thoroughly dispersing gas phase process silica fine particles having an average primary particle size of 20 nm or less and a water-soluble resin in an aqueous solution in a ratio by weight (x/y) of from 2/1 to 5/1 is coated on a support and the coated layer is dried, a three dimensional network structure is formed with the secondary particles of the silica fine particles as the network chains, and a transparent porous film having an average pore diameter of 30 nm or less, a void ratio of from 50 to 80%, a specific pore volume of 0.5 ml/g or more, and a specific surface area of 100 m$^2$/g or more can be easily formed.

Crosslinking Agent:

The coloring material-receiving layer of a sheet for ink jet recording in the present invention is a coating layer containing fine particles, a water-soluble resin and a crosslinking agent capable of crosslinking the water-soluble resin, and the coloring material-receiving layer is preferably a porous layer formed by curing by a crosslinking reaction of the crosslinking agent and the water-soluble resin.

Boron compounds are preferably used for crosslinking the above water-soluble resins, in particular, polyvinyl alcohol. As the boron compounds, e.g., borax, boric acid, borate (e.g., orthoborate, $InBO_3$, $ScBO_3$, $YBO_3$, $LaBO_3$, $Mg_3(BO_3)_2$, $Co_3(BO_3)_2$), diborate (e.g., $Mg_2B_2O_5$, $Co_2B_2O_5$), metaborate (e.g., $LiBO_2$, $Ca(BO_2)_2$, $NaBO_2$, $KBO_2$), tetraborate (e.g., $Na_2B_4O_7 \cdot 10H_2O$), and pentaborate (e.g., $KB_5O_8 \cdot 4H_2O$, $Ca_2B_6O_{11} \cdot 7H_2O$, $CsB_5O_5$) can be exemplified. Borax, boric acid and borate are preferred among these boron compounds in the point of capable of quickly bringing about crosslinking reaction, and boric acid is especially preferred.

Besides the boron compounds, the following compounds can also be used as the crosslinking agents of the water-soluble resins.

The examples of the compounds include aldehyde compounds, e.g., formaldehyde, glyoxal and glutaraldehyde; ketone compounds, e.g., diacetyl and cyclopentanedione; active halogen compounds, e.g., bis(2-chloroethylurea)-2-hydroxy-4,6-dichloro-1,3,5-triazine and 2,4-dichloro-6-s-triazine sodium salt; active vinyl compounds, e.g., divinyl sulfonic acid, 1,3-vinylsulfonyl-2-propanol, N,N'-ethylene-bis(vinylsulfonylacetamide), and 1,3,5-triacryloyl-hexahydro-s-triazine; N-methylol compounds, e.g., dimethylolurea and methyloldimethylhydantoin; melamine resins, e.g., methylolmelamine and alkylatedmethylolmelamine; epoxy resins; isocyanate compounds, e.g., 1,6-hexamethylenediisocyanate; aziridine compounds disclosed in U.S. Pat. Nos. 3,017,280 and 2,983,611; carboxyimide compounds disclosed in U.S. Pat. No. 3,100,704; epoxy compounds, e.g., glycerol triglycidyl ether; ethyleneimino compounds, e.g., 1,6-hexamethylene-N,N'-bis-ethyleneurea; halogenated carboxyaldehyde compounds, e.g., mucochloric acid and mucophenoxychloric acid; dioxane compounds, e.g., 2,3-dihydroxydioxane; metal-containing compounds, e.g., titanium lactate, aluminum sulfate, chromium alum, potassium alum, zirconyl acetate and chromiumacetate; polyamine compounds, e.g., tetraethylenepentamine; hydrazide compounds, e.g., adipic dihydrazide; and low molecular weight compounds and polymers having 2 or more oxazoline groups.

These crosslinking agents may be used alone or in combination of two or more.

Taking a boron compound as an example, crosslinking is preferably performed as follows. That is, the coloring material-receiving layer is a layer obtained by crosslinking a coated layer coated with a coating solution containing fine particles, a water-soluble resin containing polyvinyl alcohol and a boron compound (hereinafter the coating solution is sometimes referred to as the first coating solution), and the crosslinking is performed by applying a basic solution having a pH value of 8 or more (hereinafter the coating solution is sometimes referred to as the second coating solution) to the coated layer or film (1) simultaneously with the coating of the above coating solution, or (2) in the middle of drying of the coated layer formed by coating the coating solution and before the coated layer shows falling-rate-drying.

The use amount of the crosslinking agents is preferably from 1 to 50 wt %, and more preferably from 5 to 40 wt %, based on the water-soluble resin.

Mordant:

In the present invention, a mordant is added to a coloring material-receiving layer for the purpose of improving the waterproofness and blotting with aging of the image formed.

As such mordants, cationic polymers (cationic mordants) as organic mordants and inorganic mordants are preferably used. By adding the mordant to a coloring material-receiving layer, an interaction is brought about between the mordant and a liquid ink containing an anionic dye as the coloring material, to thereby stabilize the coloring material, thus, waterproofness and blotting with aging can be improved. Organic mordants and inorganic mordants may be used alone, or organic mordants and inorganic mordants may be used in combination.

A mordant may be added to a coating solution containing fine particles and a water-soluble resin (the first coating solution), or may be added to the second coating solution and coated in the case where there is a fear of generating aggregation between the mordant and the fine particles.

As the cationic mordants, polymer mordants having a primary, secondary or tertiary amino group, or a quaternary ammonium salt group as the cationic group are preferably used, but cationic non-polymer mordants can also be used.

As the polymer mordants, homopolymers of monomers (mordant monomers) having a primary, secondary or tertiary amino group and the salt thereof, or a quaternary ammonium salt group, copolymers or condensation polymers of these mordant monomers with other monomers (hereinafter referred to as "non-mordant monomers") are preferably used. These polymer mordants can be used in the form of water-soluble polymers or water-dispersible latex particles.

The examples of the above monomers (mordant monomers) include, e.g., trimethyl-p-vinylbenzylammonium chloride, trimethyl-m-vinylbenzylammonium chloride, triethyl-p-vinylbenzylammonium chloride, triethyl-m-vinylbenzylammonium chloride, N,N-dimethyl-N-ethyl-N-p-vinylbenzylammonium chloride, N,N-diethyl-N-methyl-N-p-vinylbenzylammonium chloride, N,N-dimethyl-N-n-propyl-N-p-vinylbenzylammonium chloride, N,N-dimethyl-N-n-octyl-N-p-vinylbenzylammonium chloride, N,N-dimethyl-N-benzyl-N-p-vinylbenzylammonium chloride, N,N-diethyl-N-benzyl-N-p-vinylbenzylammonium chloride, N,N-dimethyl-N-(4-methyl)benzyl-N-p-vinylbenzylammonium chloride, N,N-dimethyl-N-phenyl-N-p-vinylbenzylammonium chloride; trimethyl-p-vinylbenzylammonium bromide, trimethyl-m-vinylbenzylammonium bromide, trimethyl-p-vinylbenzylammonium sulfonate, trimethyl-m-vinylbenzylammonium sulfonate, trimethyl-p-vinylbenzylammonium acetate, trimethyl-m-vinylbenzylammonium acetate, N,N,N-triethyl-N-2-(4-vinylphenyl)ethylammonium chloride, N,N,N-triethyl-N-2-(3-vinylphenyl)ethylammonium chloride, N,N-diethyl-N-methyl-N-2-(4-vinylphenyl)ethylammonium chloride, N,N-diethyl-N-methyl-N-2-(4-vinylphenyl)ethylammonium acetate; quaternary products of N,N-dimethylaminoethyl (meth)acrylate, N,N-diethylaminoethyl (meth)acrylate, N,N-dimethylaminopropyl (meth)acrylate, N,N-diethylaminopropyl (meth)acrylate, N,N-dimethylaminoethyl (meth)acrylamide, N,N-diethylaminoethyl (meth)acrylamide, N,N-dimethylaminopropyl (meth)acrylamide, and N,N-diethylaminopropyl (meth) acrylamide by methyl chloride, ethyl chloride, methyl bromide, ethyl bromide, methyl iodide or ethyl iodide, and sulfonates, alkylsulfonates, acetates and alkylcarboxylates of these monomers obtained by substituting the anions of them.

The examples of mordant monomers further include monomethyldiallylammonium chloride, trimethyl-2-(methacryloyloxy)ethylammonium chloride, triethyl-2-(methacryloyloxy)ethylammonium chloride, trimethyl-2-(acryloyloxy)ethylammonium chloride, triethyl-2-(acryloyloxy)ethylammonium chloride, trimethyl-3-(methacryloyloxy)propylammonium chloride, triethyl-3-(methacryloyloxy)propylammonium chloride, trimethyl-2-(methacryloylamino)ethylammonium chloride, triethyl-2-(methacryloylamino)ethylammonium chloride, trimethyl-2-(acryloylamino)ethylammonium chloride, triethyl-2-(acryloylamino)ethylammonium chloride, trimethyl-3-(methacryloylamino)propylammonium chloride, triethyl-3-(methacryloylamino)propylammonium chloride, trimethyl-3-(acryloylamino)propylammonium chloride, triethyl-3-(acryloylamino)propylammonium chloride; N,N-dimethyl-N-ethyl-2-(methacryloyloxy)ethylammonium chloride, N,N-diethyl-N-methyl-2-(methacryloyloxy)ethylammonium chloride, N,N-dimethyl-N-ethyl-3-(acryloylamino)propylammonium chloride, trimethyl-2-(methacryloyloxy)ethylammonium bromide, trimethyl-3-(acryloylamino)propylammonium bromide, trimethyl-2-(methacryloyloxy)ethylammonium sulfonate and trimethyl-3-(acryloylamino)propylammonium acetate.

As other copolymerizable monomers, N-vinylimidazole and N-vinyl-2-methylimidazole can also be exemplified.

Allylamine, diallylamine, and the derivatives and salts of allylamine and diallylamine can also be used. The examples of these compounds include allylamine, allylamine hydrochloride, allylamine acetate, allylamine sulfate, diallylamine, diallylamine hydrochloride, diallylamine acetate, diallylamine sulfate, diallylmethylamine and the salts of diallylmethylamine (as the salts, e.g., hydrochloride, acetate and sulfate), diallylethylamine and the salts of diallylethylamine (as the salts, e.g., hydrochloride, acetate and sulfate), and diallyldimethylammonium salt (as the counter anions of the salt, chloride, acetate ion and sulfate ion are exemplified). Since allylamine derivatives and diallylamine derivatives are poor in polymerizability in the form of amine, they are generally polymerized in the form of salt, and desalted, if necessary.

It is also possible to perform polymerization by using N-vinylacetamide or N-vinylformamide as a unit, and to make a vinylamine unit by hydrolysis after polymerization, and compounds having this vinylamine unit as a salt can also be used.

The above non-mordant monomers are monomers not containing a basic group or a cationic group, such as a primary, secondary or tertiary amino group and the salt thereof, or a quaternary ammonium salt group, and not showing or showing substantially a little interaction with the dyes in ink jet ink.

The examples of non-mordant monomers include, e.g., alkyl (meth)acrylate; cycloalkyl (meth)acrylate, e.g., cyclohexyl (meth)acrylate; aryl (meth)acrylate, e.g., phenyl (meth)acrylate; aralkyl ester, e.g., benzyl (meth)acrylate; aromatic vinyls, e.g., styrene, vinyltoluene and α-methylstyrene; vinyl esters, e.g., vinyl acetate, vinyl propionate, and vinyl bersatite; allyl esters, e.g., allyl acetate; halogen-containing monomers, e.g., vinylidene chloride and vinyl chloride; vinyl cyanide, e.g., (meth)acrylonitrile; and olefins, e.g., ethylene and propylene.

As the alkyl (meth)acrylate, alkyl (meth)acrylate in which the alkyl moiety has from 1 to 18 carbon atoms is preferred, e.g., methyl (meth)acrylate, ethyl (meth)acrylate, propyl (meth)acrylate, isopropyl (meth)acrylate, n-butyl (meth)acrylate, isobutyl (meth)acrylate, t-butyl (meth)acrylate, hexyl (meth)acrylate, octyl (meth)acrylate, 2-ethylhexyl (meth)acrylate, lauryl (meth)acrylate, and stearyl (meth) acrylate are exemplified.

Methyl acrylate, ethyl acrylate, methyl methacrylate, ethyl methacrylate, and hydroxyethyl methacrylate are especially preferred.

These non-mordant monomers may also be used alone or in combination of two or more.

As the polymer mordants, the following polymers can also be preferably used, e.g., polydiallyldimethylammonium chloride, polymethacryloyloxyethyl-β-hydroxyethyldimethylammonium chloride, polyethyleneimine, polyallylamine and derivatives thereof, polyamide-polyamine resins, cationic starch, dicyandiamide-formalin condensation products, dimethyl-2-hydroxypropylammonium salt polymers, polyamidine, polyvinylamine, dicyan series cationic resins represented by dicyandiamide-formalin condensation products, polyamine series cationic resins represented by dicyanamide-diethylene-triamine polycondensation products, epichlorohydrin-dimethylamine addition polymers, dimethyldialinammonium chloride-$SO_2$ copolymers, diallylamine salt-$SO_2$ copolymers, (meth)acrylate-containing polymers having a quaternary ammonium salt group-substituted alkyl group at the ester moiety, and styryl type polymers having a quaternary ammonium salt group-substituted alkyl group.

The polymer mordants are specifically disclosed in JP-A-48-28325, JP-A-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834, JP-A-60-122940, JP-A-60-122941, JP-A-60-122942, JP-A-60-235134, JP-A-1-161236, U.S. Pat. Nos. 2,484,430, 2,548,564, 3,148,061, 3,309,690, 4,115,124, 4,124,386, 4,193,800, 4,273,853, 4,282,305, 4,450,224, JP-A-1-161236, JP-A-10-81064, JP-A-10-119423, JP-A-10-157277, JP-A-10-217601, JP-A-11-348409, JP-A-2001-138621, JP-A-2000-43401, JP-A-2000-211235, JP-A-2000-309157, JP-A-2001-96897, JP-A-2001-138627, JP-A-11-91242, JP-A-8-2087, JP-A-8-2090, JP-A-8-2091, JP-A-8-2093, JP-A-8-174992, JP-A-11-192777, JP-A-2001-301314, JP-B-5-35162, JP-B-5-35163, JP-B-5-35164, JP-B-5-88846, JP-A-7-118333, JP-A-2000-344990, Japanese Patent Nos. 2648847 and 2661677. Polyallylamine and polyallylamine derivatives are particularly preferred.

As the organic mordants for use in the present invention, polyallylamine and polyallylamine derivatives having a weight average molecular weight of 100,000 or less are preferred.

However, in the present invention, mordants containing 1% or less of a low molecular weight component having a molecular weight 500 or less are used. The molecular weight can be determined by gel permeation chromatography (GPC).

As the polyallylamine and polyallylamine derivatives, well-known various allylamine polymers and derivatives thereof can be used in the present invention. The examples of such derivatives include salts of polyallylamine and acids (the acids include inorganic acids, e.g., hydrochloric acid, sulfuric acid, phosphoric acid, and nitric acid, organic acids, e.g., methanesulfonic acid, toluenesulfonic acid, acetic acid, propionic acid, cinnamic acid, and (meth)acrylic acid, combinations of these acids, and allylamine only a part of which is made salt), derivatives obtained by a high polymer reaction of polyallylamine, and copolymers of polyallylamine and other copolymerizable monomers (the specific examples of the monomers include (meth)acrylic esters, styrenes, (meth)acrylamides, acrylonitrile and vinyl esters).

The specific examples of polyallylamines and polyallylamines derivatives are disclosed in JP-B-62-31722, JP-B-2-14364, JP-B-63-43402, JP-B-63-43403, JP-B-63-45721, JP-B-63-29881, JP-B-1-26362, JP-B-2-56365, JP-B-2-57084, JP-B-4-41686, JP-B-6-2780, JP-B-6-45649, JP-B-6-15592, JP-B-4-68622, Japanese Patent Nos. 3199227, 3008369, JP-A-10-330427, JP-A-11-21321, JP-A-2000-281728, JP-A-2001-106736, JP-A-62-256801, JP-A-7-173286, JP-A-7-213897, JP-A-9-235318, JP-A-9-302026, JP-A-11-21321, WO 99/21901, WO 99/19372, JP-A-5-140213, and JP-T-11-506488 (the term "JP-T" as used herein means a published Japanese translation of a PCT patent application).

As the mordants for use in the present invention, inorganic mordants can also be used, e.g., polyvalent water-soluble metal salts and hydrophobic metal salt compounds are exemplified.

The specific examples of inorganic mordants include, e.g., salts and complexes of metals selected from magnesium, aluminum, calcium, scandium, titanium, vanadium, manganese, iron, nickel, copper, zinc, gallium, germanium, strontium, yttrium, zirconium, molybdenum, indium, barium, lanthanum, cerium, praseodymium, neodymium, samarium, europium, gadolinium, dysprosium, erbium, ytterbium, hafnium, tungsten and bismuth are exemplified.

Specifically, the examples of inorganic mordants include, e.g., calcium acetate, calcium chloride, calcium formate, calcium sulfate, barium acetate, barium sulfate, barium phosphate, manganese chloride, manganese acetate, manganese formate dihydrate, ammonium manganese sulfate hexahydrate, cupric chloride, copper(II) ammonium chloride dihydrate, copper sulfate, cobalt chloride, cobalt thiocyanate, cobalt sulfate, nickel sulfate hexahydrate, nickel chloride hexahydrate, nickel acetate tetrahydrate, ammonium nickel sulfate hexahydrate, nickel amidosulfate tetrahydrate, aluminum sulfate, aluminum alum, basic aluminum polyhydroxide, aluminum sulfite, aluminum thiosulfate, aluminum polychloride, aluminum nitrate nonahydrate, aluminum chloride hexahydrate, ferrous bromide, ferrous chloride, ferric chloride, ferrous sulfate, ferric sulfate, zinc phenolsulfonate, zinc bromide, zinc chloride, zinc nitrate hexahydrate, zinc sulfate, titanium tetrachloride, tetraisopropyl titanate, titanium acetylacetonate, titanium lactate, zirconium acetylacetonate, zirconyl acetate, zirconyl sulfate, ammonium zirconium carbonate, zirconyl stearate, zirconyl octylate, zirconyl nitrate, zirconium oxychloride, zirconium hydroxychloride, chromium acetate, chromium sulfate, magnesium sulfate, magnesium chloride hexahydrate, magnesium citrate nonahydrate, sodium phosphotungstate, tungsten sodium citrate, dodecatungstophosphate n-hydrate, dodecatungstosilicate hexacosahydrate, molybdenum chloride, dodecamolybdophosphate n-hydrate, gallium nitrate, germanium nitrate, strontium nitrate, yttrium acetate, yttrium chloride, yttrium nitrate, indium nitrate, lanthanum nitrate, lanthanum chloride, lanthanum acetate, lanthanum benzoate, cerium chloride, cerium sulfate, cerium octylate, praseodymium nitrate, neodymium nitrate, samarium nitrate, europium nitrate, gadolinium nitrate, dysprosium nitrate, erbium nitrate, ytterbium nitrate, hafnium chloride and bismuth nitrate.

As the inorganic mordants for use in the present invention, aluminum-containing compounds, titanium-containing compounds, zirconium-containing compounds, and metallic compounds belonging to group IIIB of the Periodic Table (salts or complexes) are preferably used.

The amount of mordants contained in a coloring material-receiving layer in the invention is preferably from 0.01 to 5 g/m², and more preferably from 0.1 to 3 g/m².

Other Components:

A sheet for ink jet recording for use in the present invention can further contain various well-known additives according to necessity, e.g., acids, ultraviolet absorbers, antioxidants, fluorescent brightening agents, monomers, polymerization initiators, polymerization inhibitors, blotting preventives, antiseptics, viscosity stabilizers, defoaming agents, surfactants, antistatic agents, matting agents, curl preventing agents and waterproofing agents, can be used.

In the present invention, a coloring material-receiving layer may contain acids. The surface pH value of a coloring material-receiving layer is adjusted to 3 to 8, preferably from 5 to 7.5 by adding acids. The yellowing resistance of the white area of sheet is improved by the addition of acids. The surface pH value is measured according to Method A (a coating method) of surface pH measurements established by J. TAPPI. For example, the measurement can be performed with a pH measuring set for paper surface "Model MPC" (manufactured by KYORITSU CHEMICAL-CHECK Lab., Corp.) corresponding to Method A.

The specific examples of the acids include formic acid, acetic acid, glycolic acid, oxalic acid, propionic acid, malonic acid, succinic acid, adipic acid, maleic acid, malic acid, tartaric acid, citric acid, benzoic acid, phthalic acid, isophthalic acid, glutaric acid, gluconic acid, lactic acid, aspartic acid, glutamic acid, salicylic acid, salicylic acid metal salt (salts of Zn, Al, Ca, Mg), methanesulfonic acid, itaconic acid, benzenesulfonic acid, toluenesulfonic acid, trifluoromethanesulfonic acid, styrenesulfonic acid, trifluoroacetic acid, barbituric acid, acrylic acid, methacrylic acid, cinnamic acid, 4-hydroxybenzoic acid, aminobenzoic acid, naphthalenedisulfonic acid, hydroxybenzenesulfonic acid, toluenesulfinic acid, benzenesulfinic acid, sulfanilic acid, sulfamic acid, α-resorcylic acid, β-resorcylic acid, γ-resorcylic acid, gallic acid, phloroglycine, sulfosalicylic acid, ascorbic acid, erythorbic acid, bisphenolic acid, hydrochloric acid, nitric acid, sulfuric acid, phosphoric acid, polyphosphoric acid, boric acid and boronic acid. These acids are added so that the pH of the surface of a coloring material-receiving layer reaches from 3 to 8.

These acids may be used in the form of metal salts (e.g., salts of sodium, potassium calcium, cesium, zinc, copper, iron, aluminum, zirconium, lanthanum, yttrium, magnesium, strontium, cerium), or amine salts (e.g., ammonia, triethylamine, tributylamine, piperazine, 2-methylpiperazine, and polyallylamine).

In the present invention, it is preferred for a coloring material-receiving layer to contain storing property improvers, e.g., ultraviolet absorbers, antioxidants and blotting preventives.

As these ultraviolet absorbers, antioxidants and blotting preventives, alkylated phenol compounds (including hindered phenol compounds), alkylthiomethylphenol compounds, hydroquinone compounds, alkylated hydroquinone compounds, tocopherol compounds, thiodiphenyl ether compounds, compounds having 2 or more thioether bonds, bisphenol compounds, O-, N- and S-benzyl compounds, hydroxybenzyl compounds, triazine compounds, phosphonate compounds, acylaminophenol compounds, ester compounds, amide compounds, ascorbic acid, amine series antioxidants, 2-(2-hydroxyphenyl)benzotriazole compounds, 2-hydroxybenzophenone compounds, acrylate, water-soluble or hydrophobic metal salts, organic metal compounds, metal complexes, hindered amine compounds (including TEMPO compounds), 2-(2-hydroxyphenyl)-1,3,5-triazine compounds, metal deactivators, phosphite compounds, phosphonate compounds, hydroxylamine compounds, nitron compounds, peroxide scavengers, polyamide stabilizers, polyether compounds, basic auxiliary stabilizers, nucleus agents, benzofuranon compounds, indolinone compounds, phosphine compounds, polyamine compounds, thiourea compounds, urea compounds, hydrazide compounds, amidine compounds, sugar compounds, hydroxybenzoic acid compounds, dihydroxybenzoic acid compounds, and trihydroxybenzoic acid compounds are exemplified.

Of these compounds, alkylated phenol compounds, compounds having 2 or more thioether bonds, bisphenol compounds, ascorbic acid, amine series antioxidants, water-soluble or hydrophobic metal salts, organic metal compounds, metal complexes, hindered amine compounds, hydroxylamine compounds, polyamine compounds, thiourea compounds, hydrazide compounds, hydroxybenzoic acid compounds, dihydroxybenzoic acid compounds, and trihydroxybenzoic acid compounds are preferred.

The specific examples of the compounds are disclosed in the following patents: Japanese Patent Application No. 2002-13005, JP-A-10-182621, JP-A-2001-260519, JP-B-4-34953, JP-B-4-34513, JP-A-11-170686, JP-B-4-34512, EP 1138509, JP-A-60-67190, JP-A-7-276808, JP-A-2001-94829, JP-A-47-10537, JP-A-58-111942, JP-A-58-212844, JP-A-59-19945, JP-A-59-46646, JP-A-59-109055, JP-A-63-53544, JP-B-36-10466, JP-B-42-26187, JP-B-48-30492, JP-B-48-31255, JP-B-48-41572, JP-B-48-54965, JP-B-50-10726, U.S. Pat. Nos. 2,719,086, 3,707,375, 3,754,919, 4,220,711, JP-B-45-4699, JP-B-54-5324, EP 223739, EP 309401, EP 309402, EP 310551, EP 310552, EP 459416, German Patent 3,435,443, JP-A-54-48535, JP-A-60-107384, JP-A-60-107383, JP-A-60-125470, JP-A-60-125471, JP-A-60-125472, JP-A-60-287485, JP-A-60-287486, JP-A-60-287487, JP-A-60-287488, JP-A-61-160287, JP-A-61-185483, JP-A-61-211079, JP-A-62-146678, JP-A-62-146680, JP-A-62-146679, JP-A-62-282885, JP-A-62-262047, JP-A-63-051174, JP-A-63-89877, JP-A-63-88380, JP-A-66-88381, JP-A-63-113536, JP-A-63-163351, JP-A-63-203372, JP-A-63-224989, JP-A-63-251282, JP-A-63-267594, JP-A-63-182484, JP-A-1-239282, JP-A-2-262654, JP-A-2-71262, JP-A-3-121449, JP-A-4-291685, JP-A-4-291684, JP-A-5-61166, JP-A-5-119449, JP-A-5-188687, JP-A-5-188686, JP-A-5-110490, JP-A-5-1108437, JP-A-5-170361, JP-B-48-43295, JP-B-48-33212, U.S. Pat. Nos. 4,814,262 and 4,980,275.

Each of the additives described above as other components may be used alone or in combination of two or more. These other components are used in the form of solution in water, dispersion, polymer dispersion, emulsion, oil droplets, or microencapsulation. The addition amount of other components to an ink jet recording sheet is preferably from 0.01 to 10 g/m².

For the purpose of improving the dispersibility of inorganic fine particles, the inorganic fine particles may be subjected to surface-covering treatment with a silane coupling agent. It is preferred that the silane coupling agent have an organic functional group (e.g., a vinyl group, an amino group (a primary, secondary or tertiary amino group, a quaternary ammonium salt group), an epoxy group, a mercapto group, a chloro group, an alkyl group, a phenyl group or an ester group) besides the part for coupling treatment.

In the present invention, it is preferred for the coating solution for a coloring material-receiving layer to contain a surfactant. As the surfactant, any of cationic, anionic, nonionic, ampholytic, fluorine and silicone surfactants can be used.

The examples of the nonionic surfactants include polyoxyalkylene alkyl ethers and polyoxyalkylene alkylphenyl ethers (e.g., diethylene glycol monoethyl ether, diethylene glycol diethyl ether, polyoxyethyene lauryl ether, polyoxyethyene stearyl ether and polyoxyethylene nonylphenyl ether), oxyethylene-oxypropylene block copolymer, sorbitan fatty acid esters (e.g., sorbitan monolaurate, sorbitan monooleate and sorbitan trioleate), polyoxyethylene sorbitan fatty acid esters (e.g., polyoxyethylene sorbitan monolaurate, polyoxyethylene sorbitan monooleate and polyoxyethylene sorbitan trioleate), polyoxyethylene sorbitol fatty acid esters (e.g., polyoxyethylene sorbitol tetraoleate), glycerol fatty acid esters (e.g., glycerol monooleate), polyoxyethylene glycerol fatty acid esters (e.g., polyoxyethylene glycerol monostearate and polyoxyethylene glycerol monooleate), polyoxyethylene fatty acid esters (e.g., polyethylene glycol monolaurate and polyethylene glycol monooleate), polyoxyethylene alkylamine, acetylene glycols (e.g., 2,4,7,9-tetramethyl-5-decine-4,7-diol, and ethylene oxide adducts of the diol, propylene oxide adducts), and polyoxyalkylene alkyl ethers are preferably used. The nonionic surfactants can be used in the first coating solution and the second coating solution. Further, the nonionic surfactants may be used alone or two or more of them may be used in combination.

The examples of the ampholytic surfactants include amino acid type, carboxyammonium betaine type, sulfonammonium betaine type, ammonium sulfate betaine type and imidazolium betaine type surfactants, and the compounds disclosed, e.g., in U.S. Pat. No. 3,843,368, JP-A-59-49535, JP-A-63-236546, JP-A-5-303205, JP-A-8-262742, JP-A-10-282619, Japanese Patent Nos. 2514194, 2759795, and JP-A-2000-351269 can be preferably used. Of the above ampholytic surfactants, amino acid type, carboxyammonium betaine type and sulfonammonium betaine type surfactants are preferred. The ampholytic surfactants may be used alone or two or more of them may be used in combination.

The examples of the anionic surfactants include fatty acid salts (e.g., sodium stearate and potassium oleate), alkyl sulfates (e.g., sodium lauryl sulfate and triethanolamine lauryl sulfate), sulfonates (e.g., sodium dodecylbenzenesulfonate), alkyl sulfosuccinate (e.g., sodium dioctyl sulfosuccinate), alkyldiphenyl ether disulfonate and alkyl phosphate.

The examples of the cationic surfactants include alkylamine salts, quaternary ammonium salts, pyridinium salts and imidazolium salts.

The examples of the fluorine surfactants include compounds derived through intermediates having a perfluoroalkyl group by the method of electrolyticfluorination, telomerization or oligomerization.

For example, perfluoroalkyl sulfonate, perfluoroalkyl carboxylate, perfluoroalkyl ethylene oxide adducts, perfluoroalkyl trialkylammonium salt, perfluoroalkyl group-containing oligomers, and perfluoroalkyl phosphate are exemplified as the fluorine surfactants.

As the silicone surfactants, silicone oils modified with an organic group are preferred, and they can take the structure in which the side chain of the siloxane structure is modified with an organic group, the structure in which both terminals are modified, and the structure in which one terminal is modified. As the examples of modifications by an organic group, amino modification, polyether modification, epoxy modification, carboxyl modification, carbinol modification, alkylmodification, aralkylmodification, phenolmodification, and fluorine modification are exemplified.

The amount of surfactants used in the invention is preferably from 0.001 to 2.0% of the coating solution for a coloring material-receiving layer, and more preferably from 0.01 to 1.0%. When two or more coating solutions are used for forming a coloring material-receiving layer, a surfactant is preferably added to each layer.

In the present invention, it is preferred that a coloring material-receiving layer contain a high boiling point organic solvent for preventing curling. The high boiling point organic solvent is an organic compound having a boiling point of 150° C. or higher at normal pressure, and a water-soluble or hydrophobic compound. The high boiling point organic solvent may be liquid or solid state at room temperature, and they may be a high molecular weight compound or low molecular weight compound.

The specific examples of the high boiling point organic solvents include aromatic carboxylic esters (e.g., dibutyl phthalate, diphenyl phthalate and phenyl benzoate), aliphatic carboxylic esters (e.g., dioctyl adipate, dibutyl sebacate, methyl stearate, dibutylmaleate, dibutyl fumarate, and triethyl acetylcitrate), phosphoric esters (e.g., trioctyl phosphate and tricresyl phosphate), epoxys (e.g., epoxidized soybean oil, epoxidized fatty acid methyl), alcohols (e.g., stearyl alcohol, ethylene glycol, propylene glycol, diethylene glycol, triethylene glycol, glycerol, diethylene glycolmonobutyl ether (DEGMBE), triethylene glycol monobutyl ether, glycerol monomethyl ether, 1,2,3-butanetriol, 1,2,4-butanetriol, 1,2,4-pentanetriol, 1,2,6-hexanetriol, thioglycerol, triethanolamine, and polyethyleneglycol), vegetable oils (e.g., soybean oil and sunflower oil), and higher aliphatic carboxylic acid (e.g., linoleic acid and oleic acid).

Support:

As the supports for an ink jet recording sheet in the invention, both transparent supports comprising transparent materials such as plastics and opaque supports comprising opaque materials such as paper can be used. For making the best use of transparency of a coloring material-receiving layer, it is preferred to use transparent supports or highly glossy opaque supports.

As the materials which can be used for the transparent supports, materials which are transparent and have properties capable of resisting radiant heat when used in HOP or backlight display are preferably used. Specifically, polyesters, e.g., polyethylene terephthalate (PET); polysulfone, polyphenylene oxide, polyimide, polycarbonate and polyamide are exemplified as such materials. Polyesters are preferred of these materials, and polyethylene terephthalate is especially preferred.

The thickness of the transparent support is not particularly restricted, but a thickness of from 50 to 200 μm is preferred from easy handling.

It is preferred for a highly glossy opaque support to have glossiness of the surface, on which a coloring material-receiving layer is provided, of 40% or higher. The glossiness is a value obtained by the measurement according to the method described in JIS P-8142 (the test method of 75° specular glossiness of paper and cardboard). Specifically, the following support are exemplified.

As such supports, highly glossy paper supports, e.g., art paper, coated paper, cast coated paper, and baryta paper used for a silver salt photographic support; polyesters, e.g., polyethylene terephthalate (PET); cellulose esters, e.g., nitrocellulose, cellulose acetate, and cellulose acetate butyrate; highly glossy films obtained by adding a white pigment to plastic films to make opaque (surfaces may be subjected to calendering treatment), e.g., polysulfone, polyphenylene oxide, polyimide, polycarbonate, and polyamide; and supports obtained by providing a polyolefin coating layer containing or not containing a white pigment on the surface of each of the above various paper supports, the transparent supports or highly glossy films containing a white pigment are exemplified.

White pigment-containing expanded polyester films (e.g., expanded PET formed by adding polyolefin fine particles and stretching to thereby form voids) can also be preferably used. Resin-coated paper for use in photographic paper for silver salt photography) can also be preferably used.

The thickness of the opaque support is not also particularly restricted, but a thickness of from 50 to 300 μm is preferred from easy handling.

The surfaces of the above supports may be subjected to corona discharge treatment, glow discharge treatment, flame treatment or ultraviolet irradiation treatment for improving wettability and adhesion.

Base paper for use in the above resin-coated paper is described in detail below.

The base paper comprises woodpulp as the main component, and paper is manufactured by using synthetic pulp, e.g., polypropylene, or synthetic fibers, e.g., nylon and polyester, in addition to the woodpulp, if necessary. As the above woodpulp, any of LBKP, LBSP, NBKP, NBSP, LDP, NDP, LUKP and NUKP can be used, but it is preferred that LBKP, NBSP, LBSP, NDP and LDP in which short fibers predominate be used in a greater amount.

However, the ratio of LBSP and/or LDP is preferably from 10 to 70 wt %.

As the synthetic pulp, chemical pulp containing less impurities (e.g., sulfate pulp and sulfite pulp) is preferably used, and pulp subjected to bleaching treatment to improve brightness is also useful.

Base paper can arbitrarily contain sizes, e.g., higher fatty acid and alkyl ketene dimer, white pigments, e.g., calcium carbonate, talc and titanium oxide, paper strength intensifiers, e.g., starch, polyacrylamide and polyvinyl alcohol, fluorescent brightening agents, moisture content-retaining agents, e.g., polyethylene glycol, dispersants, and softening agents, e.g., quaternary ammonium.

The freeness of the pulp for use in paper-making is preferably from 200 to 500 ml according to the regulation by CSF, and the fiber length after beating in the sum of wt % of 24 mesh residue and wt % of 42 mesh residue is preferably from 30 to 70 wt % according to the regulation by JIS P-8207. The wt % of 4 mesh residue is preferably 20 wt % or less.

Weighing of base paper is preferably from 30 to 250 g, and particularly preferably from 50 to 200 g. The thickness of base paper is preferably from 40 to 250 μm. Base paper can be subjected to calendering treatment during or after paper-making to give the base paper high smoothness. The bulk density of base paper is generally from 0.7 to 1.2 g/m$^2$ (JIS P-8118).

The stiffness of base paper is preferably from 20 to 200 g on the condition regulated by JIS P-8143.

Surface sizes may be coated on the surface of base paper and the same surface sizes that can be added to the above base paper can be used.

The pH of base paper is preferably from 5 to 9 when measured by hot water extraction regulated by JIS P-8113.

Polyethylene to be coated on the front and rear surfaces of base paper is mainly low density polyethylene (LDPE) and/or high density polyethylene (HDPE), but LLDPE and polypropylene can also be used partially.

As is widely performed in photographic paper, it is preferred that rutile or anatase type titanium oxide, a fluorescent brightening agent and ultramarine be added to the polyethylene of a polyethylene layer provided on the side of a support on which a coloring material-receiving layer is formed for the purpose of improving opacity, brightness and hue. The amount of titanium oxide is generally preferably from 3 to 20 wt % of the polyethylene, and more preferably from 4 to 13 wt %. The thickness of the polyethylene layer is not especially restricted, but the thickness of both front and rear surface layers is preferably from 10 to 50 μm. Further, a subbing layer can be provided on the polyethylene layer to give the polyethylene layer the adhesion properties with the coloring material-receiving layer. Water-soluble polyester, gelatin and PVA are preferably used for the subbing layer. The thickness of the subbing layer is preferably from 0.01 to 5 μm.

A polyethylene-coated paper can be used as glossy paper, or can be used as a matt paper or a silk-finish paper similar to general photographic paper obtained by embossing when polyethylene is melt-extruded and coated on the surface of base paper.

A back coat layer can be provided on a support, and white pigments, aqueous binders and other components are exemplified as the components which can be added to the back coat layer.

The examples of the white pigments which are added to the back coat layer include inorganic white pigments, e.g., precipitated calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo-boehmite, aluminum hydroxide, alumina, lithopone, zeolite, hydrated halloysite, magnesium carbonate, and magnesium hydroxide, and organic white pigments, e.g., styrene series plastic pigment, acrylic series plastic pigment, polyethylene, microcapsules, urea resins and melamine resins.

As the aqueous binders used in the back coat layer, water-soluble high polymers, e.g., styrene-maleate copolymer, styrene-acrylate copolymer, polyvinyl alcohol, silanol-modified polyvinyl alcohol, starch, cationic starch, casein, gelatin, carboxymethyl cellulose, hydroxyethyl cellulose, and polyvinyl pyrrolidone, and water-dispersible high polymers, e.g., styrene-butadiene latex and acrylic emulsion are exemplified.

As other components which are added to the back coat layer, defoaming agents, foam inhibitors, dyes, fluorescent brightening agents, antiseptics and waterproofing agents are exemplified.

Manufacture of Sheet for Ink Jet Recording:

The coloring material-receiving layer of the sheet for ink jet recording in the present invention is preferably formed by the method (wet-on-wet coating method) of coating a first coating solution containing at least fine particles and a water-soluble resin (hereinafter sometimes referred to as "coating solution (A)") on the surface of a support, and then coating a second coating solution containing at least a mordant and having a pH value of 8 or more (hereinafter sometimes referred to as "coating solution (B)") (1) simultaneously with the coating of the first coating solution, or (2) in the middle of drying of the coated layer formed by coating of the first coating solution and before the coated layer shows falling-rate-drying speed, and curing the coated layer coated with the second coating solution by crosslinking.

Providing a coloring material-receiving layer cured by crosslinking is preferred from the viewpoint of the improvement of ink absorption and the prevention of film cracking.

According to the above manufacturing method, since the mordant abounds in the vicinity of the surface of the coloring material-receiving layer, the coloring material of ink jet is sufficiently mordanted and the waterproofness of characters and images after printing is improved. A part of mordant may be contained in coating solution (A), and in such a case the mordants in coating solution (A) and coating solution (B) may be the same or different.

In the present invention, a coating solution for forming a coloring material-receiving layer containing at least fine particles (e.g., gas phase process silica) and a water-soluble resin (e.g., polyvinyl alcohol) (coating solution (A)) can be manufactured, for example, as follows. That is:

Coating solution (A) can be manufactured by adding gas phase process silica fine particles and a dispersant to water (e.g., silica fine particles in water is from 10 to 20 wt %), dispersing the fine particles and the dispersant with a high speed wet colloid mill (e.g., "Clearmix" manufactured by M Technique Co., Ltd.) at a high speed of 10,000 rpm (preferably from 5,000 to 20,000 rpm) over 20 minutes (preferably from 10 to 30 minutes), adding a crosslinking agent (a boron compound) and a polyvinyl alcohol (PVA) aqueous solution (so that, for example, the mass of PVA becomes about ⅓ of that of the gas phase process silica fine particles), and in the case where the betaine surfactant of the invention is added to the coating solution for a coloring material-receiving layer, the betaine surfactant is added, and then dispersing the mixture on the same rotation condition as above. The obtained coating solution is in a homogeneous sol state. The coating solution is coated on a support according to the following coating method and dried, thus a porous coloring material-receiving layer having a three dimensional structure can be formed.

Further, water dispersion comprising gas phase process silica and a dispersant may be performed by previously preparing a water dispersion solution of gas phase process silica and adding the water dispersion solution to an aqueous solution of a dispersant, or an aqueous solution of a dispersant may be added to a water dispersion solution of gas phase process silica, or they may be mixed simultaneously. Gas phase process silica of powder may be added to an aqueous solution of a dispersant in place of a water dispersion solution of gas phase process silica.

After mixing the gas phase process silica and the dispersant, the mixture is fined by a disperser, thus a water dispersion solution having an average particle size of from 50 to 300 nm can be obtained. As the disperser for obtaining the water dispersion solution, various well-known dispersers, e.g., a high speed disperser, a medium-stirring type disperser (a ball mill and a sand mill), an ultrasonic disperser, a colloid mill disperser, and a high pressure disperser, can be used, but it is preferred to use a stirring type disperser, a colloid mill disperser or a high pressure disperser from the point of effectively performing the dispersion of clumpy fine particles formed.

As the solvents for each process, water, organic solvents and mixed solvents of them can be used. The examples of organic solvents for use in this coating include alcohols, e.g., methanol, ethanol, n-propanol, i-propanol, and methoxypropanol, ketones, e.g., acetone and methyl ethyl ketone, tetrahydrofuran, acetonitrile, ethyl acetate and toluene.

Cationic polymers can be used as the above dispersant, and the examples of mordants described above can be used as cationic polymers. Silane coupling agents are also preferably used as the dispersant.

The addition amount of the dispersants to fine particles is preferably from 0.1 to 30%, and more preferably from 1 to 10%.

The coating solution for a coloring material-receiving layer can be coated by well-known coating methods, e.g., an extrusion die coater, an air doctor coater, a blade coater, a rod coater, a knife coater, a squeeze coater, a reverse roll coater and a bar coater, can be used.

Simultaneously with or after coating the coating solution for a coloring material-receiving layer (coating solution (A)), coating solution (B) is applied, but coating solution (B) may be coated before the coated layer becomes to show falling-rate drying speed. That is, a coloring material-receiving layer is preferably manufactured by introducing a mordant into the layer after the coating of the coating solution for the coloring material-receiving layer (coating solution (A)) while the coated layer is showing constant-rate drying speed.

The terminology "before the coated layer becomes to show falling-rate drying speed" generally means a stage of several minutes immediately after coating of the coating solution for a coloring material-receiving layer, and a phenomenon that the content of the solvent (a dispersion medium) in a coated layer decreases in proportion to the time, i.e., "constant-rate drying speed", is shown during this period. With respect to the time showing "constant-rate drying speed", *Kagaku Kogaku Binran* (*Chemical Engineering Handbook*), pp. 707 to 712, Maruzen Co. (Oct. 25, 1980) can be referred to.

As described above, the coated layer is dried after coating the first coating solution until the coated layer becomes to show falling-rate drying speed generally at 50 to 180° C. for 0.5 to 10 minutes, and preferably from 0.5 to 5 minutes. Drying time of course varies depending upon the coated amount, but the above range is generally preferred.

As the methods which are applicable before the first coating layer comes to show falling-rate drying speed, (1) a method of further coating, on the coated layer, coating solution (B), (2) a method of spraying coating solution (B), and (3) a method of immersing the support having the coated layer in coating solution (B) are exemplified.

In the above method (1), coating solution (B) can be coated by well-known coating methods, e.g., a curtain flow coater, an extrusion die coater, an air doctor coater, a blade coater, a rod coater, a knife coater, a squeeze coater, a reverse roll coater and a bar coater, can be used. However, it is preferred to use a method in which a coater does not directly come into contact with the already coated first coating layer, such as an extrusion die coater, a curtain flow coater, and a bar coater.

After the mordant solution (coating solution (B)) has been coated, drying and curing are performed by heating generally at 40 to 180° C. for 0.5 to 30 minutes, and preferably at 40 to 150° C. for 1 to 20 minutes.

Further, when the mordant solution (coating solution (B)) is coated simultaneously with the coating of the coating solution for a coloring material-receiving layer (coating solution (A)), a coloring material-receiving layer can be formed by simultaneously coating (multilayer coating) the coating solution for the coloring material-receiving layer (coating solution (A)) and the mordant solution (coating solution (B)) on the support so that the coating solution for the coloring material-receiving layer (coating solution (A)) comes into contact with the support, and then drying and curing.

The simultaneous coating (multilayer coating) can be performed by a coating method using, e.g., an extrusion die coater or a curtain flow coater. After simultaneous coating, the coated layer is dried generally at 40 to 150° C. for 0.5 to 10 minutes, and preferably at 40 to 100° C. for 0.5 to 5 minutes.

When the simultaneous coating (multilayer coating) is performed with, e.g., an extrusion die coater, two coating solutions discharged at the same time are multilayer-formed by the discharge port of the extrusion die coater, i.e., before being coated on the support, and two coating solutions are coated on the support in that state. Since the coating solutions for two layers multilayered before coating are already susceptible to crosslinking reaction at the interface of two solutions when they are transferred to the support, two solutions to be discharged are liable to be mixed and tackified by the discharge port of the extrusion die coater, and sometimes coating operation is hindered. Accordingly, when simultaneous coating is performed as above, it is preferred to perform triple layer coating by intervening a barrier layer coating solution (an intermediate layer coating solution) between the coloring material-receiving layer coating solution (coating solution (A)) and the mordant solution (coating solution (B)).

The barrier layer coating solution can be selected with no limitation. For example, an aqueous solution containing a trace amount of water-soluble resin, and water can be used as the barrier layer coating solution. The water-soluble resin is used for the purpose of tackifier taking the coating properties into consideration, and polymers, e.g., cellulose series resins (e.g., hydroxypropylmethyl cellulose, methyl cellulose, and hydroxyethylmethyl cellulose), polyvinyl pyrrolidone and gelatin are exemplified. The mordant may be added to the barrier layer.

After a coloring material-receiving layer is formed on a support, surface smoothness, glossiness, transparency and film strength of the coloring material-receiving layer can be improved by, e.g., subjecting the coloring material-receiving layer to calendering treatment by using calender and gloss calender and passing through roll nips with heating under pressure. However, calendering treatment sometimes causes the reduction of a void ratio (that is, there are cases where ink absorption lowers), therefore, it is necessary to select conditions bringing about less void ratio reduction.

The roll temperature at calendering treatment is preferably from 30 to 150° C., and more preferably from 40 to 100° C.

The linear pressure between rolls at calendering treatment is preferably from 50 to 400 kg/cm, and more preferably from 100 to 200 kg/cm.

Since it is necessary for a coloring material-receiving layer to have sufficient absorption capacity capable of absorbing all the droplets in the case of ink jet recording, the layer thickness has to be decided in relation to the void ratio in the layer. For example, in the case where the ink amount is 8 nL/mm$^2$ and the void ratio is 60%, the layer thickness is necessary to be 15 µm or higher.

Considering this point, the layer thickness of a coloring material-receiving layer in the case of ink jet recording is preferably from 10 to 50 µm.

The pore diameter of a coloring material-receiving layer is preferably from 0.005 to 0.030 µm, and more preferably from 0.01 to 0.025 µm, in median diameter.

The void ratio and the median diameter of pores can be measured with a mercury porosimeter (Pore Sizer-9320-PC2, a trade name, manufactured by Shimadzu Corporation).

It is preferred that a coloring material-receiving layer be excellent in transparency. As the criterion of transparency, a haze value of a coloring material-receiving layer formed on a transparent support is preferably 30% or less, and more preferably 20% or less.

The haze value can be measured with a haze meter (HGM-2DP, manufactured by Suga Test Instruments Co., Ltd.).

Polymer fine particle dispersion may be added to the constitutional layer (e.g., a coloring material-receiving layer or a back coat layer) of a sheet for ink jet recording in the present invention. This polymer fine particle dispersion is used for the purpose of improving the physical properties of films, e.g., dimensional stability, curling prevention, adhesion prevention, prevention of cracking of films. Polymer fine particle dispersions are disclosed in JP-A-62-245258, JP-A-62-1316648 and JP-A-62-110066. When polymer fine particle dispersion having a low glass transition temperature (40° C. or lower) is added to layers containing a mordant, cracking and curling of the layers can be prevented from occurring. When polymer fine particle dispersion having a high glass transition temperature is added to a back coat layer, curling of the layer can be prevented, also.

A sheet for ink jet recording in the invention can also be manufactured by the methods disclosed in JP-A-10-81064, JP-A-10-119423, JP-A-10-157277, JP-A-10-217601, JP-A-11-348409, JP-A-2001-138621, JP-A-2000-43401, JP-A-2000-211235, JP-A-2000-309157, JP-A-2001-96897, JP-A-2001-138627, JP-A-11-91242, JP-A-8-2087, JP-A-8-2090, JP-A-8-2091, and JP-A-8-2093.

The ink and ink for ink jet recording, the concentrated ink composition, the method for manufacturing an ink for ink jet recording, and the ink jet recording method of the present invention are described in detail below.

As particularly preferred embodiment of the present invention, concentrated ink which is highly concentrated to reduce the volume, in which a compound represented by formula (1) is contained to increase the concentration of the dye and the pigment in the ink, can be exemplified.

When the present invention is applied to concentrated ink, a compound represented by formula (1) is contained in concentrated ink in an amount of from 0.001 to 30 wt %, preferably from 0.01 to 10 wt %, and more preferably from 0.1 to 5 wt %, to thereby increase the concentration of a dye and/or a pigment. The concentration of a dye and/or a pigment in concentrated ink is from 0.01 to 50 wt %, preferably from 0.1 to 20 wt %, and more preferably from 0.5 to 20 wt %.

Even when the concentration of a dye and/or a pigment is high, the stability of ink is maintained with no hindrance in practical use by the presence of a compound represented by formula (1).

For preparing ink for ink jet recording in usable state from concentrated ink, the concentrated ink is diluted so that the concentration of the dye and/or the pigment becomes the density of working state. Water or liquid obtained by excluding the dye, the pigment and one or more other components from the ink composition is used for dilution.

Ink for ink jet recording in the present invention comprises a colorant dissolved in water or an organic solvent, and the colorant is contained in an amount of preferably from 0.2 to 20 wt %, and more preferably from 0.5 to 15 wt %. When two kinds of inks having the same hue and different dye densities, e.g., light cyan ink and cyan ink, are used in combination in an ink set, the dye density by weight of the low density ink to the high density ink is from $\frac{1}{20}$ to $\frac{1}{2}$, and preferably from $\frac{1}{10}$ to $\frac{3}{7}$.

Ink for use in the present invention comprises a dye or a pigment dispersed in water or an organic solvent. The ink is preferably a water-soluble ink comprising a water-soluble dye.

One kind or a plurality of dyestuffs are used in ink and an ink set in the present invention according to the purpose and function of each constitutional ink for adjusting the tone of a full color image. The dyestuffs which can be used are shown below. In the specification of the present invention, the terminology "dyestuff" is used in the case where both of dye and pigment are meant and the case where it is not necessary to distinguish dye from pigment.

As the examples of yellow dyestuffs, aryl or heterylazo dyestuffs having, as the coupling component, e.g., phenols, naphthols, anilines, pyrazolones, pyridones, or open chain type active methylene compounds; azomethine dyestuffs having, as the coupling component, e.g., an open chain type active methylene compound; methine dyestuffs, e.g., a benzylidene dyestuff and a monomethine oxonol dyestuff; and quinone dyestuffs, e.g., a naphthoquinone dyestuff and an anthraquinone dyestuff, are exemplified. Besides these dyestuffs, quinophthalone dyestuffs, nitro nitroso dyestuffs, acridine dyestuffs and acridinone dyestuffs can be exemplified. These dyestuffs may be dyestuffs which develop yellow color after a part of the chromophore is dissociated. In such a case, the counter cation may be an inorganic cation such as alkali metal and ammonium, may be an organic cation such as pyridinium and a quaternary ammonium salt, or may be a polymer cation having these cations as the partial structure.

As the examples of magenta dyestuffs, aryl and heterylazo dyestuffs having, as the coupling component, e.g., phenols, naphthols or anilines; azomethine dyestuffs having, as the coupling component, e.g., pyrazolones or pyrazolotriazoles; methine dyestuffs, e.g., an arylidene dyestuff, a styryl dyestuff, a merocyanine dyestuff, and an oxonol dyestuff; carbonium dyestuffs, e.g., a diphenylmethane dyestuff, a triphenylmethane dyestuff and a xanthene dyestuff; quinone dyestuffs, e.g., a naphthoquinone dyestuff, an anthraquinone dyestuff and an anthrapyridone dyestuff; and condensed polycyclic dyestuffs, e.g., a dioxazine dyestuff, are exemplified. These dyestuffs may be dyestuffs which develop magenta color after a part of the chromophore is dissociated. In such a case, the counter cation may be an inorganic cation such as alkali metal and ammonium, may be an organic cation such as pyridinium and a quaternary ammonium salt, or may be a polymer cation having these cations as the partial structure.

As the examples of cyan dyestuffs, azomethine dyestuffs, e.g., an indoaniline dyestuff and an indophenol dyestuff; polymethine dyestuffs, e.g., a cyanine dyestuff, an oxonol dyestuff and a merocyanine dyestuff; carbonium dyestuffs, e.g., a diphenylmethane dyestuff, a triphenylmethane dyestuff and a xanthene dyestuff; phthalocyanine dyestuffs; anthraquinone dyestuffs; aryl and heterylazo dyestuffs having, as the coupling component, e.g., phenols, naphthols or anilines; and indigo-thioindigo dyestuffs are exemplified. These dyestuffs may be dyestuffs which develop cyan color after a part of the chromophore is dissociated. In such a case, the counter cation may be an inorganic cation such as alkali metal and ammonium, may be an organic cation such as pyridinium and a quaternary ammonium salt, or may be a polymer cation having these cations as the partial structure.

A black dyestuff such as a polyazo dyestuff can also be used.

As water-soluble dyes, direct dyes, acid dyes, food dyes, basic dyes and reactive dyes are exemplified. The preferred examples of these dyes are shown below.

C.I. Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 21, 223, 224, 225, 226, 227, 232, 233, 240, 241, 242, 243, 247;

C.I. Direct Violet 7, 9, 47, 48, 51, 66, 90, 93, 94, 95, 98, 100, 101;

C.I. Direct Yellow 8, 9, 11, 12, 27, 28, 29, 33, 35, 39, 41, 44, 50, 53, 58, 59, 68, 86, 87, 93, 95, 96, 98, 100, 106, 108, 109, 110, 130, 132, 142, 144, 161, 163;

C.I. Direct Blue 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289, 291;

C.I. Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173, 199;

C.I. Acid Red 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396, 397;

C.I. Acid Violet 5, 34, 43, 47, 48, 90, 103, 126;

C.I. Acid Yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222, 227;

C.I. Acid Blue 9, 25, 40, 41, 62, 72, 76, 78, 80, 82, 92, 106, 112, 113, 120, 127:1, 129, 138, 143, 175, 181, 205, 207, 220, 221, 230, 232, 247, 258, 260, 264, 271, 277, 278, 279, 280, 288, 290, 326;

C.I. Acid Black 7, 24, 29, 48, 52:1, 172;

C.I. Reactive Red 3, 13, 17, 19, 21, 22, 23, 24, 29, 35, 37, 40, 41, 43, 45, 49, 55;

C.I. Reactive Violet 1, 3, 4, 5, 6, 7, 8, 9, 16, 17, 22, 23, 24, 26, 27, 33, 34;

C.I. Reactive Yellow 2, 3, 13, 14, 15, 17, 18, 23, 24, 25, 26, 27, 29, 35, 37, 41, 42;

C.I. Reactive Blue 2, 3, 5, 8, 10, 13, 14, 15, 17, 18, 19, 21, 25, 26, 27, 28, 29, 38;

C.I. Reactive Black 4, 5, 8, 14, 21, 23, 26, 31, 32, 34;

C.I. Basic Red 12, 13, 14, 15, 18, 22, 23, 24, 25, 27, 29, 35, 36, 38, 39, 45, 46;

C.I. Basic Violet 1, 2, 3, 7, 10, 15, 16, 20, 21, 25, 27, 28, 35, 37, 39, 40, 48;

C.I. Basic Yellow 1, 2, 4, 11, 13, 14, 15, 19, 21, 23, 24, 25, 28, 29, 32, 36, 39, 40;

C.I. Basic Blue 1, 3, 5, 7, 9, 22, 26, 41, 45, 46, 47, 54, 57, 60, 62, 65, 66, 69, 71; and C.I. Basic Black 8.

Pigments may be used in the ink of the present invention. In addition to commercially available pigments, well-known pigments described in various literature can be used. The pigments described, e.g., in The Society of Dyers and Colourists compiled, *Color Index*, Nippon Ganryo Gijutsu Kyokai compiled, *Kaitei Shinpan Ganryo Binran (Novel Pigment Handbook, Revised Edition)* (1989), *Saishin Ganryo Oyo Gijutsu (The Latest Applied Techniques of Pig-* ments), CMC Publishing Co. (1986), *Insatsu Ink Gijutsu* (*The techniques of Printing Inks*), CMC Publishing Co. (1984), and W. Herbst and K. Hunger, *Industrial Organic Pigments*, VCH Verlagsgesellschaft (1993) can be exemplified. Specifically, as organic pigments, such as azo pigments (e.g., azo lake pigments, insoluble azo pigments, condensed azo pigments, and chelate azo pigments), polycyclic pigments (e.g., phthalocyanine pigments, anthraquinone pigments, perylene and perinone pigments, indigo pigments, quinacridone pigments, dioxazine pigments, isoindolinone pigments, quinophthalone pigments, and diketopyrrolopyrrole pigments), dyed lake pigments (e.g., lake pigments of acid or basic dyes), and azine pigments, and as inorganic pigments, such as yellow pigments, e.g., C.I. Pigment Yellow 34, 37, 42 and 53, red pigments, e.g., C.I. Pigment Red 101 and 108, blue pigments, e.g., C.I. Pigment Blue 27, 29 and 17:1, black pigments, e.g., C.I. Pigment Black 7 and magnetite, and white pigments, e.g., C.I. Pigment White 4, 6, 18 and 21, can be exemplified.

As the pigments having preferred tone for image formation, with respect to blue or cyan pigments, phthalocyanine pigments, anthraquinone series indanthrone pigments (e.g., C.I. Pigment Blue 60), and triarylcarbonium pigments of dyed lake pigments are preferably used, and phthalocyanine pigments are most preferred (the preferred examples include copper phthalocyanine, e.g., C.I. Pigment Blue 15:1, 15:2, 15:3, 15:4 and 15:6, monochlorinated or low chlorinated copper phthalocyanine, pigments disclosed in EP 860475 as aluminum phthalocyanine, metal-free phthalocyanine C.I. Pigment Blue 16, and phthalocyanine having Zn, Ni or Ti as the central metal, and of these pigments, C.I. Pigment Blue 15:3 and 15:4 and aluminum phthalocyanine are especially preferred).

With respect to red or purple pigments, azo pigments (the preferred examples include C.I. Pigment Red 3, 5, 11, 22, 38, 48:1, 48:2, 48:3, 48:4, 49:1, 52:1, 53:1, 57:1, 63:2, 144, 146 and 184, above all, C.I. Pigment Red 57:1, 146 and 184 are preferred), quinacridone pigments (the preferred examples include C.I. Pigment Red 122, 192, 202, 207 and 209, C.I. Pigment Violet 19 and 42, above all, C.I. Pigment Red 122 is preferred), triarylcarbonium pigments of dyed lake series pigments (the preferred examples include xanthene series C.I. Pigment Red 81:1, C.I. Pigment Violet 1, 2, 3, 27 and 39), dioxazine pigments (e.g., C.I. Pigment Violet 23 and 37), diketopyrrolopyrrole pigments (e.g., C.I. Pigment Red 254), perylene pigments (e.g., C.I. Pigment Violet 29), anthraquinone pigments (e.g., C.I. Pigment Violet 5:1, 31 and 33), thioindigo pigments (e.g., C.I. Pigment Red 38 and 88) are preferably used.

With respect to yellow pigments, azo pigments (the preferred examples include monoazo pigment series C.I. Pigment Yellow 1, 3, 74 and 98, disazo pigment series C.I. Pigment Yellow 12, 13, 14, 16, 17 and 83, synthesis azo series C.I. Pigment Yellow 93, 94, 95, 128 and 155, and benzimidazolone series C.I. Pigment Yellow 120, 151, 154, 156 and 180, and pigments not using benzidine compounds as the starting material are preferred above all), isoindoline-isoindolinone pigments (the preferred examples include C.I. Pigment Yellow 109, 110, 137 and 139), quinophthalone pigments (the preferred example includes C.I. Pigment Yellow 138), and flavanthrone pigments (e.g., C.I. Pigment Yellow 24) are preferably used.

With respect to black pigments, inorganic pigments (the preferred examples include carbon black and magnetite), and aniline black are preferably used.

In addition to the above pigments, orange pigments (e.g., C.I. Pigment Orange 13 and 16) and green pigments (e.g., C.I. Pigment Green 7) may be used in the present invention.

The pigments which can be used in ink set in the present invention may be pigments having been subjected to no special treatment as described above or they may be surface-covered pigments. As the surface treating methods, a method of surface-coating with resins and waxes, a method of adhering surfactants to pigment surfaces, and a method of bonding reactive substances (e.g., silane coupling agents, epoxy compounds, polyisocyanate, or radicals generated from diazonium salts) to pigment surfaces. These methods are described in the following literature and patent specifications.

(1) *Kinzoku-Sekken no Seishitsu to Oyo* (*Properties and Applications of Metal Soaps*), Saiwai Shobo Co.
(2) *Insatsu-Ink Insatsu* (*Printing of Printing Inks*), CMC Publishing Co. (1984)
(3) *Saishin Ganryo Oyo Gijutsu* (*The Latest Applied Techniques of Pigments*), CMC Publishing Co. (1986)
(4) U.S. Pat. Nos. 5,554,739 and 5,571,311
(5) JP-A-9-151342 (the term "JP-A" as used herein means an "unexamined published Japanese patent application"), JP-A-10-140065, JP-A-10-292143 and JP-A-11-166145

In particular, self-dispersible pigments prepared by making the diazonium salts disclosed in U.S. patents in (4) act on carbon black, and encapsulated pigments prepared by the methods disclosed in JP-A in (5) are particularly useful, since dispersion stability can be obtained without using an extra dispersant in inks.

In the ink of the present invention, pigments may be further dispersed with a dispersant. A variety of well-known dispersants, e.g., low molecular weight dispersants and high molecular weight dispersants of a surfactant type, can be used in accordance with the pigment to be used. The examples of dispersants are disclosed in JP-A-3-69949 and EP 549486. When a dispersant is used, a pigment derivative called a synergist may be added together to accelerate the adsorption of the dispersant onto the pigment.

The particle size of the pigments which can be used in the ink of the present invention is preferably from 0.01 to 10 μm after dispersion, and more preferably from 0.05 to 1 μm.

Well-know dispersing methods used in the manufacture of inks and toners can be used as the dispersing methods of pigments. The examples of dispersing apparatus include a vertical or horizontal agitator mill, an attritor, a colloid mill, a ball mill, a three-roll mill, a pearl mill, a super-mill, an impeller, a disperser, a KD mill, a dynatron, and a pressure kneader. These dispersing apparatus are described in detail in *Saishin Ganryo Oyo Gijutsu* (*The Latest Applied Techniques of Pigments*), CMC Publishing Co. (1986).

As the dye which can be preferably used in magenta and light magenta, or dark yellow ink of the ink for ink jet recording of the present invention and is effective in image fastness and the maintenance of color balance, an azo dye represented by the following formula (1) having an aromatic nitrogen-containing 6-membered heterocyclic ring as the coupling component is exemplified.

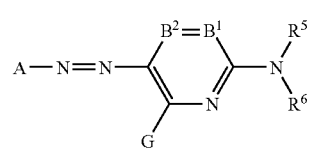

In formula (1), A represents a 5-membered heterocyclic group.

$B^1$ and $B^2$ respectively represent $=CR^1-$ and $-CR^2=$, or either one represents a nitrogen atom and the other represents $=CR^1-$ or $-CR^2=$, $R^5$ and $R^6$ each represents a hydrogen atom or a substituent, the substituent represents an aliphatic group, an aromatic group, a heterocyclic group, an acyl group, an alkoxycarbonyl group, an aryloxycarbonyl group, a carbamoyl group, an alkylsulfonyl group, an arylsulfonyl group, or a sulfamoyl group, and the hydrogen atom of each substituent may be substituted.

G, $R^1$ and $R_2$ each represents a hydrogen atom or a substituent, the substituent represents a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxyl group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group, or a sulfo group, and the hydrogen atom of each substituent may be substituted.

$R^1$ and $R^5$, or $R^5$ and $R^6$ may be bonded to form a 5- or 6-membered ring.

A compound represented by formula (1) is described below in further detail.

In formula (1), A represents a 5-membered heterocyclic group. N, O and S can be exemplified as the hetero atoms of the heterocyclic ring of the heterocyclic group. The 5-membered heterocyclic group is preferably a nitrogen-containing 5-membered heterocyclic group, and an aliphatic ring, an aromatic ring or other heterocyclic ring may be condensed with the heterocyclic ring. As the preferred examples of the heterocyclic rings represented by A, a pyrazole ring, an imidazole ring, a thiazole ring, an isothiazole ring, a thiadiazole ring, a benzothiazole ring, a benzoxazole ring and a benzisothiazole ring can be exemplified. Each heterocyclic group may further have a substituent. Of these, a pyrazole ring, an imidazole ring, an isothiazole ring, a thiadiazole ring, and a benzothiazole ring represented by formula (a), (b), (c), (d), (e) or (f) are preferred.

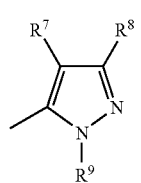

(a)

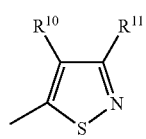

(b)

-continued

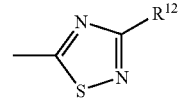

(c)

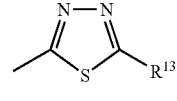

(d)

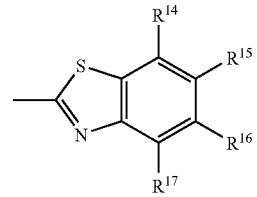

(e)

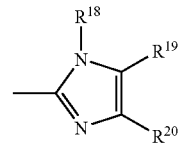

(f)

In formulae (a) to (f), $R^7$ to $R^{20}$ each represents the same substituents as G, $R^1$ and $R^2$ in formula (1).

Of formulae (a) to (f), a pyrazole ring represented by formula (a) and an isothiazole ring represented by formula (b) are preferred, and a pyrazole ring represented by formula (a) is most preferred.

In formula (1), $B^1$ and $B^2$ respectively represent $=CR^1-$ and $-CR^2=$, or either one represents a nitrogen atom and the other represents $=CR^1-$ or $-CR^2=$, and more preferably $B^1$ and $B^2$ respectively represent $=CR^1-$ and $-CR^2=$.

$R^5$ and $R^6$ each represents a hydrogen atom or a substituent, the substituent represents an aliphatic group, an aromatic group, a heterocyclic group, an acyl group, an alkoxycarbonyl group, an aryloxycarbonyl group, a carbamoyl group, an alkylsulfonyl group, an arylsulfonyl group, or a sulfamoyl group, and the hydrogen atom of each substituent may be substituted.

$R^5$ and $R^6$ each preferably represents a hydrogen atom, an aliphatic group, an aromatic group, a heterocyclic group, an acyl group, an alkylsulfonyl group, or an arylsulfonyl group, more preferably a hydrogen atom, an aromatic group, a heterocyclic group, an acyl group, an alkylsulfonyl group, or an arylsulfonyl group, and most preferably a hydrogen atom, an aryl group or a heterocyclic group. The hydrogen atom of each substituent may be substituted, provided that $R^5$ and $R^6$ do not represent a hydrogen atom at the same time.

G, $R^1$ and $R_2$ each represents a hydrogen atom or a substituent, the substituent represents a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxyl group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group, or a sulfo group, and the hydrogen atom of each substituent may be substituted.

G preferably represents a hydrogen atom, a halogen atom, an aliphatic group, an aromatic group, a hydroxyl group, an alkoxyl group, an aryloxy group, an acyloxy group, a heterocyclic oxy group, an amino group, an acylamino group, a ureido group, a sulfamoylamino group, an alkoxycarbonylamino group, an aryloxycarbonylamino group, an alkylthio group, an arylthio group, or a heterocyclic thio group, more preferably a hydrogen atom, a halogen atom, an alkyl group, a hydroxyl group, an alkoxyl group, an aryloxy group, an acyloxy group, an amino group, or an acylamino group, and most preferably a hydrogen atom, an amino group (preferably an anilino group), or an acylamino group, and the hydrogen atom of each substituent may be substituted.

$R^1$ and $R_2$ each preferably represents a hydrogen atom, an alkyl group, a halogen atom, an alkoxycarbonyl group, a carboxyl group, a carbamoyl group, a hydroxyl group, an alkoxyl group, or a cyano group, and the hydrogen atom of each substituent may be substituted.

$R^1$ and $R^5$, or $R^5$ and $R^6$ may be bonded to form a 5- or 6-membered ring.

When A has a substituent, or the substituents represented by $R^1$, $R^2$, $R^5$, $R^6$ or G further have substituents, the substituents described in G, $R^1$ and $R^2$ are exemplified as the examples of these substituents.

When a dye represented by formula (1) is a water-soluble dye, it is preferred that an ionic hydrophilic group is substituted anywhere on A, $R^1$, $R^2$, $R^5$, $R^6$ and G. The ionic hydrophilic group as the substituent includes a sulfo group, a carboxyl group, a phosphono group and a quaternary ammonium group. As the ionic hydrophilic group, a carboxyl group, a phosphono group and a sulfo group are preferred, and a carboxyl group and a sulfo group are particularly preferred. The carboxyl group, phosphono group and sulfo group may be in the state of a salt, and the examples of the counter ions for forming the salts include an ammonium ion, an alkali metal ion (e.g., a lithium ion, a sodium ion and a potassium ion), and an organic cation (a tetramethylammonium ion, a tetramethylguanidium ion and a tetramethylsulfonium ion).

The substituents used in formula (1) are described in detail below. The meaning of each substituent in formula (1) is common to formula (2), between different marks, too.

As the halogen atom, a fluorine ion, a chlorine ion and a bromine ion are exemplified.

The aliphatic group means an alkyl group, a substituted alkyl group, an alkenyl group, a substituted alkenyl group, an alkynyl group, a substituted alkynyl group, an aralkyl group and a substituted aralkyl group. In the specification of the invention, "substituted" used, e.g., in "substituted alkyl group" means that the hydrogen atom in the "alkyl group" is substituted with a substituent exemplified in G, $R^1$ and $R^2$.

The aliphatic group may be branched or may form a ring. The aliphatic group preferably has from 1 to 20 carbon atoms, and more preferably from 1 to 16. The aryl moiety of the aralkyl group and the substituted aralkyl group is preferably a phenyl group or a naphthyl group, and particularly preferably a phenyl group. The examples of the aliphatic groups include a methyl group, an ethyl group, a butyl group, an isopropyl group, a t-butyl group, a hydroxyethyl group, a methoxyethyl group, a cyanoethyl group, a trifluoromethyl group, a 3-sulfopropyl group, a 4-sulfobutyl group, a cyclohexyl group, a benzyl group, a 2-phenethyl group, a vinyl group and an allyl group.

The aromatic group means an aryl group and a substituted aryl group. The aryl group is preferably a phenyl group or a naphthyl group, and particularly preferably a phenyl group. The aromatic group preferably has from 6 to 20 carbon atoms, and more preferably from 6 to 16.

The examples of the aromatic groups include a phenyl group, a p-tolyl group, a p-methoxyphenyl group, an o-chlorophenyl group and an m-(3-sulfopropylamino)phenyl group.

The heterocyclic group includes a substituted heterocyclic group. An aliphatic ring, an aromatic ring or other heterocyclic ring may be condensed with the heterocyclic ring of the heterocyclic group. The heterocyclic group is preferably a 5- or 6-membered heterocyclic group. The examples of the substituents include an aliphatic group, a halogen atom, an alkylsulfonyl group, an arylsulfonyl group, an acyl group, an acylamino group, a sulfamoyl group, a carbamoyl group, and an ionic hydrophilic group. The examples of the heterocyclic groups include a 2-pyridyl group, a 2-thienyl group, a 2-thiazolyl group, a 2-benzothiazolyl group, a 2-benzoxazolyl group, and a 2-furyl group.

The carbamoyl group includes a substituted carbamoyl group. The examples of the substituents include an alkyl group. The examples of the carbamoyl group include a methylcarbamoyl group and a dimethylcarbamoyl group.

The alkoxycarbonyl group includes a substituted alkoxycarbonyl group. The alkoxycarbonyl group is preferably an alkoxycarbonyl group having from 2 to 20 carbon atoms. The examples of the substituents include an ionic hydrophilic group. The examples of the alkoxycarbonyl groups include a methoxycarbonyl group and an ethoxycarbonyl group.

The aryloxycarbonyl group includes a substituted aryloxycarbonyl group. The aryloxycarbonyl group is preferably an aryloxycarbonyl group having from 7 to 20 carbon atoms. The examples of the substituents include an ionic hydrophilic group. The examples of the aryloxycarbonyl groups include a phenoxycarbonyl group.

The heterocyclic oxycarbonyl group includes a substituted heterocyclic oxycarbonyl group. As the examples of the heterocyclic rings, the heterocyclic rings described in the above heterocyclic group can be exemplified. The heterocyclic oxycarbonyl group is preferably a heterocyclic oxycarbonyl group having from 2 to 20 carbon atoms. The examples of the substituents include an ionic hydrophilic group. The examples of the heterocyclic oxycarbonyl groups include a 2-pyridyloxycarbonyl group.

The acyl group includes a substituted acyl group. The acyl group is preferably an acyl group having from 1 to 20 carbon atoms. The examples of the substituents include an ionic hydrophilic group. The examples of the acyl groups include an acetyl group and a benzoyl group.

The alkoxyl group includes a substituted alkoxyl group. The alkoxyl group is preferably an alkoxyl group having from 1 to 20 carbon atoms. The examples of the substituents include an alkoxyl group, a hydroxyl group, and an ionic hydrophilic group. The examples of the alkoxyl groups include a methoxy group, an ethoxy group, an isopropoxy group, a methoxyethoxy group, a hydroxyethoxy group, and a 3-carboxypropoxy group.

The aryloxy group includes a substituted aryloxy group. The aryloxy group is preferably an aryloxy group having from 6 to 20 carbon atoms. The examples of the substituents include an alkoxyl group and an ionic hydrophilic group.

The examples of the aryloxy groups include a phenoxy group, a p-methoxyphenoxy group and an o-methoxyphenoxy group.

The heterocyclic oxy group includes a substituted heterocyclic oxy group. As the examples of the heterocyclic rings, the heterocyclic rings described in the above heterocyclic group can be exemplified. The heterocyclic oxy group is preferably a heterocyclic oxy group having from 2 to 20 carbon atoms. The examples of the substituents include an alkyl group, an alkoxyl group and an ionic hydrophilic group. The examples of the heterocyclic oxy groups include a 3-pyridyloxy group and a 3-thienyloxy group.

The silyloxy group is preferably a silyloxy group having from 1 to 20 carbon atoms substituted with an aliphatic group or an aromatic group. The silyloxy group includes a trimethylsilyloxy group and a diphenylmethylsilyloxy group.

The acyloxy group includes a substituted acyloxy group. The acyloxy group is preferably an acyloxy group having from 1 to 20 carbon atoms. The examples of the substituents include an ionic hydrophilic group. The examples of the acyloxy groups include an acetoxy group and a benzoyloxy group.

The carbamoyloxy group includes a substituted carbamoyloxy group. The examples of the substituents include an alkyl group. The examples of the carbamoyloxy groups include an N-methylcarbamoyloxy group.

The alkoxycarbonyloxy group includes a substituted alkoxycarbonyloxy group. The alkoxycarbonyloxy group is preferably an alkoxycarbonyloxy group having from 2 to 20 carbon atoms. The examples of the alkoxycarbonyloxy groups include a methoxycarbonyloxy group and an isopropoxycarbonyloxy group.

The aryloxycarbonyloxy group includes a substituted aryloxycarbonyloxy group. The aryloxycarbonyloxy group is preferably an aryloxycarbonyloxy group having from 7 to 20 carbon atoms. The examples of the aryloxycarbonyloxy groups include a phenoxycarbonyloxy group.

The amino group includes a substituted amino group. The examples of the substituents include an alkyl group, an aryl group and a heterocyclic group. Each of the alkyl group, aryl group and heterocyclic group may further have a substituent. The alkylamino group includes a substituted alkylamino group. The alkylamino group is preferably an alkylamino group having from 1 to 20 carbon atoms. The examples of the substituents include an ionic hydrophilic group. The examples of the alkylamino groups include a methylamino group and a diethylamino group.

The arylamino group includes a substituted arylamino group. The arylamino group is preferably an arylamino group having from 6 to 20 carbon atoms. The examples of the substituents include a halogen atom and an ionic hydrophilic group. The examples of the arylamino groups include a phenylamino group and a 2-chlorophenylamino group.

The heterocyclic amino group includes a substituted heterocyclic amino group. As the examples of the heterocyclic rings, the heterocyclic rings described in the above heterocyclic group can be exemplified. The heterocyclic amino group is preferably a heterocyclic amino group having from 2 to 20 carbon atoms. The examples of the substituents include an alkyl group, a halogen atom and an ionic hydrophilic group.

The acylamino group includes a substituted acylamino group. The acylamino group is preferably an acylamino group having from 2 to 20 carbon atoms. The examples of the substituents include an ionic hydrophilic group. The examples of the acylamino groups include an acetylamino group, a propionylamino group, a benzoylamino group, an N-phenylacetylamino group and a 3,5-disulfobenzoylamino group.

The ureido group includes a substituted ureido group. The ureido group is preferably a ureido group having from 1 to 20 carbon atoms. The examples of the substituents include an alkyl group and an aryl group. The examples of the ureido groups include a 3-methylureido group, a 3,3-dimethylureido group and a 3-phenylureido group.

The sulfamoylamino group includes a substituted sulfamoylamino group. The examples of the substituents include an alkyl group. The examples of the sulfamoylamino groups include an N,N-dipropylsulfamoylamino group.

The alkoxycarbonylamino group includes a substituted alkoxycarbonylamino group. The alkoxycarbonylamino group is preferably an alkoxycarbonylamino group having from 2 to 20 carbon atoms. The examples of the substituents include an ionic hydrophilic group. The examples of the alkoxycarbonylamino groups include an ethoxycarbonylamino group.

The aryloxycarbonylamino group includes a substituted aryloxycarbonylamino group. The aryloxycarbonylamino group is preferably an aryloxycarbonylamino group having from 7 to 20 carbon atoms. The examples of the substituents include an ionic hydrophilic group. The examples of the aryloxycarbonylamino groups include a phenoxycarbonylamino group.

The alkylsulfonylamino group and the arylsulfonylamino group include a substituted alkylsulfonylamino group and a substituted arylsulfonylamino group. The alkylsulfonylamino group and the arylsulfonylamino group are preferably an alkylsulfonylamino group and an arylsulfonylamino group each having from 1 to 20 carbon atoms. The examples of the substituents include an ionic hydrophilic group. The examples of the alkylsulfonylamino groups and the arylsulfonylamino groups include a methylsulfonylamino group, an N-phenylmethylsulfonylamino group, a phenylsulfonylamino group, and a 3-carboxyphenylsulfonylamino group.

The heterocyclic sulfonylamino group includes a substituted heterocyclic sulfonylamino group. As the examples of the heterocyclic rings, the heterocyclic rings described in the above heterocyclic group can be exemplified. The heterocyclic sulfonylamino group is preferably a heterocyclic sulfonylamino group having from 1 to 12 carbon atoms. The examples of the substituents include an ionic hydrophilic group. The examples of the heterocyclic sulfonylamino groups include a 2-thienylsulfonylamino group and a 3-pyridylsulfonylamino group.

The alkylthio group, the arylthio group and the heterocyclic thio group include a substituted alkylthio group, a substituted arylthio group and a substituted heterocyclic thio group. As the examples of the heterocyclic rings, the heterocyclic rings described in the above heterocyclic group can be exemplified. The alkylthio group, the arylthio group and the heterocyclic thio group are preferably an alkylthio group, an arylthio group and a heterocyclic thio group each having from 1 to 20 carbon atoms. The examples of the substituents include an ionic hydrophilic group. The examples of the alkylthio groups, the arylthio groups and the heterocyclic thio groups include a methylthio group, a phenylthio group, and a 2-pyridylthio group.

The alkylsulfonyl group and the arylsulfonyl group include a substituted alkylsulfonyl group and a substituted arylsulfonyl group. The examples of the alkylsulfonyl groups and the arylsulfonyl groups include a methylsulfonyl group and a phenylsulfonyl group, respectively.

The heterocyclic sulfonyl group includes a substituted heterocyclic sulfonyl group. As the examples of the heterocyclic rings, the heterocyclic rings described in the above heterocyclic group can be exemplified. The heterocyclic sulfonyl group is preferably a heterocyclic sulfonyl group having from 1 to 20 carbon atoms. The examples of the substituents include an ionic hydrophilic group. The examples of the heterocyclic sulfonyl groups include a 2-thienylsulfonyl group and a 3-pyridylsulfonyl group.

The alkylsulfinyl group and the arylsulfinyl group include a substituted alkylsulfinyl group and a substituted arylsulfinyl group. The examples of the alkylsulfinyl groups and the arylsulfinyl groups include a methylsulfinyl group and a phenylsulfinyl group, respectively.

The heterocyclic sulfinyl group includes a substituted heterocyclic sulfinyl group. As the examples of the heterocyclic rings, the heterocyclic rings described in the above heterocyclic group can be exemplified. The heterocyclic sulfinyl group is preferably a heterocyclic sulfinyl group having from 1 to 20 carbon atoms. The examples of the substituents include an ionic hydrophilic group. The examples of the heterocyclic sulfinyl groups include a 4-pyridylsulfinyl group.

The sulfamoyl group includes a substituted sulfamoyl group. The examples of the substituents include an alkyl group. The examples of the sulfamoyl groups include a dimethylsulfamoyl group and a di(2-hydroxyethyl)sulfamoyl group.

A dye represented by formula (1) for use in the ink of the invention is particularly preferably represented by the following formula (2).

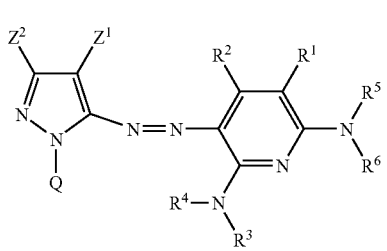

(2)

In formula (2), $R^1$, $R^2$, $R^5$ and $R^6$ each has the same meaning as in formula (1).

$R^3$ and $R_4$ each represents a hydrogen atom or a substituent, and the substituent represents an aliphatic group, an aromatic group, a heterocyclic group, an acyl group, an alkoxycarbonyl group, an aryloxycarbonyl group, a carbamoyl group, an alkylsulfonyl group, an arylsulfonyl group, or a sulfamoyl group. Of these groups, a hydrogen atom, an aromatic group, a heterocyclic group, an acyl group, an alkylsulfonyl group and an arylsulfonyl group are preferred, and a hydrogen atom, an aromatic group, a heterocyclic group are particularly preferred.

$Z^1$ represents an electron attractive group having Hammett's substitution constant σp value of 0.20 or higher. $Z^1$ is preferably an electron attractive group having a σp value of 0.30 or higher, more preferably an electron attractive group of 0.45 or higher, and particularly preferably an electron attractive group of 0.60 or higher but preferably not higher than 1.0. The preferred specific examples of the substituents are the later-described electron attractive substituents, and an acyl group having from 2 to 20 carbon atoms, an alkyloxycarbonyl group having from 2 to 20 carbon atoms, a nitro group, a cyano group, an alkylsulfonyl group having from 1 to 20 carbon atoms, an arylsulfonyl group having from 6 to 20 carbon atoms, a carbamoyl group having from 1 to 20 carbon atoms, and an alkyl halide having from 1 to 20 carbon atoms are preferred, a cyano group, an alkylsulfonyl group having from 1 to 20 carbon atoms, and an arylsulfonyl group having from 6 to 20 carbon atoms are particularly preferred, and a cyano group is most preferred.

$Z^2$ represents a hydrogen atom or a substituent, and the substituent represents an aliphatic group, an aromatic group, or a heterocyclic group. $Z^2$ preferably represents an aliphatic group, and more preferably an alkyl group having from 1 to 6 carbon atoms.

Q represents a hydrogen atom or a substituent, and the substituent represents an aliphatic group, an aromatic group, or a heterocyclic group, and preferably a group of non-metal atom necessary to form 5- to 8-membered rings. The 5- to 8-membered rings may be substituted, may be saturated rings, or may have an unsaturated bond. An aromatic group and a heterocyclic group are particularly preferred. The preferred examples of the non-metal atoms include a nitrogen atom, an oxygen atom, a sulfur atom or a carbon atom. The specific examples of such cyclic structures include, e.g., a benzene ring, a cyclopentane ring, a cyclohexane ring, a cycloheptane ring, a cyclooctane ring, a cyclohexene ring, a pyridine ring, a pyrimidine ring, a piperazine ring, a pyridazine ring, a triazine ring, an imidazole ring, a benzimidazole ring, an oxazole ring, a benzoxazole ring, a thiazole ring, a benzothiazole ring, an oxan ring, a sulforan ring and a thian ring.

The hydrogen atom of each substituent described in formula (2) maybe substituted. The examples of the substituents include the substituents described in formula (1), the substituents described in G, $R^1$ and $R^2$, and an ionic hydrophilic group.

A Hammett's substitution constant σp value described in this specification is explained below. Hammett's rule is a rule of thumb suggested by L. P. Hammett in 1935 to quantitatively discuss the influence of a substituent on the reaction or equilibrium of a benzene derivative, and the appropriateness of the rule is now widely recognized. There are substitution constant σp value and σm value obtained by Hammett's rule, and these values can be found in a large literature, e.g., J. A. Dean compiled, *Lange's Handbook of Chemistry*, 12th Ed., McGraw Hill (1979), and *Kagaku no Ryoiki* (*The Domain of Chemistry*), Extra Issue, No. 122, pp. 96 to 103, Mankodo (1979). In the present invention, each substituent is restricted or explained by Hammett's substitution constant σp, but it does not mean that an already-known value is limited to only a certain substituent. It is a matter of course that even if a value is unknown, a substituent whose value will be included in that range when measured on the basis of Hammett's rule is also included. Compounds which are not benzene derivatives are also included in formula (2) of the invention, but σp value is used regardless of the substitution position as the criterion showing the electron effect of substituents. σp Value is used in such a mean in the present invention.

As the electron attractive groups having Hammett's substitution constant σp value of 0.60 or higher, a cyano group, a nitro group, an alkylsulfonyl group (e.g., a methylsulfonyl group), and an arylsulfonyl group (e.g., a phenylsulfonyl group) can be exemplified.

As the electron attractive groups having Hammett's substitution constant σp value of 0.45 or higher, in addition to the above groups, acyl group (e.g., an acetyl group), an alkoxycarbonyl group (e.g., dodecyloxycarbonyl group), an aryloxycarbonyl group (e.g., an m-chlorophenoxycarbonyl group), an alkylsulfinyl group (e.g., an n-propylsulfinyl group), an arylsulfinyl group (e.g., a phenylsulfinyl group), a sulfamoyl group (e.g., an N-ethylsulfamoyl group and an N,N-dimethylsulfamoyl group), and an alkyl halide group (e.g., a trifluoromethyl group) can be exemplified.

As the electron attractive groups having Hammett's substitution constant σp value of 0.30 or higher, in addition to the above groups, an acyloxy group (e.g., an acetoxy group), a carbamoyl group (e.g., an N-ethylcarbamoyl group and N,N-dibutylcarbamoyl group), an alkoxyl halide group (e.g., a trifluoromethyloxy group), an aryloxy halide group (e.g., a pentafluorophenyloxy group), a sulfonyloxy group (e.g., a methylsulfonyloxy group), an alkylthio halide group (e.g., a difluoromethylthio group), an aryl group substituted with 2 or more electron attractive groups having σp value of 0.15 or higher (e.g., a 2,4-dinitrophenyl group and a pentachlorophenyl group), and a heterocyclic group (e.g., a 2-benzoxazolyl group, a 2-benzothiazolyl group, a 1-phenyl-2-benzimidazolyl group) can be exemplified.

As the electron attractive groups having Hammett's substitution constant σp value of 0.20 or higher, in addition to the above groups, a halogen atom can be exemplified.

As the azo dye represented by formula (1), particularly preferred combinations of substituents are described. The preferred groups as $R^5$ and $R^6$ are a hydrogen atom, an alkyl group, an aryl group, a heterocyclic group, a sulfonyl group and an acyl group, more preferred groups are a hydrogen atom, an aryl group, a heterocyclic group, and a sulfonyl group, and most preferred groups are a hydrogen atom, an aryl group, and a heterocyclic group, provided that $R^5$ and $R^6$ do not represent a hydrogen atom at the same time.

The preferred groups as G are a hydrogen atom, a halogen atom, an alkyl group, a hydroxyl group, an amino group and an acylamino group, more preferred groups are a hydrogen atom, a halogen atom, an amino group and an acylamino group, and most preferred groups are a hydrogen atom, an amino group and an acylamino group.

The preferred groups as A are a pyrazole ring, an imidazole ring, an isothiazole ring, a thiadiazole ring, and a benzothiazole ring, more preferred groups are a pyrazole ring and an isothiazole ring, and most preferred group is a pyrazole ring.

As the preferred combination of $B^1$ and $B^2$, $B^1$ and $B^2$ respectively represent =$CR^1$— and —$CR^2$=, $R^1$ and $R^2$ each preferably represents a hydrogen atom, an alkyl group, a halogen atom, a cyano group, a carbamoyl group, a carboxyl group, a hydroxyl group, an alkoxyl group, or an alkoxycarbonyl group, and more preferably a hydrogen atom, an alkyl group, a carboxyl group, a cyano group, or a carbamoyl group.

Regarding the preferred combinations of the substituents of the compound represented by formula (1), a compound in which at least one of various substituents is the above preferred group is preferred, a compound in which a greater number of substituents are the above preferred groups is more preferred, and a compound in which all the substituents are the above preferred groups is most preferred.

The specific examples of the azo dyes represented by formula (1) are shown below, but the azo dyes for use in the present invention are not limited thereto.

TABLE 1

TABLE 1-continued

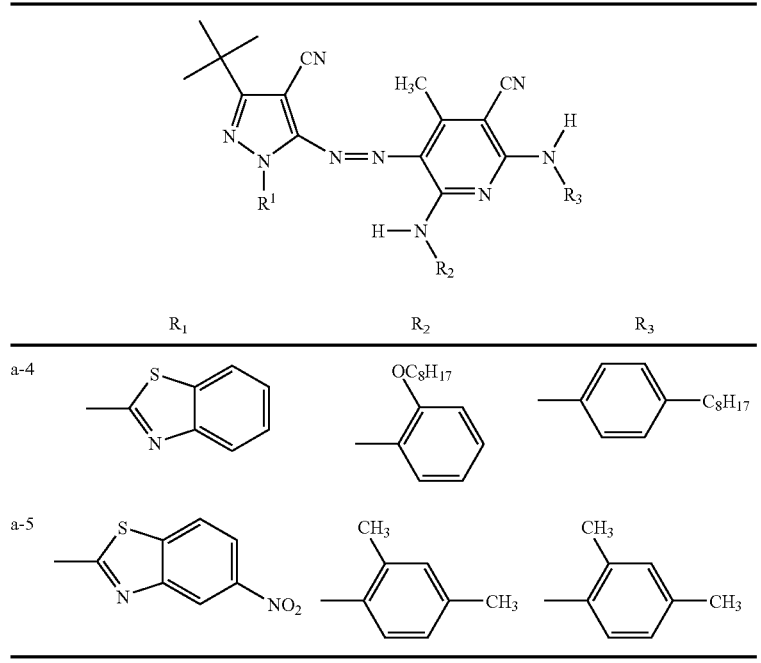

| | R₁ | R₂ | R₃ |
|---|---|---|---|
| a-4 | 2-methylbenzothiazole | 2-methyl-OC₈H₁₇-phenyl | 4-C₈H₁₇-phenyl |
| a-5 | 2-methyl-5-nitrobenzothiazole | 2,4-dimethylphenyl | 2,4-dimethylphenyl |

TABLE 2

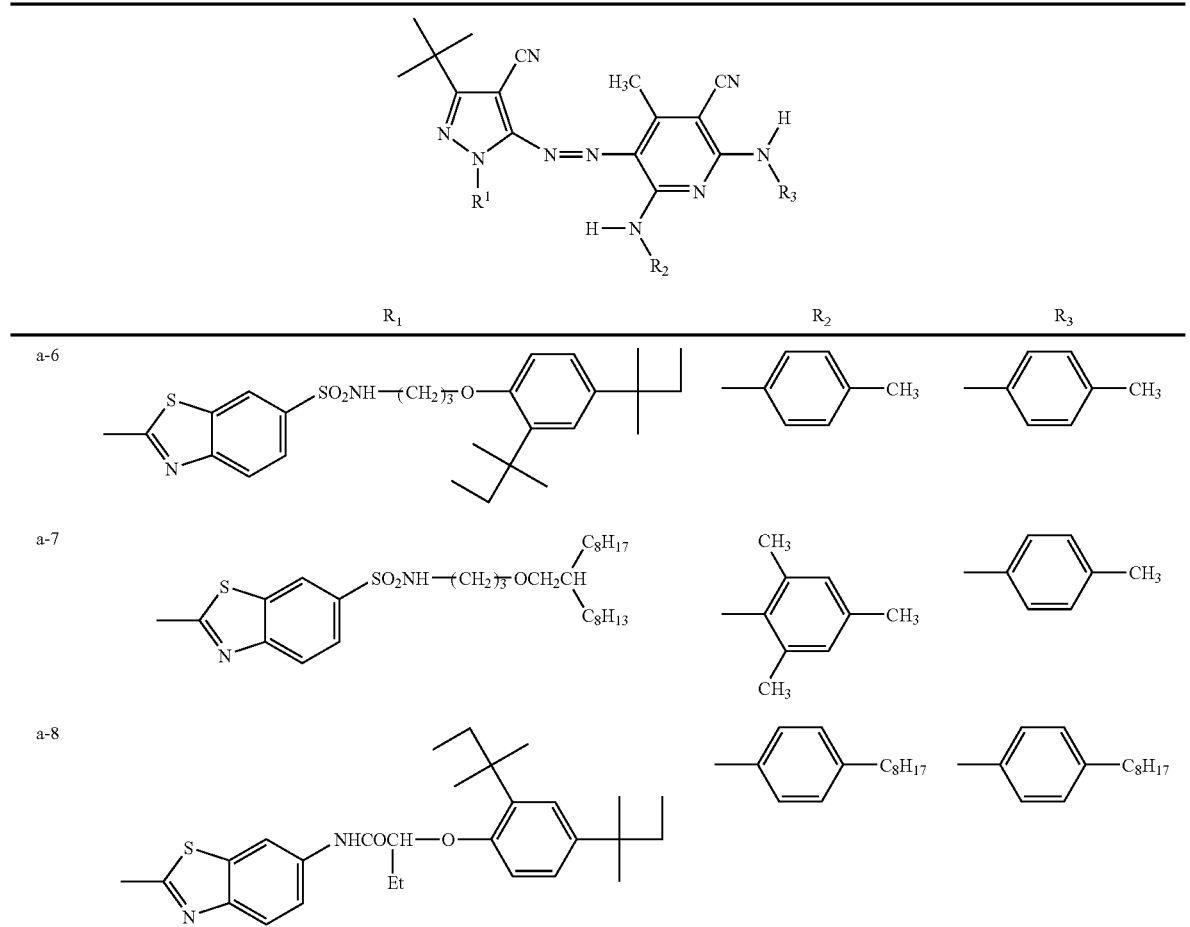

| | R₁ | R₂ | R₃ |
|---|---|---|---|
| a-6 | 2-methylbenzothiazole-6-SO₂NH-(CH₂)₃O-(2,4-di-tert-pentylphenyl) | 4-CH₃-phenyl | 4-CH₃-phenyl |
| a-7 | 2-methylbenzothiazole-6-SO₂NH-(CH₂)₃OCH₂CH(C₈H₁₇)(C₈H₁₃) | 2,4,6-trimethylphenyl | 4-CH₃-phenyl |
| a-8 | 2-methylbenzothiazole-6-NHCOCH(Et)-O-(2,4-di-tert-pentylphenyl) | 4-C₈H₁₇-phenyl | 4-C₈H₁₇-phenyl |

TABLE 2-continued

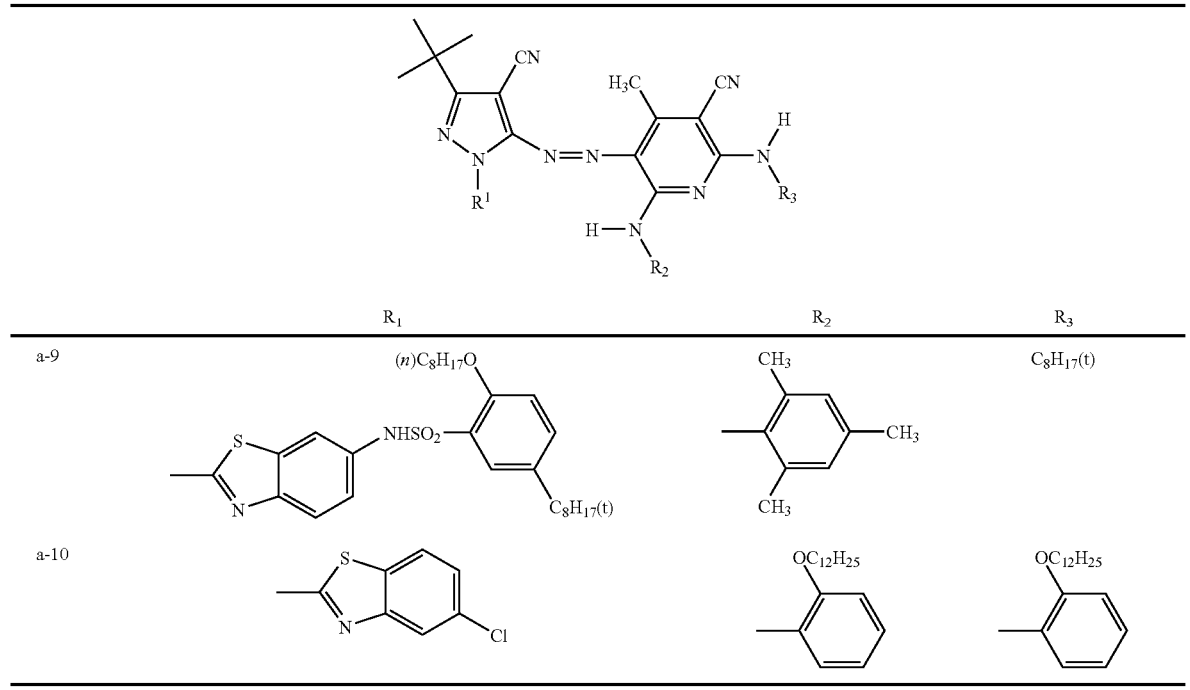

|     | R₁ | R₂ | R₃ |
|-----|----|----|----|
| a-9 | (n)C₈H₁₇O–[2-methylbenzothiazol-6-yl-NHSO₂-]-phenyl-C₈H₁₇(t) | 2,3,5-trimethylphenyl (CH₃ mesityl) | C₈H₁₇(t) |
| a-10 | 2-methyl-5-chlorobenzothiazol-6-yl | 2-(OC₁₂H₂₅)-methylphenyl | 2-(OC₁₂H₂₅)-methylphenyl |

TABLE 3

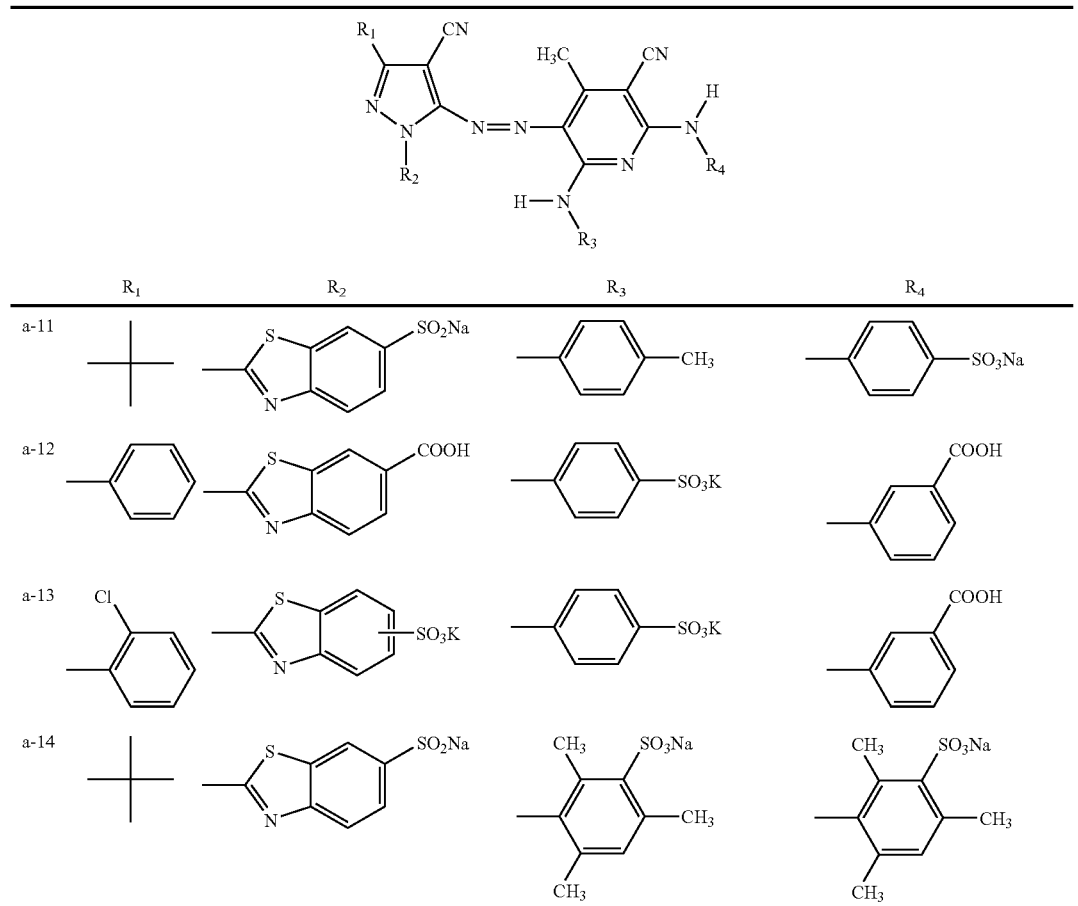

|      | R₁ | R₂ | R₃ | R₄ |
|------|----|----|----|----|
| a-11 | t-Bu | 2-methylbenzothiazol-6-yl-SO₂Na | p-tolyl (–CH₃) | p-C₆H₄–SO₃Na |
| a-12 | phenyl | 2-methylbenzothiazol-6-yl-COOH | p-C₆H₄–SO₃K | m-C₆H₄–COOH |
| a-13 | 2-chlorophenyl | 2-methylbenzothiazol-SO₃K | p-C₆H₄–SO₃K | m-C₆H₄–COOH |
| a-14 | t-Bu | 2-methylbenzothiazol-6-yl-SO₂Na | 2,3,5-trimethyl-SO₃Na-phenyl | 2,3,5-trimethyl-SO₃Na-phenyl |

TABLE 3-continued

[Structure: pyrazole-azo-pyridine dye with R1, R2, R3, R4 substituents]

| | R₁ | R₂ | R₃ | R₄ |
|---|---|---|---|---|
| a-15 | tert-butyl | 2-methylbenzothiazol-6-yl-SO₃K | 2,4,5-trimethylphenyl-SO₃K (at position 3) | 2,4,5-trimethylphenyl-SO₃K (at position 3) |
| a-16 | tert-butyl | 6-chloro-2-methylbenzothiazolyl | 3,4,5-trimethylbenzyl-N(CH₂CO₂H)₂ | 3,4,5-trimethylbenzyl-N(CH₂CO₂H)₂ |
| a-17 | tert-butyl | 2-methylbenzothiazol-6-yl-SO₂Na | 3,4,5-trimethylphenyl-SO₃Na | 3,4,5-trimethylphenyl-SO₃Na |

TABLE 4

[Structure: pyrazole-azo-pyridine dye with tert-butyl group and R1, R2, R3, R4 substituents]

| | R₁ | R₂ | R₃ | R₄ |
|---|---|---|---|---|
| a-18 | 2-methylbenzothiazolyl | 2-methylbenzothiazolyl | 3,4,5-trimethylphenyl-CH₃ | 3,4,5-trimethylphenyl |
| a-19 | 5-chloro-2-methylbenzothiazolyl | —SO₂CH₃ | 3,4,5-trimethylphenyl | 4-methylphenyl |

TABLE 4-continued
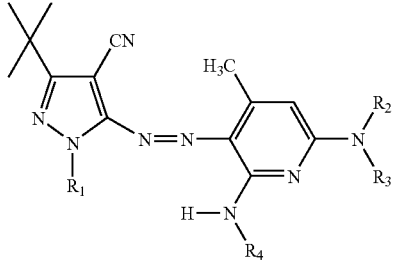
| | $R_1$ | $R_2$ | $R_3$ | $R_4$ |
|---|---|---|---|---|
| a-20 | 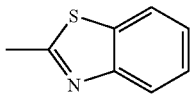 | —COCH$_3$ | C$_8$H$_{17}$(t) | C$_8$H$_{17}$(t) |
| a-21 | 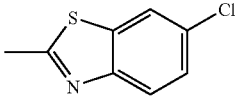 | —SO$_2$CH$_3$ | 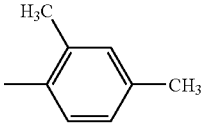 | C$_8$H$_{17}$(t) |
| a-22 | 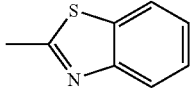 | H | 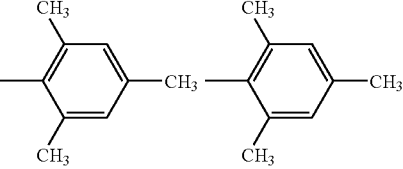 | |
| a-23 | 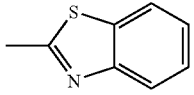 | H | 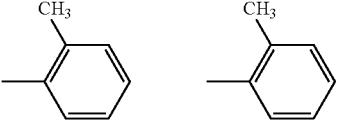 | 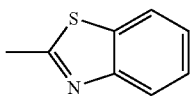 |
| a-24 | 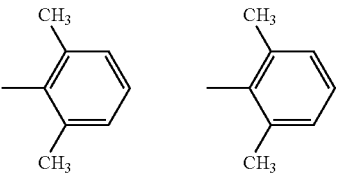 | H | 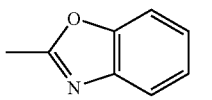 | |
| a-25 | 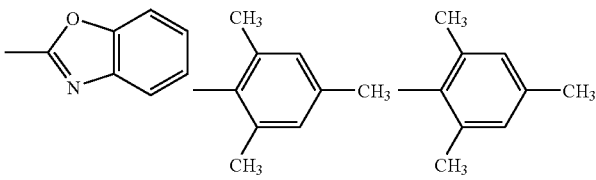 | | | |

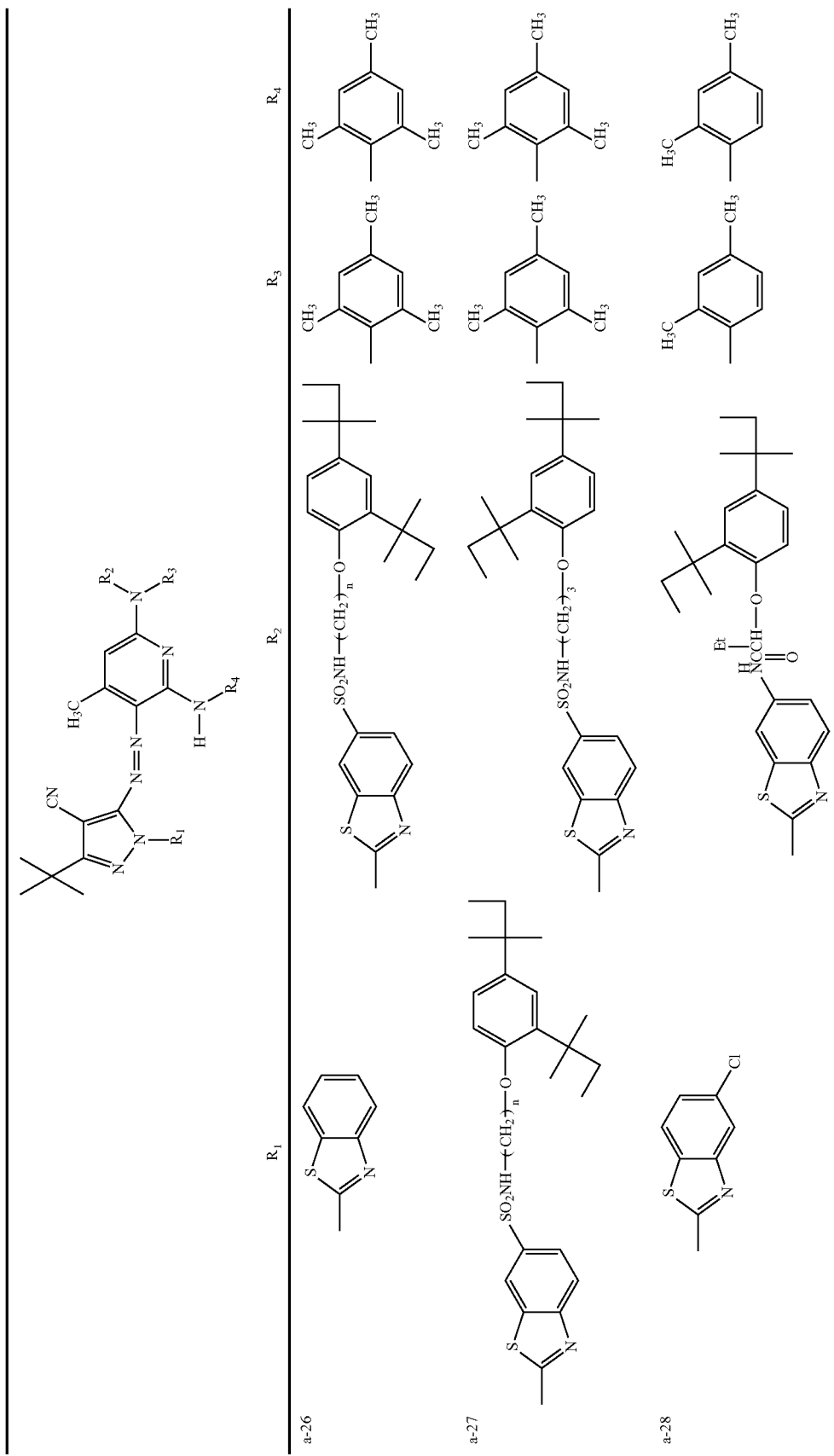

-continued

| | R₁ | R₂ | R₃ | R₄ |
|---|---|---|---|---|
| a-29 | 2-methylbenzothiazol-5-yl | 2-methylbenzothiazol-5-yl | 2-dodecyloxy-methylphenyl (OC₁₂H₂₅, CH₃) | 2-dodecyloxy-methylphenyl (OC₁₂H₂₅, CH₃) |
| a-30 | 5-nitro-2-methylbenzothiazol-6-yl | 2,5-bis(octyloxy)-NHSO₂-phenyl attached to 2-methylbenzothiazol-6-yl (nC₈H₁₇O, OC₈H₁₇(t)) | 4-(tert-octyl)phenyl (C₈H₁₇) | tert-C₈H₁₇ |
| a-31 | 6-(SO₂NHCH(C₂H₅)C₄H₉)-2-methylbenzoxazol-6-yl | 6-(SO₂NHCH(C₂H₅)C₄H₉)-2-methylbenzoxazol-6-yl | 2-methylphenyl (CH₃) | 2-methylphenyl (CH₃) |

Parent structure:

Pyridine with substituents: H₃C at 4-position; N(R₂)(R₃) and NH(R₄) as amino groups; linked via —N=N— to a pyrazole bearing CN, tert-butyl, and N—R₁.

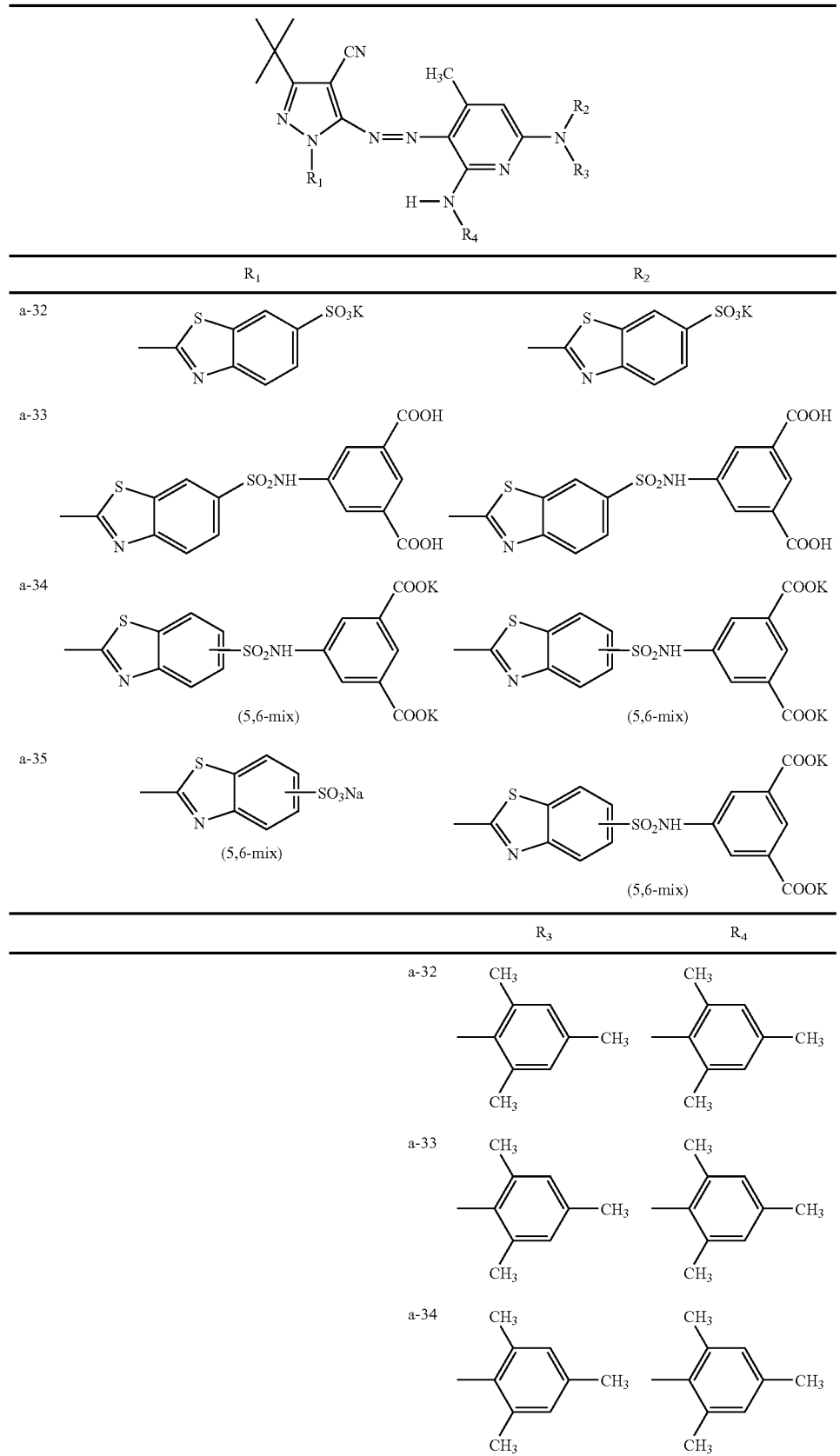

-continued
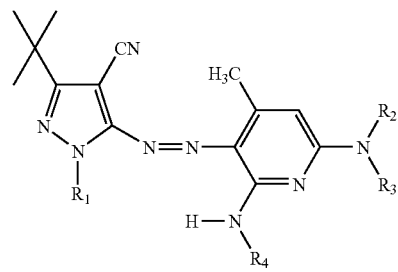
| | | |
|---|---|---|
| a-35 | 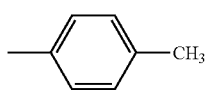 | 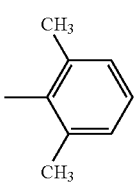 |
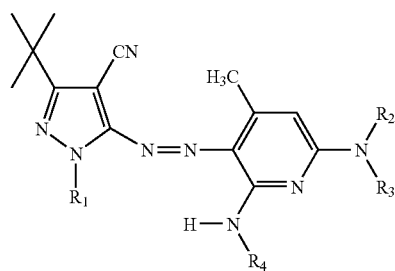
| | R₁ | R₂ |
|---|---|---|
| a-36 | 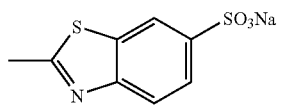 | 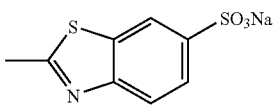 |
| a-37 | 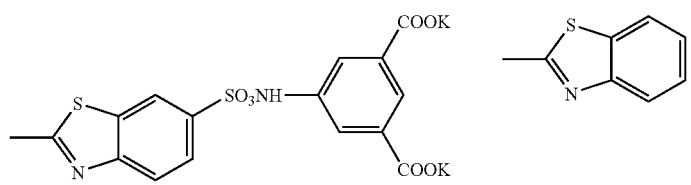 | 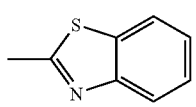 |
| a-38 | 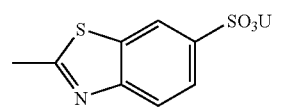 | 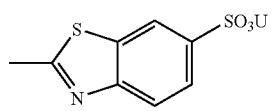 |
| a-39 | 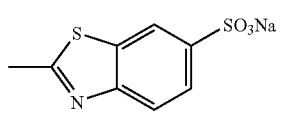 | 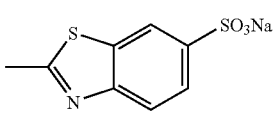 |
| a-40 | 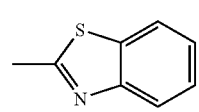 | 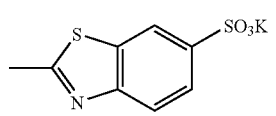 |

-continued
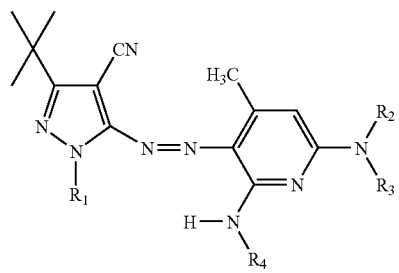
| | $R_3$ | $R_4$ |
|---|---|---|
| a-36 | 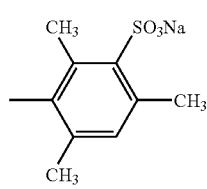 | 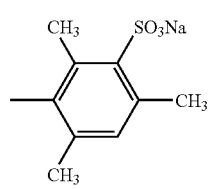 |
| a-37 | 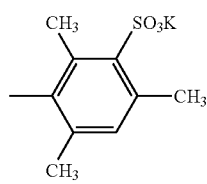 | 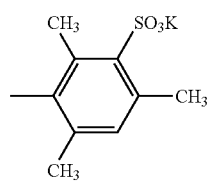 |
| a-38 | 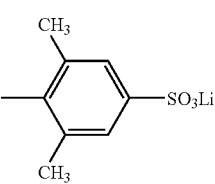 | 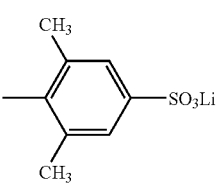 |
| a-39 | 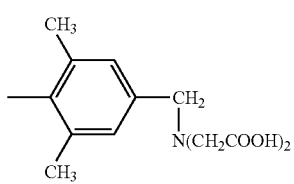 | 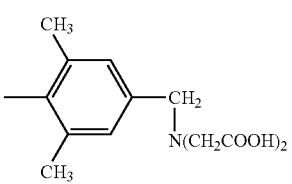 |
| a-40 | 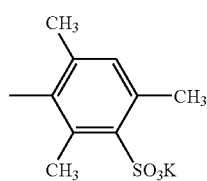 | 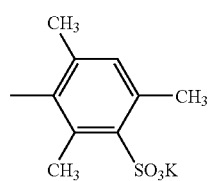 |

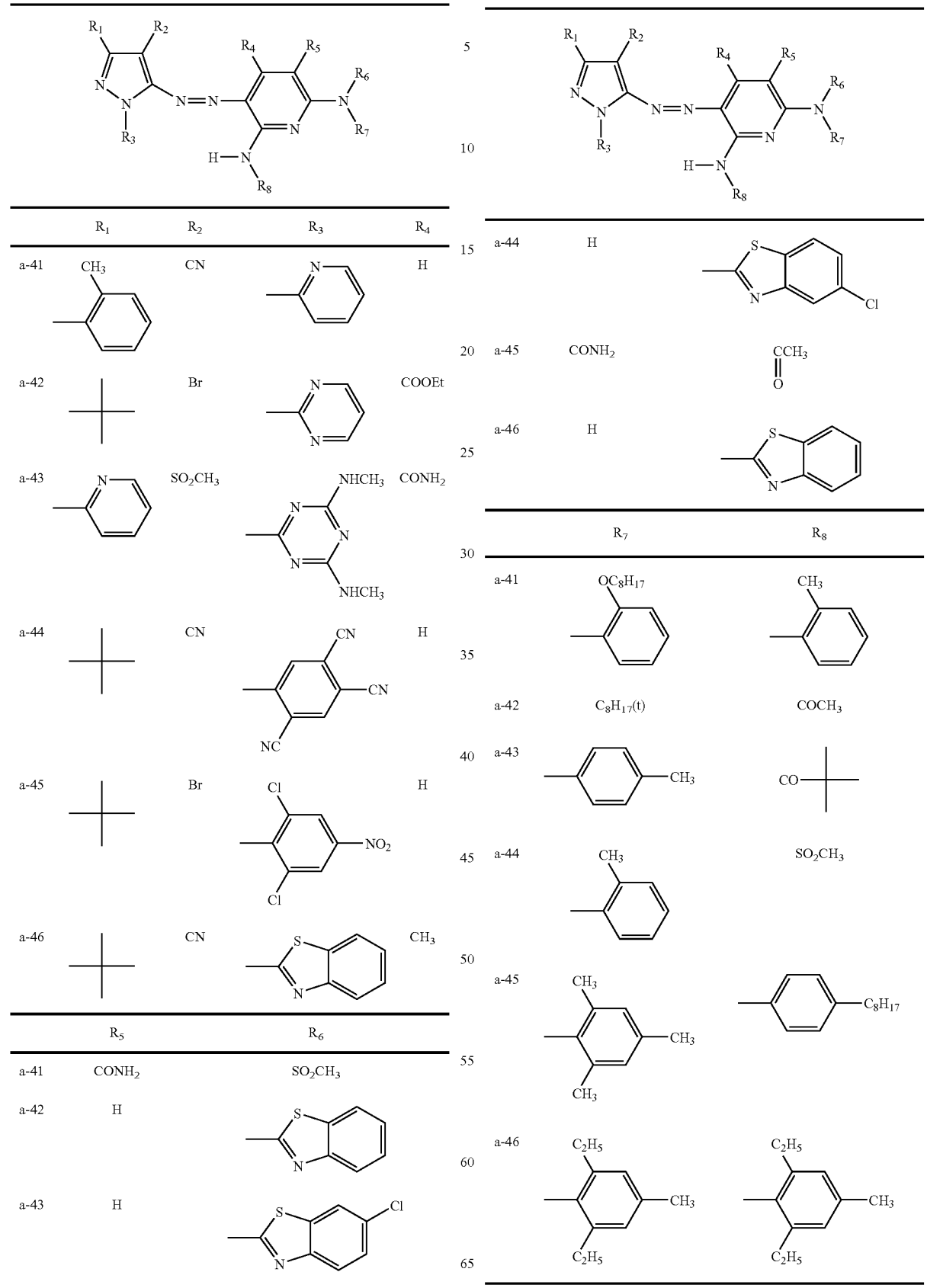

| | R₁ | R₂ | R₃ | R₄ | R₅ | R₆ |
|---|---|---|---|---|---|---|
| b-1 | CH₃ | CH₃ | CN | H | -C₆H₄-C₈H₁₇ | -C₆H₄-C₈H₁₇ |
| b-2 | CH₃ | CH₃ | CN | H | 2,4,5-trimethylphenyl | 2,4,5-trimethylphenyl |
| b-3 | CH₃ | CH₃ | CONH₂ | H | -C₆H₄-C₈H₁₇ | 2,4,5-trimethylphenyl |
| b-4 | CH₃ | CH₃ | H | H | 2,3,5-trimethyl-6-(SO₃Li)phenyl | 2,3,5-trimethyl-6-(SO₃Li)phenyl |
| b-5 | CH₃ | H | CN | H | -C₆H₄-SO₃Na | -C₆H₄-SO₃Na |

| | R₁ | R₂ | R₃ | R₄ | R₅ | R₆ |
|---|---|---|---|---|---|---|
| b-6 | CH₃ | CH₃ | H | 2-benzothiazolyl | 2,3,5,6-tetramethyl-4-(CH₂N(CH₂CO₂K)₂)phenyl | 2,3,5,6-tetramethyl-4-(CH₂N(CH₂CO₂K)₂)phenyl |

-continued
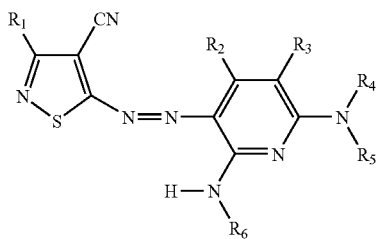
| | R₁ | R₂ | R₃ | R₄ | R₅ | R₆ |
|---|---|---|---|---|---|---|
| b-7 | CH₃ | CH₃ | H | 2-methylbenzothiazolyl | 2,3,5-trimethylphenyl | 4-C₈H₁₇-phenyl |
| b-8 | CH₃ | H | H | SO₂CH₃ | 3,4-dimethylphenyl-SO₃Na | 3,4-dimethylphenyl-SO₃Na |
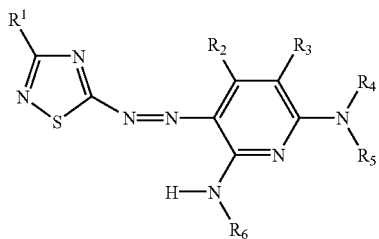
| | R₁ | R₂ | R₃ | R₄ |
|---|---|---|---|---|
| c-1 | —SCH₃ | CH₃ | CN | H |
| c-2 | phenyl | H | CONH₂ | H |
| c-3 | CH₃—S—CH₂CH₂—SO₃K | CH₃ | H | 2-methyl-6-SO₃K-benzothiazolyl |
| c-4 | —CH₃ | CH₃ | H | 2-methylbenzothiazol-6-yl-SO₂NH-(CH₂)₃-O-(2,4-di-tert-pentylphenyl) |

-continued
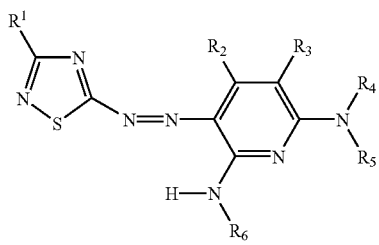
| | | $R_2$ | $R_3$ | $R_4$ |
|---|---|---|---|---|
| c-5 | 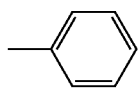 | H | H | 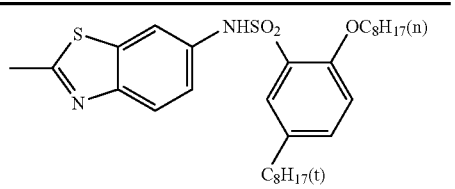 |
| | $R_5$ | $R_6$ |
|---|---|---|
| c-1 | $C_8H_{17}(t)$ | 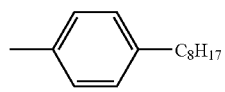 |
| c-2 | 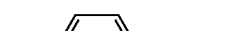 | 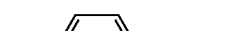 |
| c-3 | 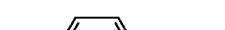 | 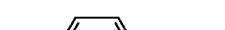 |
| c-4 | 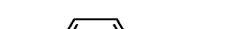 | 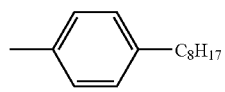 |
| c-5 | 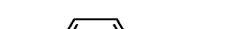 | $C_8H_{17}(t)$ |
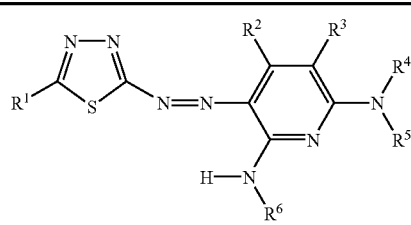
| 染料 | $R_1$ | $R_2$ | $R_3$ | $R_4$ | $R_5$ | $R_6$ |
|---|---|---|---|---|---|---|
| d-1 | Me | $CH_3$ | CN | H | 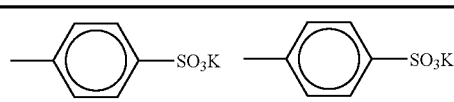 | 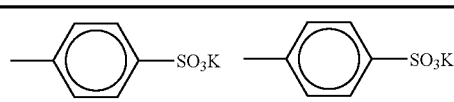 |

-continued
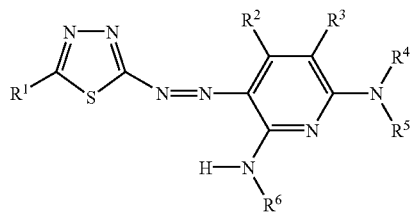
| 染料 | R₁ | R₂ | R₃ | R₄ | R₅ | R₆ |
|---|---|---|---|---|---|---|
| d-2 | Me | CH₃ | CN | H | 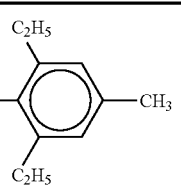 | 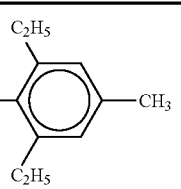 |
| d-3 | Me | H | H | 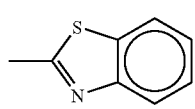 | 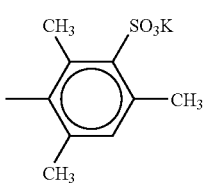 | 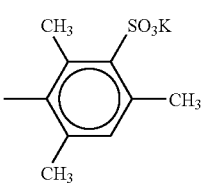 |
| d-4 | Ph | CH₃ | CONH₂ | H | —C₆H₄—C₈H₁₇ | —C₆H₄—C₈H₁₇ |
| d-5 | Ph | CH₃ | H | 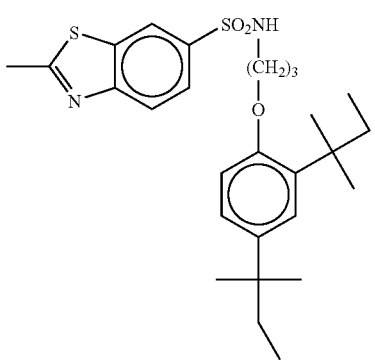 | 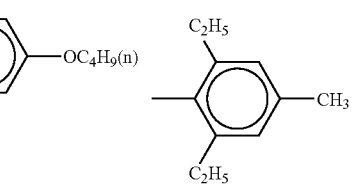 | 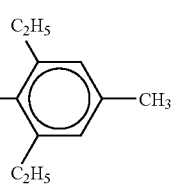 |
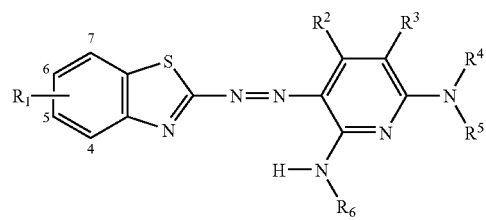
| 染料 | R₁ | R₂ | R₃ | R₄ | R₅ | R₆ |
|---|---|---|---|---|---|---|
| e-1 | 5-Cl | CH₃ | CONH₂ | H | C₈H₁₇(t) | C₈H₁₇(t) |
| e-2 | 5,6-diCl | H | H | 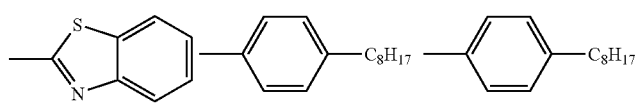 | | |

-continued
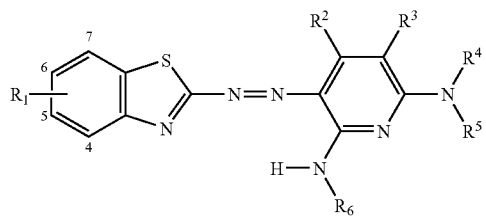
| 染料 | R₁ | R₂ | R₃ | R₄ | R₅ | R₆ |
|---|---|---|---|---|---|---|
| e-3 | 5,6-diCl | CH₃ | H | 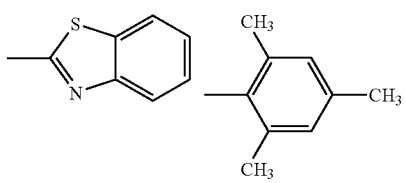 | 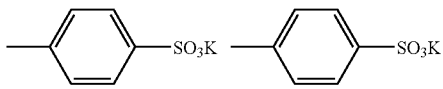 | COCH₃ |
| e-4 | 5-CH₃ | H | CN | H | 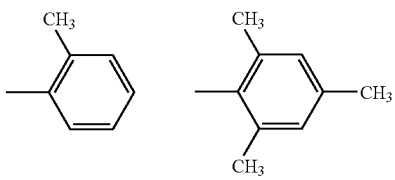 | |
| e-5 | 5-NO₂ | CH₃ | H | SO₂CH₃ | | |
f-1
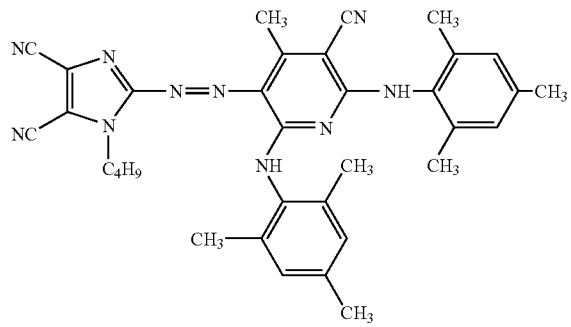
f-2
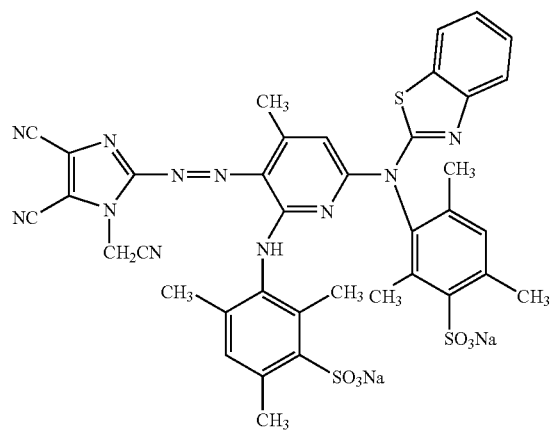

As the cyan dyes which can be preferably used in cyan and light cyan, or dark yellow ink of the ink for inkjet recording of the present invention, and is effective in image fastness and the maintenance of color balance, a cyan dye represented by the following formula (I) is particularly preferred.

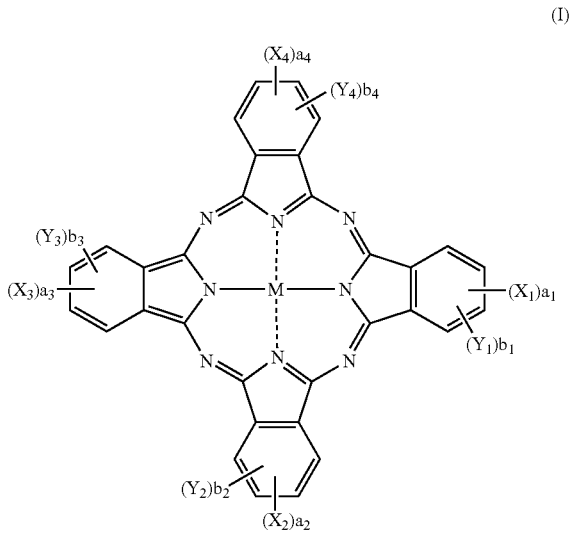

(I)

In formula (I), $X_1$, $X_2$, $X_3$ and $X_4$ each represents —SO-Z, —$SO_2$-Z, —$SO_2NR_1R_2$, a sulfo group, —$CONR_1R_2$, or —$CO_2R_1$. Z represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group. $R_1$ and $R_2$ each represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group. When a plurality of Z are present, they may be the same or different. $Y_1$, $Y_2$, $Y_3$ and $Y_4$ each represents a monovalent substituent. When any of $X_1$, $X_2$, $X_3$, $X_4$, $Y_1$, $Y_2$, $Y_3$ and $Y_4$ is present in plural number, they may be the same or different. M represents a hydrogen atom, a metal atom or oxide thereof, hydroxide or halide.

$a_1$ to $a_4$, and $b_1$ to $b_4$ each represents the number of substituents of $X_1$ to $X_4$, and $Y_1$ to $Y_4$, respectively, $a_1$, $a_2$, $a_3$ and $a_4$ each represents 0 or an integer of from 1 to 4, and all of $a_1$, $a_2$, $a_3$ and $a_4$ do not represent 0 at the same time, and $b_1$, $b_2$, $b_3$ and $b_4$ each represents 0 or an integer of from 1 to 4.

A compound represented by formula (I) is described below in more detail.

In formula (I), $X_1$, $X_2$, $X_3$ and $X_4$ each represents —SO-Z, —$SO_2$-Z, —$SO_2NR_1R_2$, a sulfo group, —$CONR_1R_2$, or —$CO_2R_1$. Of these substituents, —SO-Z, —$SO_2$-Z, —$SO_2NR_1R_2$ and —$CONR_1R_2$ are preferred, —$SO_2$-Z and —$SO_2NR_1R_2$ are particularly preferred, and —$SO_2$-Z is most preferred. When any of $a_1$, $a_2$, $a_3$ and $a_4$ showing the number of substituents represents an integer of 2 or more, a plurality of substituents of $X_1$ to $X_4$ may be the same or different, and each represents any of the above groups. All of $X_1$, $X_2$, $X_3$ and $X_4$ may represent absolutely the same substituent, or the same kind of substituent may be partially different from each other, e.g., as in the case where all of $X_1$, $X_2$, $X_3$ and $X_4$ represent —$SO_2$-Z and Z is different from each other, or $X_1$, $X_2$, $X_3$ and $X_4$ may represent different substituents, e.g., —$SO_2$-Z and —$SO_2NR_1R_2$.

Z represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, preferably a substituted or unsubstituted alkyl group, a substituted or unsubstituted aryl group, or a substituted or unsubstituted heterocyclic group, and most preferably a substituted alkyl group, a substituted aryl group, or a substituted heterocyclic group.

$R_1$ and $R_2$ each represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, preferably a hydrogen atom, a substituted or unsubstituted alkyl group, a substituted or unsubstituted aryl group, or a substituted or unsubstituted heterocyclic group, and more preferably a hydrogen atom, a substituted alkyl group, a substituted aryl group, or a substituted heterocyclic group, but it is not preferred for both $R_1$ and $R_2$ to represent a hydrogen atom.

As the substituted or unsubstituted alkyl group represented by $R_1$, $R_2$ and Z, an alkyl group having from 1 to 30 carbon atoms is preferred. A branched alkyl group is preferred for being capable of increasing the solubility of dye and the stability of ink, and the case where the alkyl group has an asymmetric carbon atom (use as racemic modification) is particularly preferred. As the examples of the substituents, the same substituents as in the case where Z, $R_1$, $R_2$, $Y_1$, $Y_2$, $Y_3$ and $Y_4$ can further have a substituent as described later are exemplified. A hydroxyl group, an ether group, an ester group, a cyano group, an amido group and a sulfonamido group are particularly preferred for capable of improving the aggregation and fastness of a dye. Besides these group, a halogen atom and an ionic hydrophilic group may be contained as substituents. The number of carbon atoms of a substituent is not included into the number of the alkyl group, and this is also applied to other groups.

As the substituted or unsubstituted cycloalkyl group represented by $R_1$, $R_2$ and Z, a cycloalkyl group having from 5 to 30 carbon atoms is preferred. The case where the cycloalkyl group has an asymmetric carbon atom (use as racemic modification) is preferred for being capable of increasing the solubility of dye and the stability of ink. As the examples of the substituents, the same substituents as in the case where Z, $R_1$, $R_2$, $Y_1$, $Y_2$, $Y_3$ and $Y_4$ can further have a substituent as described later are exemplified. A hydroxyl group, an ether group, an ester group, a cyano group, an amido group and a sulfonamido group are particularly preferred for capable of improving the aggregation and fastness of a dye. Besides these group, a halogen atom and an ionic hydrophilic group may be contained as substituents.

As the substituted or unsubstituted alkenyl group represented by $R_1$, $R_2$ and Z, an alkenyl group having from 2 to 30 carbon atoms is preferred. A branched alkenyl group is preferred for being capable of increasing the solubility of dye and the stability of ink, and the case where the alkenyl group has an asymmetric carbon atom (use as racemic modification) is particularly preferred. As the examples of the substituents, the same substituents as in the case where Z, $R_1$, $R_2$, $Y_1$, $Y_2$, $Y_3$ and $Y_4$ can further have a substituent as described later are exemplified. A hydroxyl group, an ether group, an ester group, a cyano group, an amido group and a sulfonamido group are particularly preferred for capable of improving the aggregation and fastness of a dye. Besides these group, a halogen atom and an ionic hydrophilic group may be contained as substituents.

As the substituted or unsubstituted aralkyl group represented by $R_1$, $R_2$ and Z, an aralkyl group having from 7 to 30 carbon atoms is preferred. A branched aralkyl group is preferred for being capable of increasing the solubility of dye and the stability of ink, and the case where the aralkyl group has an asymmetric carbon atom (use as racemic modification) is particularly preferred. As the examples of the substituents, the same substituents as in the case where Z, $R_1$, $R_2$, $Y_1$, $Y_2$, $Y_3$ and $Y_4$ can further have a substituent as described later are exemplified. A hydroxyl group, an ether group, an ester group, a cyano group, an amido group and a sulfonamido group are particularly preferred for capable of improving the aggregation and fastness of a dye. Besides these group, a halogen atom and an ionic hydrophilic group may be contained as substituents.

As the substituted or unsubstituted aryl group represented by $R_1$, $R_2$ and Z, an aryl group having from 6 to 30 carbon atoms is preferred. As the examples of the substituents, the same substituents as in the case where Z, $R_1$, $R_2$, $Y_1$, $Y_2$, $Y_3$ and $Y_4$ can further have a substituent as described later are exemplified. An electron attractive group is particularly preferred for capable of making oxidation potential of a dye noble and improving fastness of a dye. As the electron attractive groups, those having a Hammett's substitution constant σp value of positive value are exemplified, e.g., a halogen atom, a heterocyclic group, a cyano group, a carboxyl group, an acylamino group, a sulfonamido group, a sulfamoyl group, a carbamoyl group, a sulfonyl group, an imido group, an acyl group, a sulfo group, and a quaternary ammonium group are preferably used as the electron attractive group, and a cyano group, a carboxyl group, a sulfamoyl group, a carbamoyl group, a sulfonyl group, an imido group, an acyl group, a sulfo group, and a quaternary ammonium group are more preferably used.

As the heterocyclic group represented by $R_1$, $R_2$ and Z, 5- or 6-membered ring groups are preferred, and they may be further condensed. The rings may be aromatic heterocyclic rings or non-aromatic heterocyclic rings. The examples of the heterocyclic groups represented by $R_1$, $R_2$ and Z are exemplified below in the form of heterocyclic rings, and the substitution positions are eliminated, but the substitution position is not limitative, e.g., pyridine can be substituted on 2-position, 3-position and 4-position. As the examples, pyridine, pyrazine, pyrimidine, pyridazine, triazine, quinoline, isoquinoline, quinazoline, cinnolin, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isooxazole, benzisooxazole, pyrrolidine, piperidine, piperazine, imidazolidine and thiazoline are exemplified. Aromatic heterocyclic groups are particularly preferred, and the preferred examples include, e.g., pyridine, pyrazine, pyrimidine, pyridazine, triazine, pyrazole, imidazole, benzimidazole, triazole, thiazole, benzothiazole, isothiazole, benzisothiazole and thiadiazole. These heterocyclic rings may have substituents. As the examples of the substituents, the same substituents as in the case where Z, $R_1$, $R_2$, $Y_1$, $Y_2$, $Y_3$ and $Y_4$ can further have a substituent as described later are exemplified. The preferred substituents and the more preferred substituents are the same with the preferred substituents and the more preferred substituents of the aryl group respectively.

$Y_1$, $Y_2$, $Y_3$ and $Y_4$ each represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxyl group, an aryloxy group, an acylamino group, an arylamino group, a ureido group, a sulfamoylamino group, an alkylthio group, an arylthio group, an alkoxycarbonylamino group, a sulfonamido group, a carbamoyl group, a sulfamoyl group, a sulfonyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a phosphoryl group, an acyl group, a carboxyl group, or a sulfo group. Each group may further have a substituent.

Of these group, a hydrogen atom, a halogen atom, an alkyl group, an aryl group, a cyano group, an alkoxyl group, an amido group, a ureido group, a sulfonamido group, a carbamoyl group, a sulfamoyl group, an alkoxycarbonyl group, a carboxyl group, and a sulfo group are preferred, a hydrogen atom, a halogen atom, a cyano group, a carboxyl group, and a sulfo group are particularly preferred, and a hydrogen atom is most preferred.

When Z, $R_1$, $R_2$, $Y_1$, $Y_2$, $Y_3$ and $Y_4$ represent substituents capable of having further substituent, the following substituents may be used.

A straight or branched chain alkyl group having from 1 to 12 carbon atoms, a straight or branched chain aralkyl group having from 7 to 18 carbon atoms, a straight or branched chain alkenyl group having from 2 to 12 carbon atoms, a straight or branched chain alkynyl group having from 2 to 12 carbon atoms, a straight or branched chain cycloalkyl group having from 3 to 12 carbon atoms, a straight or branched chain cycloalkenyl group having from 3 to 12 carbon atoms (the above groups having a branched chain are preferred for being capable of increasing the solubility of dye and the stability of ink, and groups having an asymmetric carbon atom are particularly preferred, and the specific examples of these groups include, e.g., a methyl group, an ethyl group, a propyl group, an isopropyl group, a sec-butyl group, a t-butyl group, a 2-ethylhexyl group, a 2-methylsulfonylethyl group, a 3-phenoxypropyl group, a trifluoromethyl group and a cyclopentyl group), a halogen atom (e.g., chlorine and bromine), an aryl group (e.g., a phenyl group, a 4-t-butylphenyl group and a 2,4-di-t-amylphenyl group), a heterocyclic group (e.g., an imidazolyl group, a pyrazolyl group, a triazolyl group, a 2-furyl group, a 2-thienyl group, a 2-pyrimidinyl group and a 2-benzothiazolyl group), a cyano group, a hydroxyl group, a nitro group, a carboxyl group, an amino group, an alkyloxy group (e.g., a methoxy group, an ethoxy group, a 2-methoxyethoxy group, and a 2-methanesulfonylethoxy group), an aryloxy group (e.g., a phenoxy group, a 2-methylphenoxy group, a 4-t-butylphenoxy group, a 3-nitrophenoxy group, a 3-t-butyloxycarbamoylphenoxy group, and a 3-methoxycarbamoyl group), an acylamino group (e.g., an acetamido group, a benzamido group, and a 4-(3-t-butyl-4-hydroxyphenoxy)butanamido group), an alkylamino group (e.g., amethylamino group, a butylamino group, a diethylamino group, and a methylbutylamino group), an anilino group (e.g., a phenylamino group and a 2-chloroanilino group), a ureido group (e.g., a phenylureido group, a methylureido group, and an N,N-dibutylureido group), a sulfamoylamino group (e.g., an N,N-dibropylsulfamoylamino group), an alkylthio group (e.g., a methylthio group, an octylthio group, and a 2-phenoxyethylthio group), an arylthio group (e.g., a phenylthio group, a 2-butoxy-5-t-octylphenylthio group, and a 2-carboxyphenylthio group), an alkyloxycarbonylamino group (e.g., a methoxycarbonylamino group), a sulfonamido group (e.g., a methanesulfonamido group, a benzenesulfonamido group and a p-toluenesulfonamido group), a carbamoyl group (e.g., an N-ethylcarbamoyl group and an N,N-dibutylcarbamoyl group), a sulfamoyl group (e.g., an N-ethylsulfamoyl group, an N,N-dipropylsulfamoyl group, and an N-phenylsulfamoyl group), a sulfonyl group (e.g., a methanesulfonyl group, an octanesulfonyl group, a benzenesulfonyl group, and a toluenesulfonyl group), an alkyloxycarbonyl group (e.g., a methoxycarbonyl group and a butyloxycarbonyl group), a heterocyclic oxy group (e.g., a 1-phenyltetrazol-5-oxy group and a 2-tetrahydropyranyloxy group), an azo group (e.g., a phenylazo group, a 4-methoxyphenylazo group, a 4-pivaloylaminophenylazo group, a 2-hydroxy-4-propanoylphenylazo group), an acyloxy group (e.g., an acetoxy group), a carbamoyloxy group (e.g., an N-methylcarbamoyloxy group and an N-phenylcarbamoyloxy group), a silyloxy group (e.g., a trimethylsilyloxy group and a dibutylmethylsilyloxy group), an aryloxycarbonylamino group (e.g., a phenoxycarbonylamino group), an imido group (e.g., an N-succinimido group, and an N-phthalimido group), a heterocyclic thio group (e.g., a 2-benzothiazolylthio group, a 2,4-diphenoxy-1,3,5-triazol-6-thio group, and a 2-pyridylthio group), a sulfinyl group (e.g., a 3-phenoxypropyl-sulfinyl group), a phosphonyl group (e.g., a phenoxyphosphonyl group, an octyloxyphosphonyl group and a phenylphosphonyl group), an aryloxycarbonyl group (e.g., a phenoxycarbonyl group), an acyl group (e.g., an acetyl group, a 3-phenylpropanoyl group and a benzoyl group), an ionic hydrophilic group (e.g., a carboxyl group, a sulfo group, a phosphono group, and a quaternary ammonium group).

When a phthalocyanine dye represented by formula (I) is a water-soluble dye, it is preferred to have an ionic hydrophilic group. The ionic hydrophilic group includes a sulfo group, a carboxyl group, a phosphono group, and a quaternary ammonium group. As the ionic hydrophilic group, a carboxyl group, a phosphono group, and a sulfo group are preferred, and a carboxyl group and a sulfo group are particularly preferred. The carboxyl group, phosphono group and sulfo group may be in the state of a salt, and the examples of the counter ions for forming the salts include an ammonium ion, an alkali metal ion (e.g., a lithium ion, a sodium ion and a potassium ion), and an organic cation (a tetramethylammonium ion, a tetramethylguanidium ion and a tetramethylsulfonium ion). Of the counter ions, alkali metal ions are preferred, and a lithium ion is particularly preferred for being capable of increasing the solubility of dye and the stability of ink.

It is preferred that at least two ionic hydrophilic groups are contained in one molecule of a phthalocyanine dye, and it is particularly preferred that at least two sulfo group and/or carboxyl group are contained.

$a_1$ to $a_4$, and $b_1$ to $b_4$ each represents the number of substituents of $X_1$ to $X_4$, and $Y_1$ to $Y_4$, respectively, $a_1$, $a_2$, $a_3$ and $a_4$ each represents 0 or an integer of from 1 to 4, and all of $a_1$, $a_2$, $a_3$ and $a_4$ do not represent 0 at the same time, and $b_1$, $b_2$, $b_3$ and $b_4$ each represents 0 or an integer of from 1 to 4. When any of $a_1$ to $a_4$ and $b_1$ to $b_4$ represents an integer of 2 or more, any of $X_1$ to $X_4$ and $Y_1$ to $Y_4$ is present in a plural number, and they may be the same or different.

$a_1$ and $b_1$ satisfy the relationship of $a_1+b_1=4$. Such a combination as $a_1$ represents 1 or 2 and $b_1$ represents 3 or 2 is particularly preferred, and a combination that $a_1$ represents 1 and $b_1$ represents 3 is most preferred.

The combinations of $a_2$ and $b_2$, $a_3$ and $b_3$, and $a_4$ and $b_4$ have also the same relationship as in the combination of $a_1$ and $b_1$, and preferred combinations are also the same.

M represents a hydrogen atom, a metal element or oxide thereof, hydroxide or halide.

Besides a hydrogen atom, M preferably represents, as metal elements, Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb and Bi. As oxide, VO and GeO are preferred. As hydroxide, $Si(OH)_2$, $Cr(OH)_2$ and $Sn(OH)_2$ are preferred. As halide, AlCl, $SiCl_2$, VCl, $VCl_2$, VOCl, FeCl, GaCl and ZrCl are exemplified. Cu, Ni, Zn and Al are especially preferred, and Cu is most preferred.

Pc (a phthalocyanine ring) may form a dimer (e.g., Pc-M-L-M-Pc) or a trimer via L (a divalent linking group), and M at that time may be the same or different.

As a divalent linking group represented by L, oxy group-O—, thio group-S—, carbonyl group-CO—, sulfonyl group-$SO_2$—, imino group-NH—, methylene group-$CH_2$—, and groups formed by combining these groups are preferred.

With respect to the preferred combinations of the substituents of a compound represented by formula (I), a compound in which at least one of various substituents is the above preferred group is preferred, a compound in which a greater number of various substituents are the above preferred groups is more preferred, and a compound in which all the substituents are the above preferred groups is most preferred.

A phthalocyanine dye represented by formula (I) is more preferably represented by formula (II). A phthalocyanine dye represented by formula (II), which is preferably used in the present invention, is described in detail below.

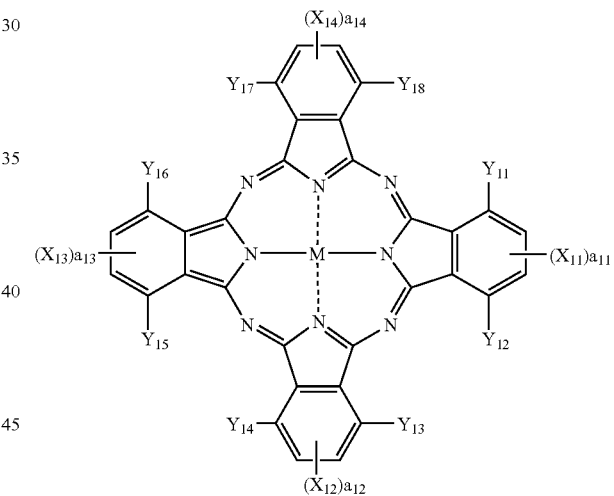

In formula (II), $X_{11}$ to $X_{14}$ and $Y_{11}$ to $Y_{18}$ have the same meaning with $X_1$ to $X_4$ and $Y_1$ to $Y_4$ in formula (I) respectively, and the preferred examples are also the same. M has the same meaning with M in formula (I), and the preferred examples are also the same.

In formula (II), $a_{11}$ to $a_{14}$ each represents an integer of 1 or 2, preferably $a_{11}+a_{12}+a_{13}+a_{14}$ is 4 or more and 6 or less, and particularly preferably $a_{11}=a_{12}=a_{13}=a_{14}=1$.

All of $X_{11}$, $X_{12}$, $X_{13}$ and $X_{14}$ may represent absolutely the same substituent, or the same kind of substituent may be partially different from each other, e.g., as in the case where all of $X_{11}$, $X_{12}$, $X_{13}$ and $X_{14}$ represent —$SO_2$-Z and Z is different from each other, or $X_{11}$, $X_{12}$, $X_{13}$ and $X_{14}$ may represent different substituents, e.g., —$SO_2$-Z and —$SO_2NR_1R_2$.

Of the phthalocyanine dyes represented by formula (II), particularly preferred combinations of the substituents are as follows.

$X_{11}$, $X_{12}$, $X_{13}$ and $X_{14}$ each preferably represents —SO-Z, —SO$_2$-Z, —SO$_2$NR$_1$R$_2$, or —CONR$_1$R$_2$, particularly preferably —SO$_2$-Z and —SO$_2$NR$_1$R$_2$, and most preferably —SO$_2$-Z.

Z preferably represents a substituted or unsubstituted alkyl group, a substituted or unsubstituted aryl group, or a substituted or unsubstituted heterocyclic group, and most preferably a substituted alkyl group, a substituted aryl group, or a substituted heterocyclic group. The case where the substituent has an asymmetric carbon atom (use as racemic modification) is preferred for being capable of increasing the solubility of dye and the stability of ink. The case where the substituent has a hydroxyl group, an ether group, an ester group, a cyano group, an amido group and a sulfonamido group is preferred for capable of improving the aggregation and fastness of a dye.

R$_1$ and R$_2$ each preferably represents a hydrogen atom, a substituted or unsubstituted alkyl group, a substituted or unsubstituted aryl group, or a substituted or unsubstituted heterocyclic group, and more preferably a hydrogen atom, a substituted alkyl group, a substituted aryl group, or a substituted heterocyclic group, but it is not preferred for both R$_1$ and R$_2$ to represent a hydrogen atom. The case where the substituent has an asymmetric carbon atom (use as racemic modification) is preferred for being capable of increasing the solubility of dye and the stability of ink. The case where the substituent has a hydroxyl group, an ether group, an ester group, a cyano group, an amido group and a sulfonamido group is preferred for capable of improving the aggregation and fastness of a dye.

$Y_{11}$ to $Y_{18}$ each preferably represents a hydrogen atom, a halogen atom, an alkyl group, an aryl group, a cyano group, an alkoxyl group, an amido group, a ureido group, a sulfonamido group, a carbamoyl group, a sulfamoyl group, an alkoxycarbonyl group, a carboxyl group, or a sulfo group, particularly preferably a hydrogen atom, a halogen atom, a cyano group, a carboxyl group, or a sulfo group, and most preferably a hydrogen atom.

$a_{11}$ to $a_{14}$ each preferably represents 1 or 2, and particularly preferably all of all to $a_{14}$ represent 1.

M represents a hydrogen atom, a metal element or oxide thereof, hydroxide or halide, particularly preferably Cu, Ni, Zn and Al, and most preferably Cu.

When a phthalocyanine dye represented by formula (II) is a water-soluble dye, it is preferred to have an ionic hydrophilic group. The ionic hydrophilic group includes a sulfo group, a carboxyl group, a phosphono group, and a quaternary ammonium group. As the ionic hydrophilic group, a carboxyl group, a phosphono group, and a sulfo group are preferred, and a carboxyl group and a sulfo group are particularly preferred. The carboxyl group, phosphono group and sulfo group may be in the state of a salt, and the examples of the counter ions for forming the salts include an ammonium ion, an alkali metal ion (e.g., a lithium ion, a sodium ion and a potassium ion), and an organic cation (a tetramethylammonium ion, a tetramethylguanidium ion and a tetramethylsulfonium ion). Of the counter ions, alkali metal ions are preferred, and a lithium ion is particularly preferred for being capable of increasing the solubility of dye and the stability of ink.

It is preferred that at least two ionic hydrophilic groups are contained in one molecule of a phthalocyanine dye, and it is particularly preferred that at least two sulfo group and/or carboxyl group are contained.

With respect to the preferred combinations of the substituents of a compound represented by formula (II), a compound in which at least one of various substituents is the above preferred group is preferred, a compound in which a greater number of various substituents are the above preferred groups is more preferred, and a compound in which all the substituents are the above preferred groups is most preferred.

It is preferred to introduce at least one electron attractive group, e.g., a sulfinyl group, a sulfonyl group or a sulfamoyl group, to every four benzene ring of phthalocyanine so that the σp value of all the substituents of phthalocyanine skeleton becomes 1.6 or more in total.

A Hammett's substitution constant σp value is explained below briefly. Hammett's rule is a rule of thumb suggested by L. P. Hammett in 1935 to quantitatively discuss the influence of a substituent on the reaction or equilibrium of a benzene derivative, and the appropriateness of the rule is now widely recognized. There are substitution constant σp value and σm value obtained by Hammett's rule, and these values can be found in a large literature, e.g., J. A. Dean compiled, *Lange's Handbook of Chemistry*, 12th Ed., McGraw Hill (1979), and *Kagaku no Ryoiki (The Domain of Chemistry)*, Extra Issue, No. 122, pp. 96 to 103, Mankodo (1979).

A phthalocyanine derivative represented by formula (I) is generally a mixture of analogues inevitably different in the introducing position of substituent Xn (n is from 1 to 4) and Ym (m is from 1 to 4) and introducing number according to synthesis method, accordingly in many cases these mixtures of analogues are shown as statistic equalization by general formula. The present inventors classified these mixtures of analogues into three kinds shown below, thereby found that a specific mixture was particularly preferred. That is, the mixture of analogues of phthalocyanine dyes represented by formulae (I) and (II) is classified to the following three kinds based on the substitution positions and defined.

(1) β-Position substitution type: A phthalocyanine dye having specific substituents at 2- and/or 3-positions, 6- and/or 7-positions, 10- and/or 11-positions, and 14- and/or 15-positions.

(2) α-Position substitution type: A phthalocyanine dye having specific substituents at 1- and/or 4-positions, 5- and/or 8-positions, 9- and/or 12-positions, and 13- and/or 16-positions.

(3) α,β-Position substitution type: A phthalocyanine dye having specific substituents at 1- to 16-positions irregularly.

In the specification of the present invention, the above β-position substitution type, α-position substitution type and α,β-position substitution type are used in the explanation of the derivatives of phthalocyanine dyes having different structures (in particular, different in substitution positions).

Phthalocyanine derivatives for use in the present invention can be synthesized by the methods described in, e.g., Shirai and Kobayashi, *Phthalocyanine—Kagaku to Kino (Phthalocyanine—Chemistry and Functions)*, pp. 1 to 62, IPC Co., C. C. Leznoff and A. B. P. Lever, *Phthalocyanines—Properties and Applications*, pp. 1 to 54, VCH Co., or the methods quoted therein or analogous methods, in combination.

As described in WO 00/17275, WO 00/08103, WO 00/08101, WO 98/41853 and JP-A-10-36471, a phthalocyanine compound represented by formula (I) for use in the present invention can be synthesized through sulfonation, sulfonyl chlorination and amidation reactions of an unsubstituted phthalocyanine compound. In this case, not only sulfonation can occur anywhere of the phthalocyanine nucleus but the control of the number to be sulfonated is difficult. Accordingly, when sulfo groups are introduced on such reaction conditions, the position and number of sulfo groups introduced into the product formed cannot be specified, and a mixture of analogues different in the number of substituents and the substitution positions is inevitably produced. Therefore, since the number of heterocyclic-substituted sulfamoyl groups and the substitution positions cannot be specified when the compound of the invention is synthesized by using this mixture as the raw material, the product is obtained as α,β-position mixed substitution type mixture in which some kinds of compounds differ in the number of substituents and the substitution positions from the compound suitable for the ink set of the invention are contained.

As described above, if a great number of electron attractive groups such as sulfamoyl groups are introduced into phthalocyanine nucleus, oxidation potential is made nobler and ozone resistance is increased. According to the above synthesizing method, mixture of a phthalocyanine dye containing less electron attractive groups, i.e., oxidation potential is more base, cannot be avoided. Accordingly, for the improvement of ozone resistance, it is more preferred to use a synthesizing method which suppresses the formation of a compound having more base oxidation potential.

A phthalocyanine compound represented by formula (II) of the present invention can be derived from a tetrasulfophthalocyanine compound obtained by reacting a phthalonitrile derivative (Compound P) represented by the formula shown in the following scheme and/or a diiminoisoindoline derivative (Compound Q) with a metal derivative represented by formula (III), or by reacting a 4-sulfophthalonitrile derivative (Compound R) represented by the formula shown in the following scheme with a metal derivative represented by formula (III).

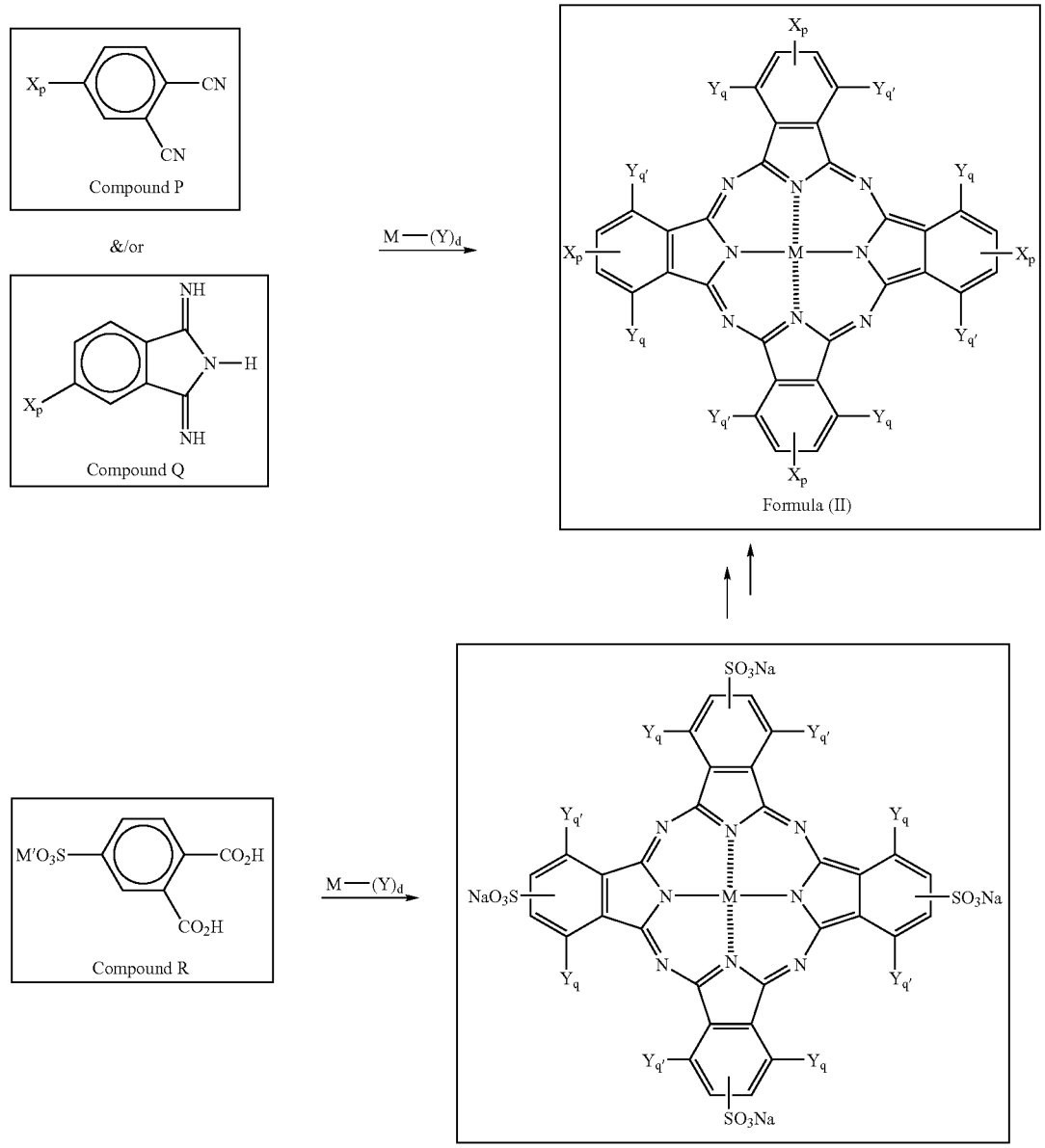

In the above formulae, Xp corresponds to $X_{11}$, $X_{12}$, $X_{13}$ or $X_{14}$ in formula (II). Yq and Yq' correspond to $Y_{11}$, $Y_{12}$, $Y_{13}$, $Y_{14}$, $Y_{15}$, $Y_{16}$, $Y_{17}$ or $Y_{18}$ in formula (II). In Compound R, M' represents a cation.

As the cations represented by M', an alkali metal ion, e.g., Li, Na and K, or an organic cation, e.g., a triethylammonium ion or a pyridinium ion, are exemplified.

$$M—(Y)_d \quad \text{(III)}$$

In formula (III), M has the same meaning as M in formulae (I) and (II), Y represents a monovalent or divalent ligand, e.g., a halogen atom, an acetate anion, acetylacetonate or oxygen, and d represents an integer of 1 to 4.

That is, according to the above synthesizing method, desired substituents can be introduced in a desired number. In particular, when it is desired to introduce a great number of electron attractive groups to make oxidation potential noble as in the present invention, the above synthesizing method is very excellent as compared with the method of synthesizing a phthalocyanine compound represented by formula (I) as described above.

The thus-obtained phthalocyanine compound represented by formula (II) is, in general, a mixture of the following compounds represented by formulae (a)-1, (a)-2, (a)-3 or (a)-4 which are isomers at each substitution position of Xp, i.e., β-position substitution type.

(a)-1

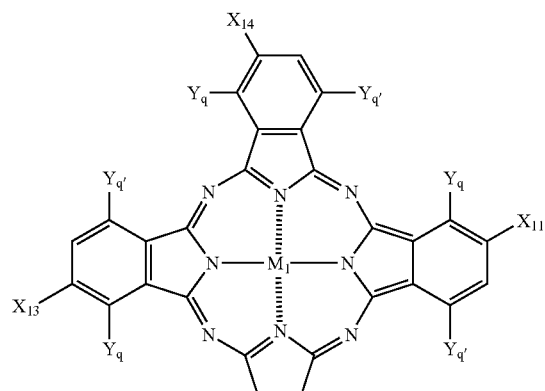

(a)-2

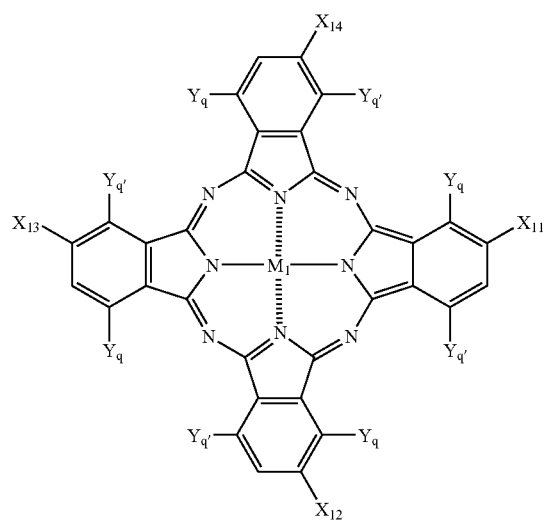

(a)-3

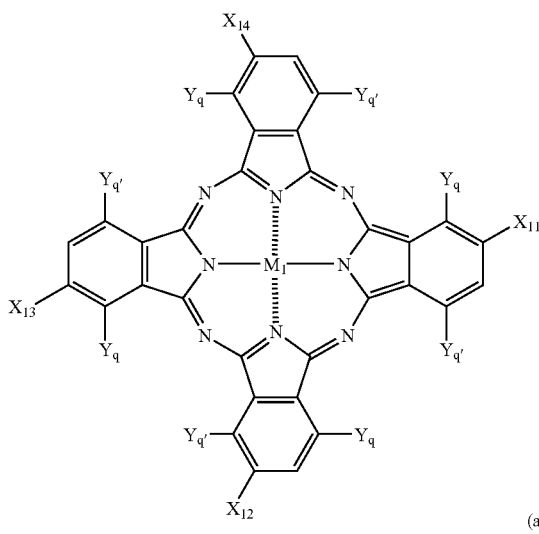

(a)-4

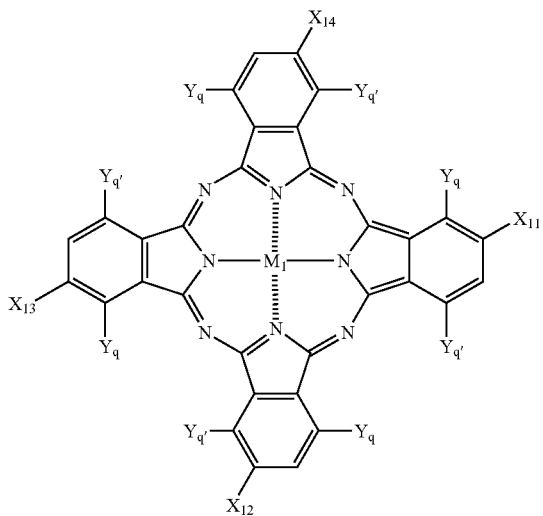

In the above synthesizing method, if absolutely the same compound is used as Xp, β-position substitution type phthalocyanine dye in which $X_{11}$, $X_{12}$, $X_{13}$ and $X_{14}$ are completely the same substituents can be obtained. On the other hand, when different kinds of Xp are used in combination, a dye having the substituent of the same kind but partially different from each other, or a dye having substituents different from each other can be synthesized. Of the dyes represented by formula (II), these dyes having electron attractive groups different from each other can adjust the solubility and aggregation of dye and storage stability of ink, therefore, particularly preferred.

In the present invention, it was found that the fact that oxidation potential is nobler than 1.0 V (vs SCE), in every substitution type, is very important for the improvement of fastness, and the greatness of the effect was not at all expected from the prior art techniques. Further, the reason is unknown, β-position substitution type is apparently superior to α,β-position mixed substitution type in hue, light fastness and ozone resistance.

The specific examples of phthalocyanine dyes represented by formulae (I) and (II) (exemplified compounds I-1 to I-12 corresponding to formula (I), and exemplified compounds 101 to 190 corresponding to formula (II)) are shown below, but the phthalocyanine dyes which are used in the present invention are not limited thereto.

(I-1)
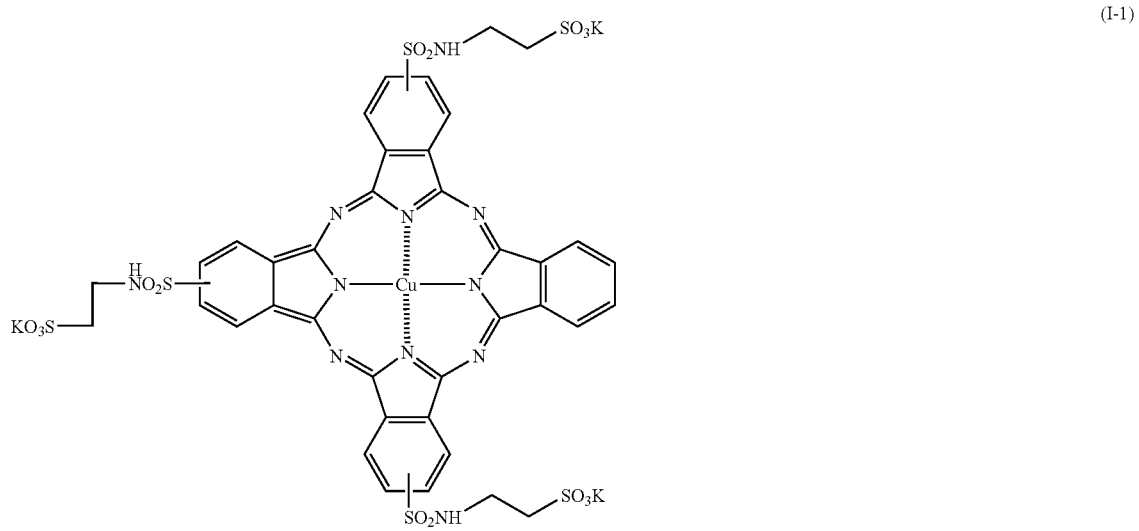
(I-2)
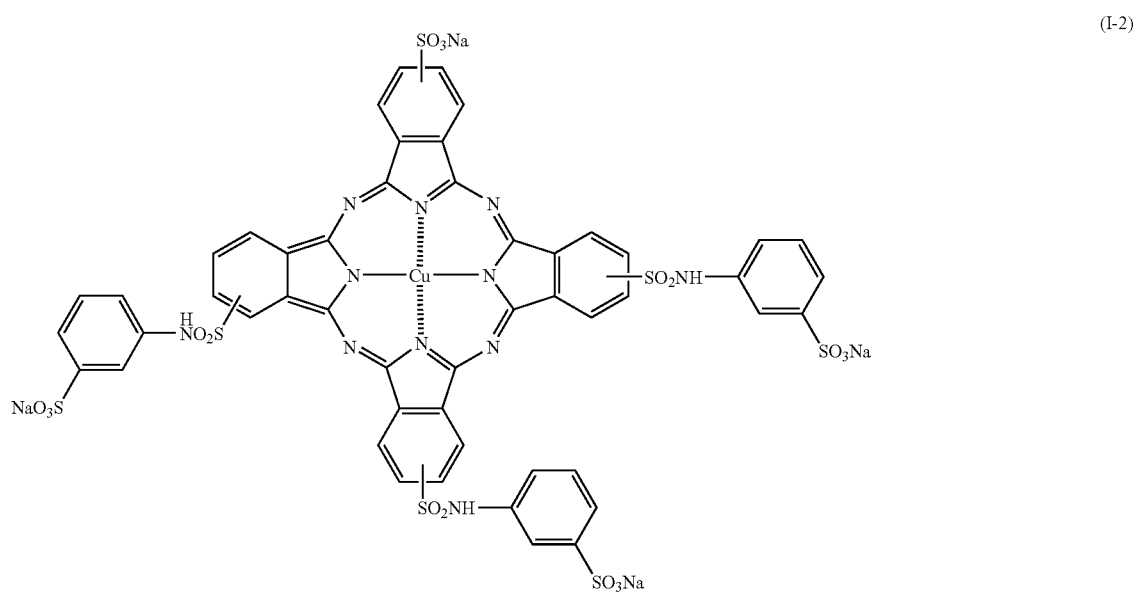
(I-3)
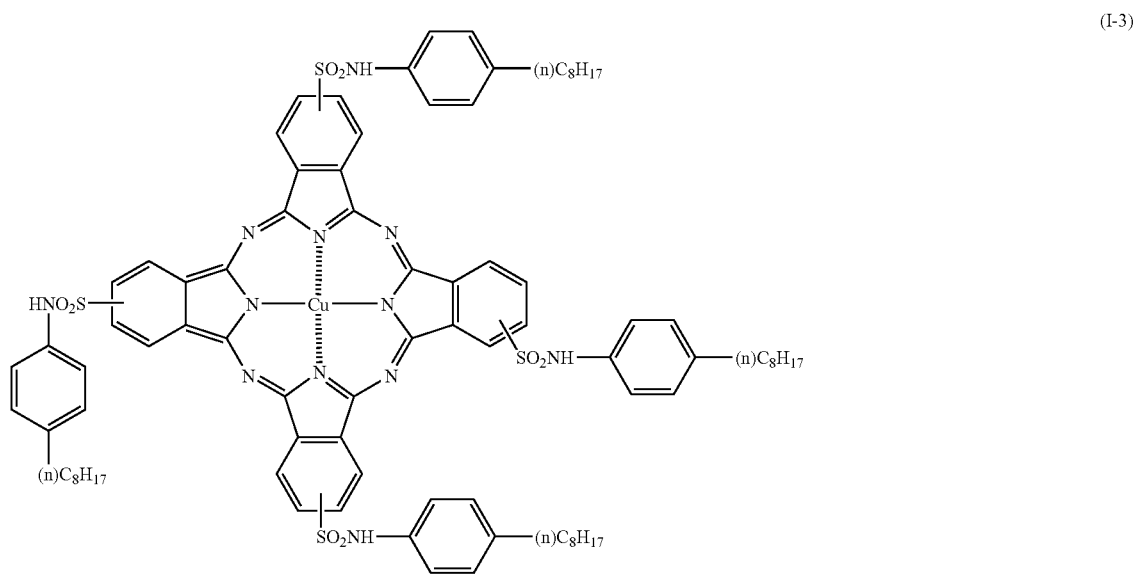

-continued
(I-4)
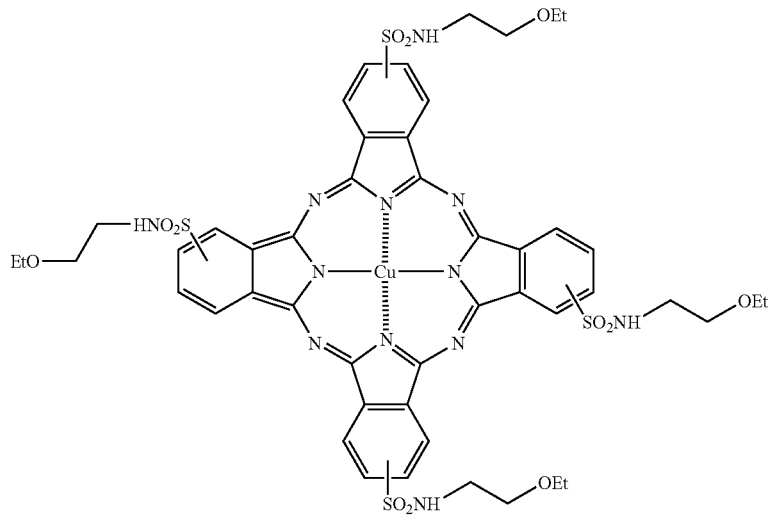
(I-5)
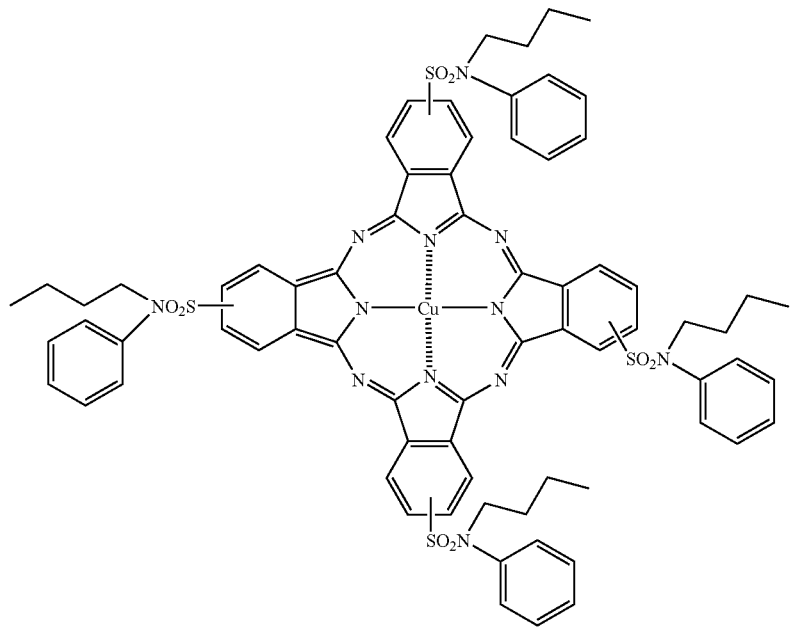
(I-6)
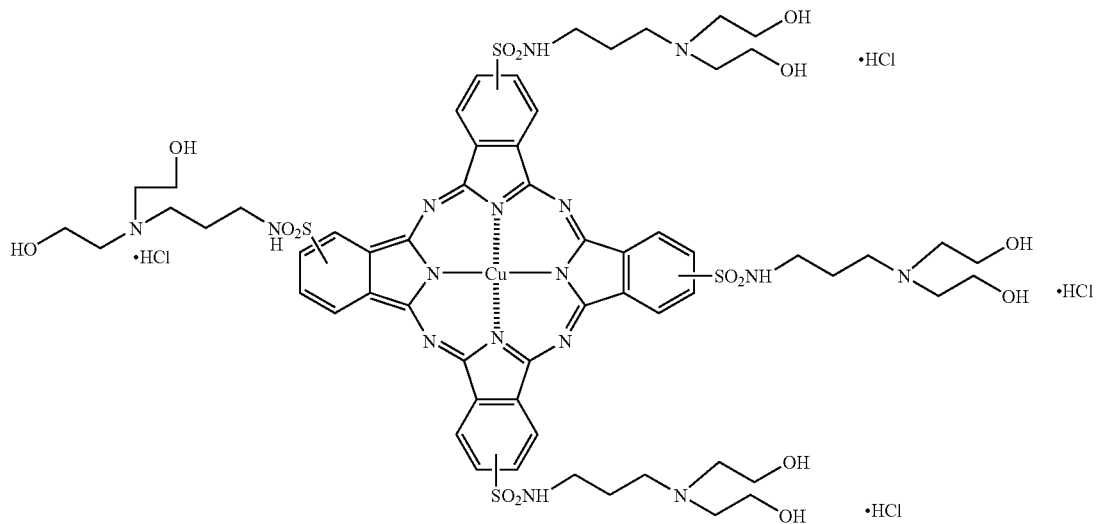

-continued
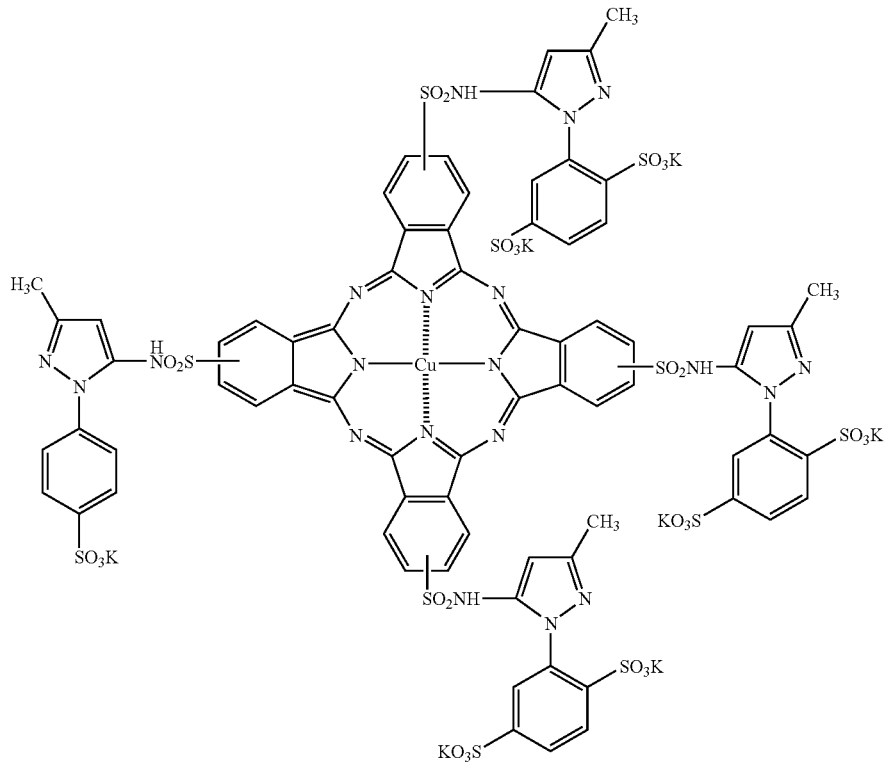
(I-7)
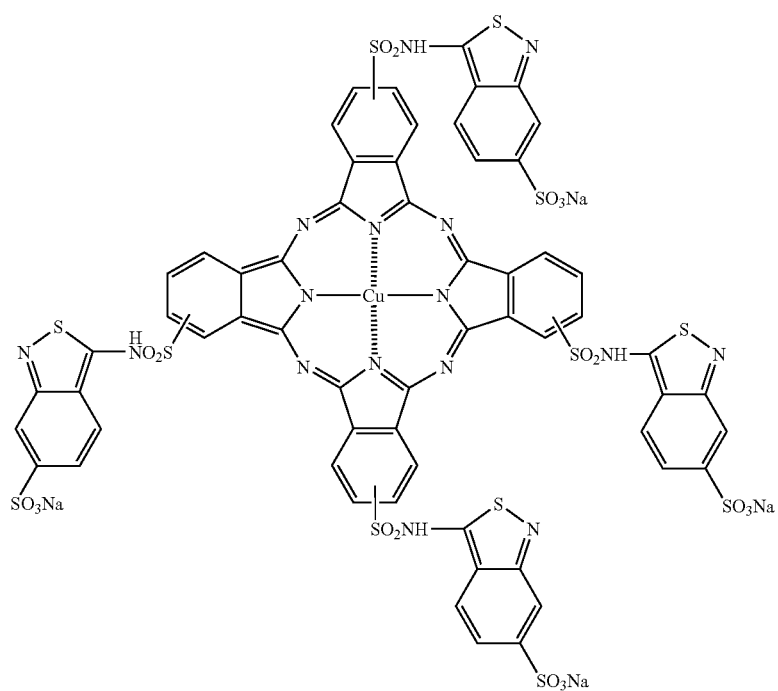
(I-8)

-continued
(I-9)
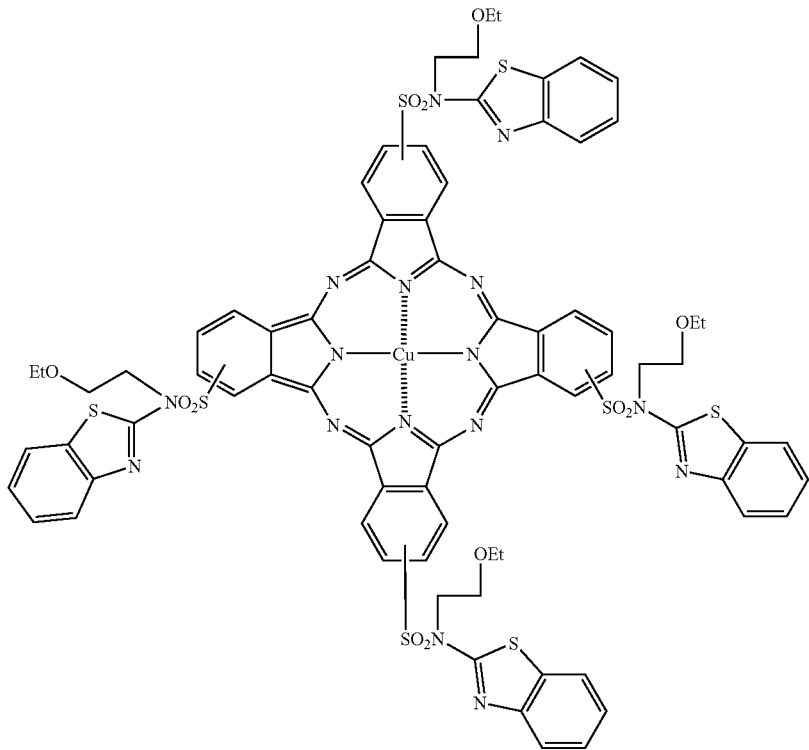
(I-10)
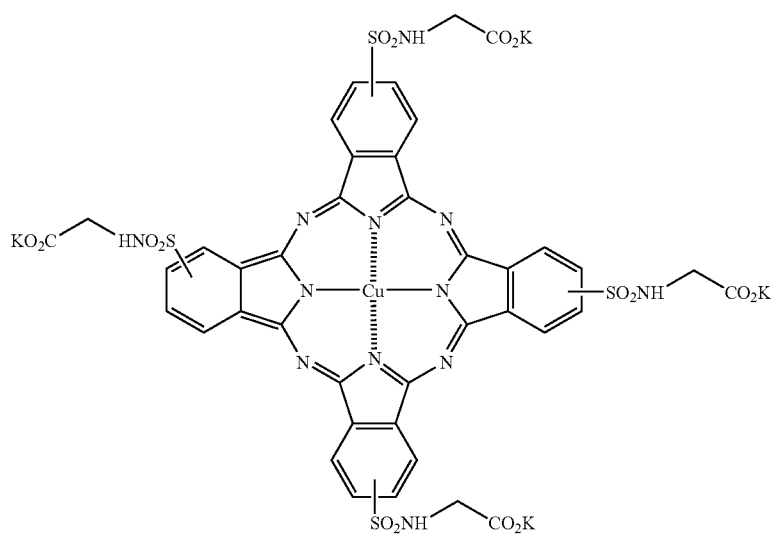

-continued
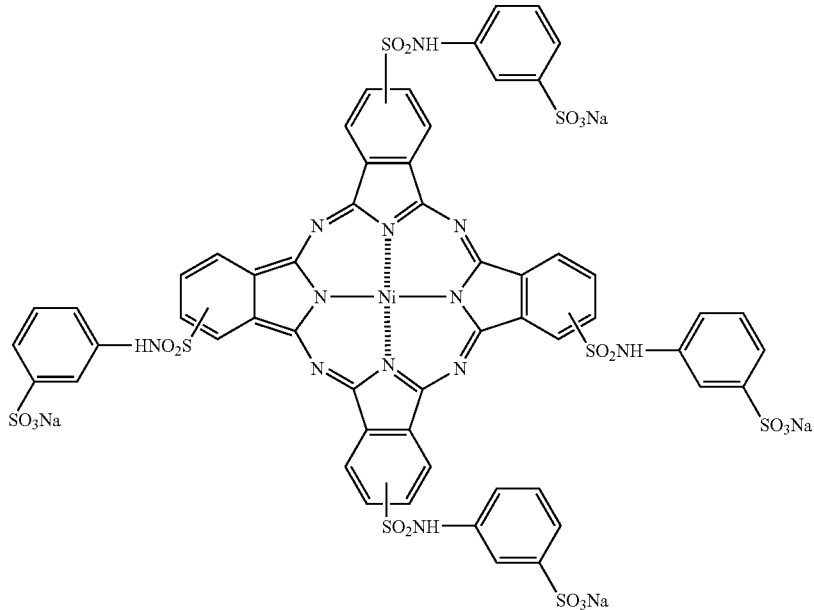
(I-11)
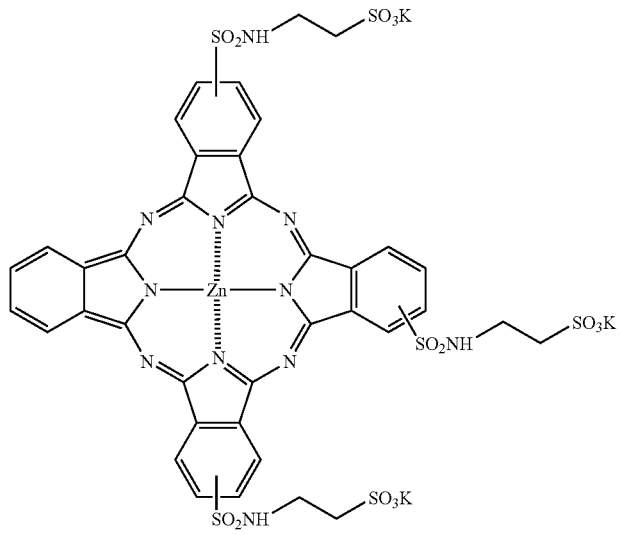
(I-12)
In the following tables, specific examples of each group of $(X_1, X_2)$, $(Y_{11}, Y_{12})$, $(Y_{13}, Y_{14})$, $(Y_{15}, Y_{16})$, $(Y_{17}, Y_{18})$ are not in order.

TABLE 14

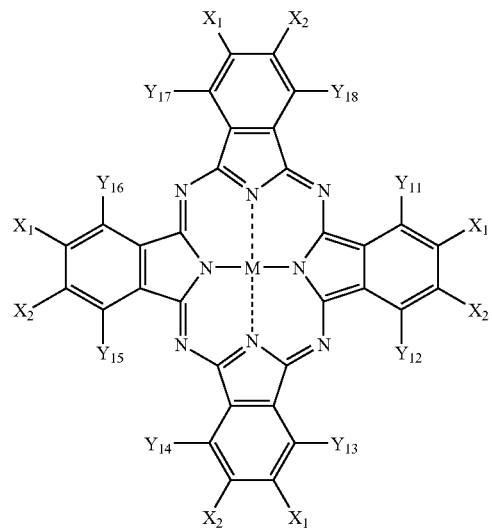

| No. | M | X₁ | X₂ | $Y_{11}$, $Y_{12}$ | $Y_{13}$, $Y_{14}$ | $Y_{15}$, $Y_{16}$ | $Y_{17}$, $Y_{18}$ |
|---|---|---|---|---|---|---|---|
| 101 | Cu | —SO₂—NH—CH₂—CH₂—SO₃Li | —H | —H, —H | —H, —H | —H, —H | —H, —H |
| 102 | Cu | —SO₂—NH—CH₂—CH(OH)—CO—NH—CH₂CH₂—SO₃Na | —H | —Cl, —H | —Cl, —H | —Cl, —H | —Cl, —H |
| 103 | Cu | —SO₂—NH—CH₂—CH₂—CH₂—SO₂NH—CH₂CH(OH)—SO₃Li | —H | —H, —H | —H, —H | —H, —H | —H, —H |
| 104 | Cu | —SO₂—NH—C₆H₄—SO₂NH—CH₂CH₂—SO₃Li | —H | —H, —H | —H, —H | —H, —H | —H, —H |
| 105 | Ni | —SO₂—NH—CH₂—CH₂—CO—NH—CH(CH₂—COONa)—COONa | —H | —Cl, —H | —Cl, —H | —Cl, —H | —Cl, —H |
| 106 | Cu | —SO₂—NH—CH₂—CH₂—SO₂—NH—CH₂—COONa | —CN | —H, —H | —H, —H | —H, —H | —H, —H |
| 107 | Cu | —SO₂—CH₂—CH₂—CH₂—SO₂—NH—CH(CH₂—OH)—COOLi | —H | —H, —H | —H, —H | —H, —H | —H, —H |
| 108 | Cu | —SO₂—CH₂—CH₂—CH₂—SO₃Li | —H | —H, —H | —H, —H | —H, —H | —H, —H |
| 109 | Cu | —SO₂—CH₂—CH₂—CH₂—SO₃K | —H | —H, —H | —H, —H | —H, —H | —H, —H |
| 110 | Cu | —SO₂—(CH₂)₃—CO₂K | —H | —H, —H | —H, —H | —H, —H | —H, —H |

TABLE 15

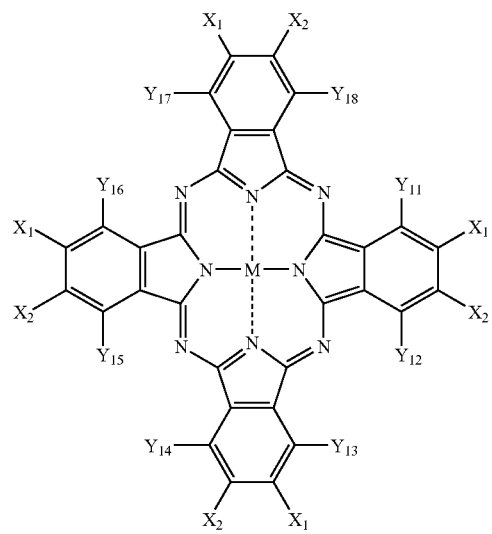

| No. | M | $X_1$ | $X_2$ | $Y_{11}$, $Y_{12}$ | $Y_{13}$, $Y_{14}$ | $Y_{15}$, $Y_{16}$ | $Y_{17}$, $Y_{18}$ |
|---|---|---|---|---|---|---|---|
| 111 | Cu | $-SO_2-NH-CH_2-CH_2-CH_2-SO_2-NH-CH_2\underset{OH}{CH}-CH_2-SO_3Li$ | $-H$ | $-H$, $-H$ | $-H$, $-H$ | $-H$, $-H$ | $-H$, $-H$ |
| 112 | Cu | $-SO_2-NH-CH_2-CH_2-CH_2-SO_2NH-CH_2\underset{OH}{CH}-CH_3$ | $-SO_3Li$ | $-H$, $-H$ | $-H$, $-H$ | $-H$, $-H$ | $-H$, $-H$ |
| 113 | Cu | $-SO_2-CH_2-\underset{OH}{CH}-CH_2SO_3K$ | $-H$ | $-H$, $-H$ | $-H$, $-H$ | $-H$, $-H$ | $-H$, $-H$ |
| 114 | Cu | $-SO_2-CH_2-\underset{OH}{CH}-CH_3$ | $-SO_3Li$ | $-H$, $-H$ | $-H$, $-H$ | $-H$, $-H$ | $-H$, $-H$ |
| 115 | Cu | $-SO_2NH(CH_2)_3\overset{CH_3}{\underset{\oplus}{N}}(CH_2CH_2OH)_2-CH_3-\underset{}{\bigcirc}-SO_3^{\ominus}$ | $-H$ | $-H$, $-H$ | $-H$, $-H$ | $-H$, $-H$ | $-H$, $-H$ |
| 116 | Cu | $-CO-NH-CH_2-\underset{OH}{CH}-CH_2SO_3K$ | $-H$ | $-H$, $-H$ | $-H$, $-H$ | $-H$, $-H$ | $-H$, $-H$ |
| 117 | Cu | $-CO-NH-\underset{COOLi}{CH}-CH_2CH_2SO_3Li$ | $-H$ | $-H$, $-H$ | $-H$, $-H$ | $-H$, $-H$ | $-H$, $-H$ |

TABLE 16
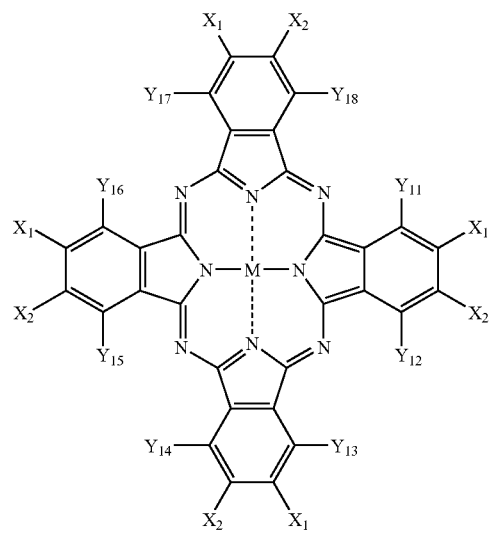
| No. | M | X₁ | X₂ | Y₁₁, Y₁₂ | Y₁₃, Y₁₄ | Y₁₅, Y₁₆ | Y₁₇ | Y₁₈ |
|---|---|---|---|---|---|---|---|---|
| 118 | Cu | —SO₂CH₂CH₂CH(CH₃)SO₃Li | —H | —H, —H | —H, —H | —H, —H | —H | —H |
| 119 | Cu | —SO₂—CH₂—CH(OH)—CH₂—SO₃Na | —H | —H, —H | —H, —H | —H, —H | —H | —H |
| 120 | Cu | —SO₂—CH₂—CH₂—CH(CH₃)—COOLi | —H | —H, —H | —H, —H | —H, —H | —H | —H |
| 121 | Cu | —SO₂(CH₂)₃SO₂NHCH₂—CH(OH)—CH₂—SO₃Li | —H | —H, —H | —H, —H | —H, —H | —H | —H |
| 122 | Cu | —CO₂CH₂CH₂CH₂SO₂—NH—CH₂—CH(OH)—CH₂—SO₃Li | —H | —H, —H | —H, —H | —H, —H | —H | —H |
| 123 | Cu | —SO₂NH—C₈H₁₇(t) | —H | —H, —H | —H, —H | —H, —H | —H | —H |
| 124 | Cu | —SO₂—NH—CH₂—CH(CH₂CH₃)—CH₂CHCH₂—CH₃ | —H | —H, —H | —H, —H | —H, —H | —H | —H |

TABLE 17

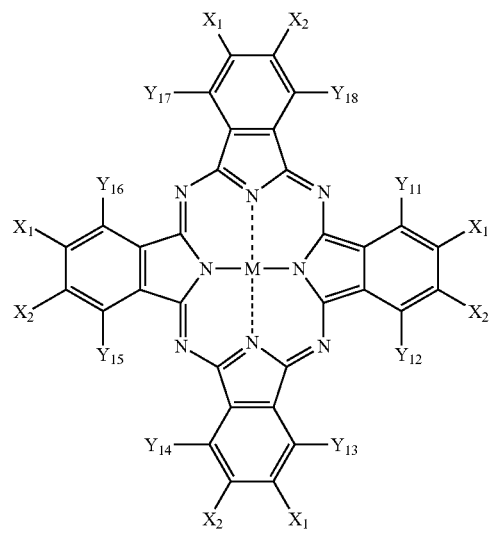

| No. | M | $X_1$ | $X_2$ | $Y_{11}$, $Y_{12}$ | $Y_{13}$, $Y_{14}$ | $Y_{15}$, $Y_{16}$ | $Y_{17}$, $Y_{18}$ |
|---|---|---|---|---|---|---|---|
| 125 | Cu | —SO$_2$CH$_2$CH$_2$CH$_2$SO$_2$—NH—CH$_2$—CH(CH$_3$)—CH$_2$—CH$_3$ | —H | —H, —H | —H, —H | —H, —H | —H, —H |
| 126 | Cu | —SO$_2$—CH$_2$—CH$_2$—CH$_2$—CO$_2$—CH(CH$_3$)—CH$_2$—O—CH$_3$ | —H | —H, —H | —H, —H | —H, —H | —H, —H |
| 127 | Cu | —SO$_2$CH$_2$CH$_2$CH$_2$SO$_2$NHCH$_2$CH$_2$CH$_2$O—CH(CH$_3$)$_2$ | —H | —H, —H | —H, —H | —H, —H | —H, —H |
| 128 | Zn | —SO$_2$—CH$_2$—CH(OCH$_3$)—CH$_2$—O—CH$_2$ | —CN | —H, —H | —H, —H | —H, —H | —H, —H |
| 129 | Cu | —CO—NH—CH$_2$—CH(CH$_2$CH$_3$)—CH$_2$—CH$_2$—CH$_2$CH$_3$ | —H | —Cl, —H | —Cl, —H | —Cl, —H | —Cl, —H |
| 130 | Cu | —CO—CH(CH$_3$)—CH$_2$—O—C$_4$H$_9$(t) | —H | —H, —H | —H, —H | —H, —H | —H, —H |
| 131 | Cu | —SO$_2$—CH$_2$—CH$_2$—CH(CH$_3$)—SO$_2$—NH—(2,5-(SO$_3$Li)$_2$C$_6$H$_3$) | —H | —H, —H | —H, —H | —H, —H | —H, —H |

TABLE 18
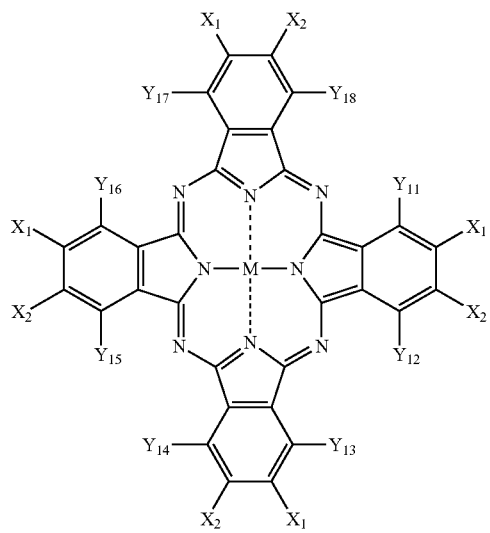
| No. | M | X₁ | X₂ | Y₁₁, Y₁₂ | Y₁₃, Y₁₄ | Y₁₅, Y₁₆ | Y₁₇, Y₁₈ |
|---|---|---|---|---|---|---|---|
| 132 | Cu | —SO₂NH—C₆H₃(CO₂C₆H₁₃(n))₂ | —H | —H, —H | —H, —H | —H, —H | —H, —H |
| 133 | Cu | —SO₂NH—C₆H₃(OCH₂CH₂OCH₃)(SO₂NHCH₂CH(C₂H₅)C₄H₉) | —H | —H, —H | —H, —H | —H, —H | —H, —H |
| 134 | Cu | —SO₂NH—C₆H₄—SO₂—NH—CH₂—CH(CH₂CH₃)—CH₂CH—CH₂—CH₃ | —H | —H, —H | —H, —H | —H, —H | —H, —H |
| 135 | Cu | —SO₂—C₆H₄—CO₂Na | —H | —H, —H | —H, —H | —H, —H | —H, —H |
| 136 | Cu | —SO₂—N(C₄H₉(n))(C₆H₅) | —H | —H, —H | —H, —H | —H, —H | —H, —H |

TABLE 19
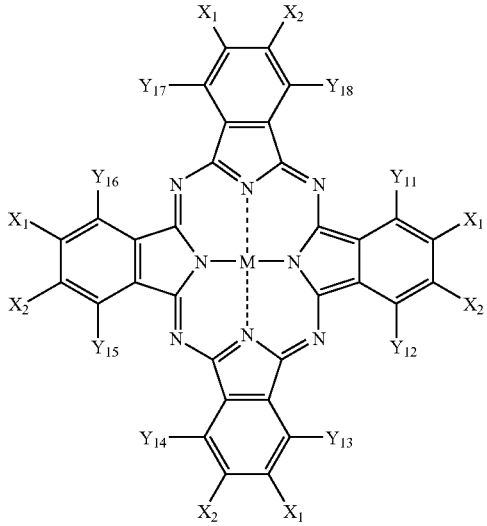
| No. | M | $X_1$ | $X_2$ | $Y_{11}$, $Y_{12}$ | $Y_{13}$, $Y_{14}$ | $Y_{15}$, $Y_{16}$ | $Y_{17}$, $Y_{18}$ |
|---|---|---|---|---|---|---|---|
| 137 | Cu | 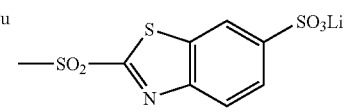 | —H | —H, —H | —H, —H | —H, —H | —H, —H |
| 138 | Cu | 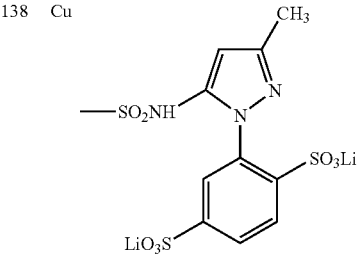 | —H | —H, —H | —H, —H | —H, —H | —H, —H |
| 139 | Cu | 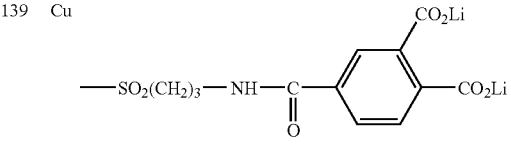 | —Cl | —H, —H | —H, —H | —H, —H | —H, —H |
| 140 | Cu | 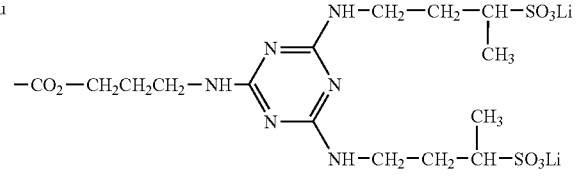 | —H | —H, —H | —H, —H | —H, —H | —H, —H |

TABLE 20

[Structure: Phthalocyanine with central M, substituents X₁, X₂ on each benzene ring and Y₁₁–Y₁₈ positions]

| No. | M | X₁ |
|---|---|---|
| 141 | Cu | —SO₂NH—CH(COONa)—CH₂—CO—N—(CH₂CH₂OH)₂ |
| 142 | Cu | —SO₂NH—(C₆H₄)—NHC(O)—(C₆H₄)—SO₃Li |
| 143 | Cu | —CO—NH—CH₂—CH(OH)—CO—NH—CH(COOK)—CH₂CH₂—SO₃K |
| 144 | Cu | —SO₂—CH₂CH₂CH₂—NH—CO—(C₆H₄)—CO—NH—CH(COOLi)—CH₂—COOLi |
| 145 | Cu | —SO₂CH₂CH₂OCH₂CH₂OCH₂CH₂SO₃Li |

| No. | X₂ | Y₁₁, | Y₁₂ | Y₁₃, | Y₁₄ | Y₁₅, | Y₁₆ | Y₁₇, | Y₁₈ |
|---|---|---|---|---|---|---|---|---|---|
| 141 | —H | —H, | —H | —H, | —H | —H, | —H | —H, | —H |
| 142 | —H | —H, | —H | —H, | —H | —H, | —H | —H, | —H |
| 143 | —H | —H, | —H | —H, | —H | —H, | —H | —H, | —H |
| 144 | —H | —H, | —H | —H, | —H | —H, | —H | —H, | —H |
| 145 | —H | —H, | —H | —H, | —H | —H, | —H | —H, | —H |

TABLE 21

In the table, introducing position of each substituent (Xp₁) and (Xp₂) in β-position substituent type is not in order.
M-Pc(Xp₁)⑦(Xp₂)⑦

| No. | M | Xp₁ | m |
|---|---|---|---|
| 146 | Cu | —SO₂—NH—CH₂—CH(CH₃)—SO₃Li | 3 |
| 147 | Cu | —SO₂—NH—CH₂—CH₂SO₃Li | 3 |

TABLE 21-continued

In the table, introducing position of each substituent (Xp$_1$) and (Xp$_2$) in β-position substituent type is not in order.
M-Pc(Xp$_1$)⑦(Xp$_2$)⑦

| No. | M | Xp$_1$ | n |
|---|---|---|---|
| 148 | Cu | —SO$_2$—NH—CH$_2$—CH(CH$_3$)—SO$_3$Li | 3 |
| 149 | Cu | —SO$_2$—NH—CH$_2$—CH(CH$_3$)—SO$_3$Li | 2 |
| 150 | Cu | —SO$_2$—NH—CH$_2$—CH$_2$—SO$_2$—NH—CH$_2$CH$_2$—COONa | 3 |
| 151 | Cu | —SO$_2$—NH—C$_6$H$_4$—SO$_2$NH—CH$_2$—CH(OH)—SO$_3$Li | 3 |
| 152 | Cu | —SO$_2$—CH$_2$—CH$_2$—CH(CH$_3$)—SO$_3$Li | 2.5 |
| 153 | Cu | —SO$_2$—CH$_2$—CH$_2$—CH(CH$_3$)—SO$_3$Na | 2 |
| 154 | Cu | —SO$_2$—CH$_2$—CH$_2$—CH$_2$—SO$_3$Li | 3 |
| 155 | Cu | —SO$_2$—CH$_2$—CH$_2$—CH$_3$—COOK | 2 |
| 156 | Cu | —SO$_2$—CH$_2$—CH$_2$—CH$_2$—SO$_2$Li | 3 |
| 157 | Cu | —SO$_2$—CH$_2$—CH$_2$—O—CH$_2$—CH$_2$—SO$_2$Li | 2 |

| No. | Xp$_2$ | n |
|---|---|---|
| 146 | —SO$_2$—NH—CH$_2$—CH(OH)—CH$_3$ | 1 |
| 147 | —SO$_2$—NH—CH$_2$—CH$_2$—CH$_2$—SO$_2$—NH—CH$_2$—CH(OH)—CH$_3$ | 1 |
| 148 | —SO$_2$NH—CH$_2$—CH$_2$—SO$_2$—NH—CH$_2$—O—CH$_2$—CH$_2$—OH | 1 |
| 149 | —SO$_2$—NH—CH$_2$—CH$_2$—CH$_2$—CO—N-(CH$_2$—CH$_2$—OH)$_2$ | 2 |
| 150 | —SO$_2$NH—CH(CH$_3$)—CH$_2$OH | 1 |
| 151 | —SO$_2$NH—CH$_2$—CH$_2$—O—CH$_2$—CH$_2$—OH | 1 |
| 152 | —SO$_2$—CH$_2$—CH$_2$—O—CH$_2$—CH$_2$—OH | 1.5 |
| 153 | —SO$_2$—CH$_2$—CH$_2$—CH$_2$—CO—N-(CH$_2$—CH$_2$—OH)$_2$ | 2 |
| 154 | —SO$_2$—CH$_2$—CH$_2$—CH$_2$—SO$_2$—NH—CH$_2$—CH(OH)—CH$_3$ | 1 |
| 155 | —SO$_2$—CH$_2$—CH$_2$—CH$_2$—SO$_2$—NH—CH$_2$—CH(OH)—CH$_2$—COOK | 2 |
| 156 | —SO$_2$—CH$_2$—CH(OH)—CH$_2$—SO$_3$Li | 1 |
| 157 | —SO$_2$—CH$_2$—CH$_2$—CH$_2$—CO$_2$—CH$_2$—CH$_2$—CH(OH)—CH$_2$—COOK | 2 |

TABLE 22

In the table, introducing position of each substituent (Xp$_1$) and (Xp$_2$) in β-position substituent type is not in order.
M-Pc(Xp$_1$)⑦(Xp$_2$)⑦

| No. | M | Xp$_1$ | m | Xp$_2$ | n |
|---|---|---|---|---|---|
| 158 | Cu | —SO$_2$—CH$_2$—CH(OH)—CH$_2$SO$_3$Li | 3 | —SO$_2$—CH$_2$—C$_6$H$_4$—SO$_2$NH—CH$_2$—CH(OH)—CH$_2$—OH | 1 |
| 159 | Cu | —SO$_2$NHCH$_2$CH$_2$—SO$_3$Li | 3 | —SO$_2$—CH$_2$—CH$_2$—CH$_2$—SO$_2$—NH—CH$_2$—CH(OH)—CH$_3$ | 1 |
| 160 | Cu | —SO$_2$—CH$_2$—CH$_2$—O—CH$_2$—CH$_2$—O—CH$_2$—CH$_2$—SO$_2$Na | 3 | —SO$_2$—CH$_2$—CH$_2$—CH$_2$—CO—N(CH$_2$—CH$_2$—COONa)(CH$_2$—COONa) | 1 |
| 161 | Cu | —SO$_2$CH$_2$CH$_2$CH$_2$SO$_3$Li | 3 | —SO$_2$CH$_2$CH$_2$CH$_2$SO$_2$NHCH$_2$—CH(OH)—CH$_2$SO$_3$Li | 1 |
| 162 | Cu | —SO$_2$CH$_2$CH$_2$CH$_2$SO$_3$Li | 2 | —SO$_2$CH$_2$CH$_2$OCH$_2$CH$_2$OCH$_3$CH$_2$OH | 2 |
| 163 | Cu | —SO$_2$CH$_2$CH$_2$CH$_2$SO$_3$K | 3 | —SO$_2$CH$_2$CH$_2$CH$_2$SO$_2$NH—CH(CH$_3$)—CH$_2$—OH | 1 |
| 164 | Cu | —SO$_2$CH$_2$CH$_2$CH$_2$SO$_3$Li | 2 | —SO$_2$CH$_2$CH$_2$CH$_2$SO$_2$N(CH$_2$CH$_2$OH)$_2$ | 2 |
| 165 | Cu | —CO—NH—CH$_2$—CH$_2$—SO$_3$K | 3 | —CO—NH—CH$_2$—CH$_2$—O—CH$_2$—CH$_2$OH | 1 |
| 166 | Cu | —CO—NH—CH$_2$—CH$_2$—SO$_2$—NH—CH$_2$—CH$_2$—COONa | 3 | —CO—NH—CH$_2$—CH(OH)—CH$_3$ | 1 |
| 167 | Cu | —SO$_2$(CH$_2$)$_3$SO$_2$NHCH$_2$—CH(OH)—CH$_2$CO$_2$Li | 2.5 | —CO—NH—CH$_2$—CH$_2$—CH$_2$—CO—N(CH$_2$—CH$_2$—OH)$_2$ | 1.5 |
| 168 | Cu | —CO$_2$—CH$_2$—CH$_2$—CH(CH$_3$)—SO$_3$Na | 2 | —CO—CH$_2$—CH$_2$—CH$_2$—CO—N(CH$_2$—CH$_2$—OH)$_2$ | 2 |
| 169 | Cu | —CO$_2$—CH$_2$—CH$_2$—CH$_2$—SO$_3$Li | 3 | —CO$_2$—CH$_2$—CH$_2$—CH$_2$—SO$_2$—NH—CH$_2$—CH(OH)—CH$_3$ | 1 |
| 170 | Cu | —CO$_2$—CH$_2$—CH$_2$—CH$_2$COOK | 2 | —CO$_2$—CH$_2$—CH$_2$—CH$_2$—SO$_2$—NH—CH$_2$—CH(OH)—CH$_2$—COOK | 2 |

TABLE 23

In the table, introducing position of each substituent (Xp$_1$) and (Xp$_2$) in β-position substituent type is not in order.
M-Pc(Xp$_1$)⑦(Xp$_2$)⑦

| No. | M | Xp$_1$ | m |
|---|---|---|---|
| 171 | Cu | —CO$_2$—CH$_2$—CH$_2$—O—CH$_2$—CH$_2$—O—CH$_2$—CH$_2$—SO$_2$Na | 3 |
| 172 | Cu | —SO$_2$CH$_2$CH$_2$OCH$_2$CH$_2$O—CH$_2$CH$_2$SO$_3$K | 2 |
| 173 | Cu | —SO$_2$(CH$_2$)$_3$SO$_2$NHCH$_2$CH(OH)CH$_2$OH | 2 |
| 174 | Cu | —SO$_2$(CH$_2$)$_3$SO$_2$NHCH$_2$—CH(OH)—CH$_2$SO$_3$K | 3 |
| 175 | Cu | —SO$_2$(CH$_2$)$_3$SO$_2$NH(CH$_2$)$_3$N(CH$_2$CH$_2$OH)$_2$ | 2 |

TABLE 23-continued

In the table, introducing position of each substituent (Xp$_1$) and (Xp$_2$) in β-position substituent type is not in order.
M-Pc(Xp$_1$)⑦(Xp$_2$)⑦

| No. | | | n |
|---|---|---|---|
| 176 | Cu | —SO$_2$—CH$_2$—CH$_2$—CH$_2$—SO$_2$—NH—CH$_2$—CH(OH)—CH$_3$ | 3 |
| 177 | Cu | —SO$_2$—CH$_2$—CH$_2$—O—CH$_2$—CH$_2$—O—CH$_3$ | 2 |
| 178 | Cu | —SO$_2$—CH$_2$—CH$_2$—O—CH$_2$—CH$_2$—O—CH$_2$—CH$_2$—OH | 3 |
| 179 | Cu | —SO$_2$—CH$_2$—CH(CH$_2$CH$_3$)—CH$_2$CH$_2$—CH$_2$CH$_3$ | 2 |
| 180 | Cu | —SO$_2$—CH$_2$—CH$_2$—CH$_2$—SO$_2$—NH—CH$_2$—CH(O—CH$_3$)—CH$_3$ | 3 |
| 181 | Cu | —SO$_2$—CH$_2$—CH$_2$—CH$_2$—CO$_2$—NH—CH(CH$_3$)—CH$_2$—CH$_3$ | 3 |
| 182 | Cu | —SO$_2$—CH$_2$—CH$_2$—CH$_2$—SO$_2$NH—CH$_2$—CH(OH)—CH$_3$ | 2.5 |

| No. | Xp$_2$ | n |
|---|---|---|
| 171 | —SO$_2$—CH$_2$—C$_6$H$_4$—SO$_2$NH—CH$_2$—CH(OH)—CH$_2$—OH | 1 |
| 172 | —CO$_2$—CH$_2$—CH$_2$—CH$_2$—CO$_2$—CH$_2$—CH$_2$—CH(OH)—CH$_2$—COOK | 2 |
| 173 | —CO$_2$—CH$_2$—CH(OH)—CH$_2$—CH$_2$—SO$_3$Li | 2 |
| 174 | —CO$_2$—CH$_2$—CH$_2$—CH$_2$—SO$_2$—NH—CH$_2$—CH(OH)—CH$_3$ | 1 |
| 175 | —CO$_2$—CH$_2$—CH$_2$—CH$_2$—CO—NH—CH$_2$—COOLi, with CH$_2$—CH$_2$—COOLi branch | 2 |
| 176 | —SO$_2$—CH$_2$—CH$_2$—CH$_2$—SO$_2$—NH—CH$_2$—CH(CH$_2$CH$_3$)—CH$_2$CH$_2$—CH$_2$CH$_3$ | 1 |
| 177 | —SO$_2$—CH$_2$—CH$_2$—CH$_2$—SO$_2$—NH—CH$_2$—CH(OH)—CH$_3$ | 1 |
| 178 | —SO$_2$—CH$_2$—CH$_2$—CH$_2$—CO$_2$—CH$_2$—CH(CH$_2$CH$_3$)—CH$_2$CH$_2$—CH$_2$CH$_3$ | 1 |
| 179 | —SO$_2$—CH$_2$—CH$_2$—CH$_2$—SO$_2$—NH—CH$_2$—CH(O—CH$_3$)—CH$_3$ | 2 |
| 180 | —SO$_2$NH—CH$_2$—CH$_2$—SO$_2$NH—CH$_2$CH$_2$—O—CH$_2$—CH$_2$—OH | 1 |
| 181 | —SO$_2$—CH$_2$—CH$_2$—CH$_2$—SO$_2$—NH—CH(CH$_3$)$_2$ | 1 |
| 182 | —SO$_2$—CH$_2$—CH$_2$—CH$_2$—CO$_2$—NH—CH(CH$_3$)—CH$_2$—CH$_3$ | 1.5 |

TABLE 24

In the table, introducing position of each substituent ($Xp_1$) and ($Xp_2$) in β-position substituent type is not in order.

$M\text{-}Pc(Xp_1)\text{⑦}(Xp_2)\text{⑦}$

| No. | M | $Xp_1$ | m | $Xp_2$ | n |
|---|---|---|---|---|---|
| 183 | Cu | —$SO_2$—$CH_2$—$CH_2$—$CH_2$—$CO_2$—NH—CH($CH_3$)—$CH_2$—$CH_3$ | 2 | —$SO_2$—$CH_2$—$CH_2$—$CH_2$—$SO_2$—NH—($CH_2$)$_3$—$CH_2$—O—$CH_2CH_2$—OH | 2 |
| 184 | Cu | —$SO_2$—$CH_2$—$CH_2$—$CH_2$—$SO_2$—NH—$CH_2$—CH(OH)—$CH_3$ | 3 | —$SO_2$—$CH_2$—$CH_2$—O—$CH_2$—$CH_2$—O—$CH_3$ | 1 |
| 185 | Cu | —$SO_2$—$CH_2$—$CH_2$—$CH_2$—$SO_2$—NH—$CH_2$—CH(OH)—$CH_3$ | 3 | —$SO_2$—$CH_2$—$CH_2$—O—$CH_2$—$CH_2$—O—$CH_2$—$CH_2$—O—$CH_3$ | 1 |
| 186 | Cu | —$SO_2$—$CH_2$—$CH_2$—$CH_2$—$CO_2$—NH—CH($CH_3$)—$CH_2$—$CH_3$ | 3 | —$SO_2$—$CH_2$—$CH_2$—O—$CH_2$—$CH_2$—O—$CH_2$—$CH_2$—OH | 1 |
| 187 | Cu | —SO—$CH_2$—$CH_2$—$CH_2$—$SO_2$—NH—CH($CH_3$)$_2$ | 3 | —$CO_2$—$CH_2$—CH($CH_2CH_3$)—$CH_2$—$CH_2$—$CH_2CH_3$ | 1 |
| 188 | Cu | —$CO_2$—$CH_2$—$CH_2$—$CH_2$—$CO_2$—NH—CH($CH_3$)—$CH_2$—$CH_3$ | 3 | —$CO_2$—$CH_2$—$CH_2$—O—$CH_2$—$CH_2$—O—$CH_3$ | 1 |
| 189 | Cu | —CO—NH—$CH_2$—$CH_2$—$SO_2$—NH—CH($CH_3$)$_2$ | 3 | —$SO_2$—NH—$CH_2$—CH($CH_2CH_3$)—$CH_2$—$CH_2$—$CH_2$—$CH_3$ | 1 |
| 190 | Cu | —CO—NH—$CH_2$—CH($CH_2CH_3$)—$CH_2$—$CH_2$—$CH_2CH_3$ | 3 | —CO—NH—$CH_2$—$CH_2$—O—$CH_2$—$CH_2$—O—$CH_3$ | 1 |

The structure of the phthalocyanine compound shown by $M\text{-}Pc(Xp_1)_m(Xp_2)_n$ in Tables 21 to 24 is as follows:

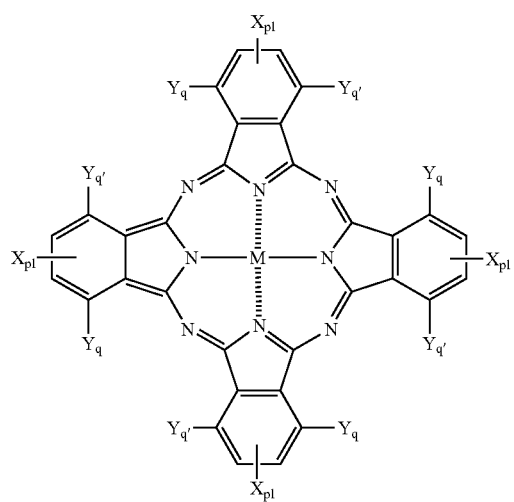

(each independently, $Xp_1=Xp_1$ or $Xp_2$)

Phthalocyanine dye represented by formula (I) can be synthesized according to the above patents. Phthalocyanine dye represented by formula (II) can be synthesized according to the methods disclosed in JP-A-2001-226275, JP-A-2001-96610, JP-A-2001-47013 and JP-A-2001-193638 besides the above synthesizing methods. The starting materials, dye intermediates and synthesizing route are not limited to these.

The things concerning the ink of the invention other than colorants, e.g., dyes and pigments, are described below.

The ink in the present invention can contain surfactants other than the compound represented by formula (1).

By adding a compound represented by formula (1) and other surfactants, if necessary, to ink, the liquid properties of ink are adjusted, thereby the discharge stability of ink is improved, which has excellent effect in water resistance of image and prevention of blotting.

As such surfactants, anionic surfactants, e.g., sodium dodecylsulfate, sodium dodecyloxysulfonate, and sodium alkylbenzenesulfonate, cationic surfactants, e.g., cetyl pyridinium chloride, trimethylcetylammonium chloride, and tetrabutylammonium chloride, and nonionic surfactants, e.g., polyoxyethylene nonylphenyl ether, polyoxyethylene naphthyl ether, and polyoxyethylene octylphenyl ether can be exemplified. Nonionic surfactants are particularly preferably used.

The content of surfactants is from 0.001 to 15 wt %, preferably from 0.005 to 10 wt %, and more preferably from 0.01 to 5 wt %, based on the ink.

The ink for ink jet of the invention can be prepared by dissolving and/or dispersing the dye and surfactants in an aqueous medium. The "aqueous medium" in the invention is a medium obtained by adding additives such as a wetting agent, a stabilizer and an antiseptic to water or a mixture of water and small amount of water-miscible organic solvent.

In preparing an ink solution of the invention, in the case of water-soluble ink, it is preferred to dissolve an ink solution in water, and then various solvents and additives are added, dissolved and mixed to thereby make a homogeneous ink solution.

As the dissolving methods at this time, various dissolution methods can be used, e.g., dissolution by stirring, dissolution by ultrasonic irradiation, and dissolution by penetration. Stirring method is preferred of all. Various well-known stirring methods, e.g., flow stirring, reverse agitator, and stirring by dissolver using shear force, can be used. A stirring method utilizing the shear force with the bottom of a container can also be used.

The examples of water-miscible organic solvents which can be used in the present invention include alcohols (e.g., methanol, ethanol, propanol, isopropanol, butanol, isobutanol, sec-butanol, t-butanol, pentanol, hexanol, cyclohexanol and benzyl alcohol), polyhydric alcohols (e.g., ethylene glycol, diethylene glycol, triethylene glycol, polyethylene glycol, propylene glycol, dipropylene glycol, polypropylene glycol, butylene glycol, hexanediol, pentanediol, glycerol, hexanetriol and thioglycol), glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, and ethylene glycol monophenyl ether), amines (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine and tetramethylpropylenediamine), and other polar solvents (e.g., formamide, N,N-dimethylformamide, N,N-dimethylacetamide, dimethyl sulfoxide, sulforan, 2-pyrrolidone, N-methyl-2-pyrrolidone, N-vinyl-2-pyrrolidone, 2-oxazolidone, 1,3-dimethyl-2-imidazolidinone, acetonitrile and acetone). These water-miscible organic solvents may be used in combination of two or more.

When the dye is a water-soluble dye, the ink of the present invention can be manufactured by dissolving the dye in a high boiling point organic solvent and then emulsifying and dispersing the dye in an aqueous medium.

The boiling point of the high boiling point organic solvents which are used in the present invention is 150° C. or more, and preferably 170° C. or more.

The examples of the high boiling point organic solvents include phthalic esters (e.g., dibutyl phthalate, dioctyl phthalate, dicyclohexyl phthalate, di-2-ethylhexyl phthalate, decyl phthalate, bis(2,4-di-tert-amylphenyl) isophthalate, and bis(1,1-diethylpropyl) phthalate), phosphoric or phosphonic esters (e.g., diphenyl phosphate, triphenyl phosphate, tricresyl phosphate, 2-ethylhexyldiphenyl phosphate, dioctylbutyl phosphate, tricyclohexyl phosphate, tri-2-ethylhexyl phosphate, tridecyl phosphate, and di-2-ethylhexylphenyl phosphate), benzoic esters (e.g., 2-ethylhexyl benzoate, 2,4-dichlorobenzoate, dodecyl benzoate, and 2-ethylhexyl-p-hydroxy benzoate), amides (e.g., N,N-diethyldodecanamide and N,N-diethyllaurylamide), alcohols or phenols (e.g., isostearyl alcohol, and 2,4-di-tert-amylphenol), aliphatic esters (e.g., dibutoxyethyl succinate, di-2-ethylhexyl succinate, 2-hexadecyl tetradecanoate, tributyl citrate, diethyl azelate, isostearyl lactate, and trioctyl citrate), aniline derivatives (e.g., N,N-dibutyl-2-butoxy-5-tert-octylaniline), chlorinated paraffins (e.g., paraffins having a chlorine content of from 10 to 80%), trimesic esters (e.g., tributyl trimesate), dodecylbenzene, diisopropylnaphthalene, phenols (e.g., 2,4-di-tert-amylphenol, 4-dodecyloxyphenol, 4-dodecyloxycarbonylphenol, and 4-(4-dodecyloxyphenylsulfonyl)phenol), carboxylic acids (e.g., 2-(2,4-di-tert-amylphenoxybutyric acid and 2-ethoxyoctane-decanoic acid), and alkylphosphoric acids (e.g., di-2-(ethylhexyl) phosphoric acid and diphenylphosphoric acid) The high boiling point organic solvents can be used in an amount of from 0.01 to 3 times of the oil-soluble dye in a mass ratio, and preferably from 0.01 to 1.0 time. When a high boiling point organic solvents are present, dyes and other non-volatile components are difficult to precipitate on dispersing in ink, and the stability of ink is improved and discharge stability can be ensured.

These high boiling point organic solvents may be used alone, or may be used as mixture of two or more (e.g., mixtures of tricresyl phosphate and dibutyl phthalate, trioctyl phosphate and di(2-ethylhexyl) sebacate, and dibutyl phthalate and poly(N-t-butylacrylamide)).

The examples of the high boiling point organic solvents other than the above compounds which are used in the present invention and/or the synthesis methods of these high boiling point organic solvents are disclosed, e.g., in U.S. Pat. Nos. 2,322,027, 2,533,514, 2,772,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,873, 4,430,421, 4,430,422, 4,464,464, 4,483,918, 4,540,657, 4,684,606, 4,728,599, 4,745,049, 4,935,321, 5,013,639, EP-A-276319, EP-A-286253, EP-A-289820, EP-A-309158, EP-A-309159, EP-A-309160, EP-A-509311, EP-A-510576, East German Patents 147,009, 157,147, 159,573, 225,240A, British Patent 2,091,124A, JP-A-48-47335, JP-A-50-26530, JP-A-51-25133, JP-A-51-26036, JP-A-51-27921, JP-A-51-27922, JP-A-51-149028, JP-A-52-46816, JP-A-53-1520, JP-A-53-1521, JP-A-53-15127, JP-A-53-146622, JP-A-54-91325, JP-A-54-106228, JP-A-54-118246, JP-A-55-59464, JP-A-56-64333, JP-A-56-81836, JP-A-59-204041, JP-A-61-84641, JP-A-62-118345, JP-A-62-247364, JP-A-63-167357, JP-A-63-214744, JP-A-63-301941, JP-A-64-9452, JP-A-64-9454, JP-A-64-68745, JP-A-1-101543, JP-A-1-102454, JP-A-2-792, JP-A-2-4239, JP-A-2-43541, JP-A-4-29237, JP-A-4-30165, JP-A-4-232946 and JP-A-4-346338.

The high boiling point organic solvents are used in an amount of from 0.01 to 3.0 times of the oil-soluble dye in a mass ratio, and preferably from 0.01 to 1.0 time.

In the invention, oil-soluble dyes and high boiling point organic solvents are emulsified and dispersed in an aqueous medium. In emulsification-dispersion, a low boiling point organic solvent can be used in some cases from the viewpoint of an emulsifying property. The low boiling point organic solvent is an organic solvent having a boiling point of from about 30° C. to about 150° C. at atmospheric pressure. For example, esters (e.g., ethyl acetate, butyl acetate, ethyl propionate, beta-ethoxyethyl acetate and methyl Cellosolve acetate), alcohols (e.g., isopropylalcohol, n-butylalcohol and sec-butyl alcohol), ketones (e.g., methyl isobutyl ketone, methyl ethyl ketone and cyclohexanone), amides (e.g., dimethylformamide and N-methylpyrrolidone), and ethers (e.g., tetrahydrofuran and dioxane) are preferably used as low boiling point organic solvents, but low boiling point organic solvents are not limited to these compounds.

An oil phase comprising a dye dissolved in a high boiling point organic solvent, and in certain circumstances, in a mixed solvent of a high boiling point organic solvent and a low boiling point organic solvent, is emulsified and dispersed in a water phase mainly comprising water, to thereby form minute oil droplets of oil phase. At this time, the later-described additives, e.g., surfactants, wetting agents, dye stabilizers, emulsion stabilizers, antiseptics and antifungal agents, can be added to either one or both of a water phase and an oil phase, according to necessary.

A method of adding an oil phase to a water phase is generally performed as the emulsifying method, but a so-called phase reversal emulsifying method of dripping a water phase to an oil phase can also be preferably used. Further, when the azo dye for use in the present invention is water-soluble and the additives are oil-soluble, the above emulsifying method can also be used.

Various kinds of surfactants can be used in emulsification dispersion, such as anionic surfactants, e.g., fatty acid salts, alkyl sulfate, alkylbenzene sulfonate, alkylnaphthalene sulfonate, dialkyl sulfosuccinate, alkyl phosphate, condensation products of naphthalenesulfonic acid and formalin, and polyoxyethylene alkyl sulfate, and nonionic surfactants, e.g., polyoxyethylene alkyl ether, polyoxyethylene alkylaryl ether, polyoxyethylene fatty acid ester, sorbitan fatty acid ester, polyoxyethylene sorbitan fatty acid ester, polyoxyethylene alkylamine, glycerol fatty acid ester, and oxyethylene-oxypropylene block copolymer are preferably used. Further, SURFYNOLS (manufactured by Air Products & Chemicals), which is an acetylene-based polyoxyethylene oxide surfactant, is also preferably used. Amine oxide type ampholytic surfactants, e.g., N,N-dimethyl-N-alkylamine oxide, are also preferably used. In addition, the surfactants described in JP-A-59-157636, pp. 37 and 38, and *Research Disclosure*, No. 308119 (1989) can also be used.

Water-soluble polymers can be added in combination with the above surfactants for the purpose of stabilization just after emulsification. As such water-soluble polymers, polyvinyl alcohol, polyvinyl pyrrolidone, polyethylene oxide, polyacrylic acid, polyacrylamide and copolymers of these polymers are preferably used. It is also preferred to use natural water-soluble polymers, e.g., polysaccharides, casein and gelatin. For the stabilization of the dispersion product of a dye, polyvinyl, polyurethane, polyester, polyamide, polyurea and polycarbonate, which are substantially insoluble in an aqueous medium and produced by the polymerization of acrylic esters, methacrylic esters, vinyl esters, acrylamides, methacrylamides, olefins, styrenes, vinyl ethers and acrylonitriles, can also be used in combination. It is preferred for these polymers to contain $-SO_3^-$ or $-COO^-$. When these polymers substantially insoluble in an aqueous medium are used, the use amount is preferably 20 wt % or less of the high boiling point organic solvent, and more preferably 10 wt % or less.

When water-base ink is manufactured by emulsifying and dispersing an oil-soluble dye and a high boiling point organic solvent, controlling the particle size is particularly important. In forming an image by ink jet, it is essential to make the average particle size of ink small in order to increase color purity and density. The average particle size is preferably 1 μm or less, and more preferably from 5 to 100 nm, in volume average particle size.

The volume average particle size and particle size distribution of dispersed particles can be easily measured according to well-known methods, e.g., a static light scattering method, a dynamic light scattering method, a centrifugal precipitation method, and the method described in *Jikken Kagaku Koza* (*Lectures on Experimental Chemistry*), 4th Ed., pp. 417 and 418. For example, it can be easily measured with a volume average particle size meter on the market (e.g., Microtrack UPA, manufactured by Nikkiso Co., Ltd.) by diluting ink with distilled water so that the particle concentration in the ink reaches from 0.1 to 1 wt %. The dynamic light scattering method making use of laser Doppler effect is especially preferably used, since it is possible to measure to the extent of small size particles.

A volume average particle size is an average particle size weighted by the volume of particles, and this is a value obtained by multiplying the diameter of each particle in the aggregation of the particles by the volume of each particle, and dividing the sum total of the thus-obtained value of each particle by the total volume of the particles. A volume average particle size is described in Soichi Muroi, *Kobunshi Latex no Kagaku* (*Chemistry of High Polymer Latex*), p. 119, published by Kobunshi Kanko-Kai.

It has been found that the presence of coarse particles has a serious influence upon printing performance. That is, discharge failure or discharge unevenness of ink is caused due to clogging of a head nozzle by coarse particles or due to the formation of fouling even if the head does not clog, which greatly influences printing performance. For preventing this state of affairs from occurring, it is important to suppress the numbers of particles having a particle size of 5 μm or more to 10 or less and a particle size of 1 μm or more to 1,000 or less in 1 μl of ink.

For removing these coarse particles, well-known centrifugal separation method and precision filtration method can be used. The separation may be performed just after emulsification and separation or may be performed after adding various additives, such as a wetting agent and a surfactant, to the emulsified and dispersed product and immediately before charging the ink in an ink cartridge.

As the effective means to obtain a small average particle size free of coarse particles, mechanical emulsifiers can be used.

As emulsifiers, well-known apparatus, e.g., a simple stirrer, an impeller, and an in-line stirring system, a milling system, e.g., a colloid mill, and an ultrasonic wave system can be used, but a high pressure homogenizer is particularly preferably used.

With respect to high pressure homogenizers, the mechanisms are disclosed in detail in U.S. Pat. No. 4,533,254 and JP-A-6-47264. As commercially available pressure homogenizers, Gaulin Homogenizer (manufactured by A. P. V. Gaulin Inc.), Microfluidizer (manufactured by Microfluidex Inc.), and Ultimizer (manufactured by Sugino Machine Co., Ltd.) are known.

Further, as is disclosed in U.S. Pat. No. 5,720,551 in recent years, a high pressure homogenizer equipped with the mechanism of effecting atomization in a superhigh pressure jet current is especially effective for the emulsification dispersion of the present invention. As an example of an emulsifier using a superhigh pressure jet current, De Bee 2000 (Bee International Ltd.) is exemplified.

The pressure in performing emulsification with a high pressure emulsifying-dispersing apparatus is 50 PMa or more, preferably 60 MPa or more, and more preferably 180 PMa or more.

It is particularly preferred to use a method of using two or more emulsifiers in combination, e.g., by the method of emulsifying ink additives with a stirring-emulsifier, and then emulsifying with a high pressure homogenizer. A method of once emulsifying ingredients with these emulsifiers, adding ingredients, such as a wetting agent and a surfactant, and then passing the ink through a high pressure homogenizer again while discharging the ink in a cartridge is also preferably used.

When a low boiling point organic solvent is used in addition to a high boiling point organic solvent, it is preferred to remove the low boiling point organic solvent from the viewpoint of the stability of an emulsified product and safety and hygiene. A variety of well-known methods can be used for removing low boiling point organic solvents in accordance with the kinds of solvents, i.e., an evaporation method, a vacuum evaporation method and an ultrafiltration method can be used. A removing process of a low boiling point organic solvent is preferably performed immediately after emulsification as soon as possible.

Manufacturing methods of inks for ink jet are disclosed in detail in JP-A-5-148436, JP-A-5-295312, JP-A-7-97541, JP-A-7-82515 and JP-A-7-118584, and these methods can be used in manufacturing the ink for use in ink set for ink jet recording of the present invention.

The ink of the present invention can contain functional ingredients for imparting a variety of functions to the ink. As the functional ingredients, e.g., a drying inhibitor for preventing clogging of ink at an ink jet port due to drying, a penetration accelerator for accelerating the penetration of ink into paper, an ultraviolet absorber, an antioxidant, a viscosity adjustor, a surface tension adjustor, a dispersant, a dispersion stabilizer, an antifungal agent, a rust preventive, a pH adjustor, a defoaming agent and a chelating agent are exemplified, and these functional ingredients can be selected arbitrarily and used each in an appropriate amount.

As the drying inhibitors which are used in the present invention, water-soluble organic solvents having a lower vapor pressure than water are preferred. The specific examples of drying inhibitors include polyhydric alcohols represented by ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerol, and trimethylolpropane, lower alkyl ethers of polyhydric alcohols, e.g., ethylene glycol monomethyl (or ethyl) ether, diethylene glycol monomethyl (or ethyl) ether, and triethylene glycol monoethyl (or butyl) ether, heterocyclic rings, e.g., 2-pyrrolidone, N-methyl-2-pyrrolidone, 1,3-dimethyl-2-imidazolidinone, and N-ethylmorpholine, sulfur-containing compounds, e.g., sulforan, dimethyl sulfoxide and 3-sulforen, polyfunctional compounds, e.g., diacetone alcohol and diethanolamine, and urea derivatives. Of these compounds, polyhydric alcohols, such as glycerol and diethylene glycol are more preferred. These drying inhibitors may be used alone or may be used in combination of two or more. Drying inhibitors are preferably used in an amount of from 10 to 50 wt % in the ink of the present invention.

As the penetration accelerators which are used in the present invention, alcohols, e.g., ethanol, isopropanol, butanol, di(tri)ethylene glycol monobutyl ether, and 1,2-hexanediol, sodium lauryl sulfate, sodium oleate, and nonionic surfactants can be used. Penetration accelerators sufficiently show their effect when the amount of from 10 to 30 wt % is contained in the ink of the present invention. The amount of penetration accelerators should be sufficient to prevent blotting of printing and print through.

As the ultraviolet absorbers which are used in the present invention to improve the storage stability of an image, the benzotriazole compounds disclosed in JP-A-58-185677, JP-A-61-190537, JP-A-2-782, JP-A-5-197075 and JP-A-9-34057, the benzophenone compounds disclosed in JP-A-46-2784, JP-A-5-194483 and U.S. Pat. No. 3,214,463, the cinnamic acid compounds disclosed in JP-B-48-30492 (the term "JP-B" as used herein means an "examined Japanese patent publication"), JP-B-56-21141 and JP-A-10-88106, the triazine compounds disclosed in JP-A-4-298503, JP-A-8-53427, JP-A-8-239368, JP-A-10-182621, and JP-T-8-8-501291 (the term "JP-T" as used herein means a published Japanese translation of a PCT patent application), the compounds described in *Research Disclosure*, No. 24239, and compounds which absorb ultraviolet rays and emit fluorescence represented by stilbene compounds and benzoxazole compounds, i.e., a so-called fluorescent brightening agent, can be used.

As the antioxidants to improve the storage stability of an image, various kinds of organic series and metal complex series discoloration inhibitors can be used in the present invention. The examples of organic discoloration inhibitors include hydroquinones, alkoxyphenols, dialkoxyphenols, phenols, anilines, amines, indanes, chromans, alkoxyanilines and heterocyclic rings, and the examples of metal complex discoloration inhibitors include nickel complex and zinc complex. More specifically, the compounds described in *Research Disclosure*, No. 17643, items VII-I to J, *ibid.*, No. 15162, *ibid.*, No. 18716, p. 650, left column, *ibid.*, No. 36544, p. 527, *ibid.*, No. 307105, p. 872, and *ibid.*, No. 15162, and the compounds represented by formulae disclosed in JP-A-62-215272, pp. 127 to 137 and the exemplified compounds thereof can be used.

As the antifungal agents which are used in the present invention, sodium dehydroacetate, sodium benzoate, sodium pyridinethione-1-oxide, ethyl p-hydroxybenzoate, 1,2-benzisothiazolin-3-one, and the salts thereof are exemplified. Antifungal agents are preferably used in an amount of from 0.02 to 5.00 wt % in the ink of the present invention.

These compounds are described in detail in *Bohkin Bohbai Zai Jiten (Thesaurus of Antibacterial and Antifungal Agents)*, compiled by Nippon Bohkin Bohbai Gakkai Thesaurus Compilation Committee.

As the rust preventives, e.g., acid sulfite, sodium thiosulfate, ammon thioglycolate, diisopropylammonium nitrite, pentaerythritol tetranitrate, dicyclohexylammonium nitrite, and benzotriazole are exemplified. Rust preventives are preferably used in an amount of from 0.02 to 5.00 wt % in the ink of the present invention.

Other than the above surfactants, nonionic, cationic or anionic surfactants are used as a surface tension adjustor. For example, as anionic surfactants, e.g., fatty acid salts, alkyl sulfate, alkylbenzene sulfonate, alkylnaphthalene sulfonate, dialkyl sulfosuccinate, alkyl phosphate, condensation products of naphthalenesulfonic acid and formalin, and polyoxyethylene alkyl sulfate, and as nonionic surfactants, e.g., polyoxyethylene alkyl ether, polyoxyethylene alkylaryl ether, polyoxyethylene fatty acid ester, sorbitan fatty acid ester, polyoxyethylene sorbitan fatty acid ester, polyoxyethylene alkylamine, glycerol fatty acid ester, and oxyethyleneoxypropylene block copolymer are exemplified. Further, SURFYNOLS (manufactured by Air Products & Chemicals), which is an acetylene-based polyoxyethylene oxide surfactant, is also preferably used. Amine oxide type ampholytic surfactants, e.g., N,N-dimethyl-N-alkylamine oxide, are also preferably used. In addition, the surfactants described in JP-A-59-157636, pp. 37 and 38, and *Research Disclosure*, No. 308119 (1989) can also be used.

The surface tension of the ink of the present invention is preferably from 20 to 60 mN/m, and more preferably from 25 to 45 mN/m, with or without using a surface tension adjustor.

The viscosity of the ink in the invention is preferably 30 mPa·s or less. Since it is preferred to adjust the viscosity 20 mPa·s or less, a viscosity adjustor is sometimes used for the purpose of adjusting the viscosity. As viscosity adjustors, e.g., celluloses, water-soluble polymers, e.g., polyvinyl alcohol, and nonionic surfactants are exemplified. Viscosity adjustors are described in detail in *Nendo Chosei Gijutsu* (*Techniques of Viscosity Adjustment*), Chapter 9, Gijutsu Joho Kyokai (1999), and *Ink Jet Printer yo Chemicals* (98 zoho)—*Zairyo no Kaihatsu Dohko•Tenbo Chosa* (*Chemicals for Ink Jet Printer* (addition of 98 new articles)—*Development Trend of Materials and Research of the View*), pp. 162 to 174, CMC Publishing Co. (1997).

In the present invention, various surfactants of the above-described cationic, anionic and nonionic compounds can be used as a dispersant and a dispersion stabilizer, and chelating agents represented by fluorine compounds, silicone compounds and EDTA can be used as a defoaming agent, if necessary.

A recording paper and a recording film used for image recording of the present invention are described below. The supports of a recording paper and a recording film comprise chemical pulp, e.g., LBKP and NBKP, mechanical pulp, e.g., GP, PGW, RMP, TMP, CTMP, CMP and CGP, and waste paper pulp, e.g., DIP. Additives, e.g., well-known pigments, a binder, a size, a fixing agent, a cationic agent, and a paper strength reinforcing agent, are mixed with pulp according to necessity. Supports manufactured by various apparatus, e.g., Fourdrinier machine and Yankee machine, can be used in the present invention. Besides these supports, synthetic paper and plastic film sheets can be used as supports. The thickness of a support is preferably from 10 to 250 µm, and weighing is preferably from 10 to 250 g/m².

A support may be directly provided with an image-receiving layer and a back coat layer to make an image-receiving material, or an image-receiving material may be produced by providing a size press and an anchor coat layer with starch and polyvinyl alcohol, and then providing an image-receiving layer and a back coat layer. A support may be subjected to smoothing treatment by a calender, e.g., a machine calender, a TG calender or a soft calender.

Paper and plastic films both surfaces of which are laminated with polyolefin (e.g., polyethylene, polystyrene, polyethylene terephthalate, polybutene and copolymers of them) are more preferably used as supports. It is preferred to add a white pigment (e.g., titanium oxide and zinc oxide) or a tinting dye (e.g., cobalt blue, ultramarine and neodymium oxide) into polyolefin.

An image-receiving layer provided on a support contains a porous material and an aqueous binder. An image-receiving layer preferably contains a pigment, and a white pigment is preferred as the pigment. The examples of white pigments include inorganic white pigments, e.g., calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide, and zinc carbonate, and organic pigments, e.g., styrene series pigments, acrylic series pigments, urea resins, and melamine resins. Porous inorganic white pigments are particularly preferred, and synthetic amorphous silica having a great pore area is preferably used. Both silicic anhydride manufactured by a dry process and silicic hydrate manufactured by a wet method can be used as synthetic amorphous silica, but it is preferred to use silicic hydrate. Pigments may be used in combination of two or more.

As the aqueous binders contained in an image-receiving layer, water-soluble high polymers, e.g., polyvinyl alcohol, silanol-modified polyvinyl alcohol, starch, cationic starch, casein, gelatin, carboxymethyl cellulose, hydroxyethyl cellulose, polyvinyl pyrrolidone, polyalkylene oxide, and polyalkylene oxide derivatives, and water-dispersible high polymers, e.g., styrene-butadiene latex and an acrylic emulsion are exemplified. These aqueous binders may be used alone or in combination of two or more. Of these binders, polyvinyl alcohol and silanol-modified polyvinyl alcohol are preferably used in the points of an adhering property to pigments and peeling resistance of an ink-receptive layer.

In addition to pigments and aqueous binders, an image-receiving layer can contain a mordant, a waterproofing agent, a light fastness improver, a gas resistance improver, a surfactant, a hardening agent and other additives.

A mordant added to an image-receiving layer is preferably immobilized. For that sake, polymer mordants are preferably used.

Polymer mordants are disclosed in JP-A-48-28325, JP-A-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834, JP-A-60-122940, JP-A-60-122941, JP-A-60-122942, JP-A-60-235134, JP-A-1-161236, U.S. Pat. Nos. 2,484,430, 2,548,564, 3,148,061, 3,309,690, 4,115,124, 4,124,386, 4,193,800, 4,273,853, 4,282,305 and 4,450,224. The materials for image-receiving layer containing the polymer mordants disclosed in JP-A-1-161236, pp. 212 to 215 are particularly preferred. When the polymer mordants disclosed in the same patent are used, an image having excellent image quality can be obtained and, further, the light fastness of the image is improved.

A waterproofing agent is effective for waterproofing of an image, and cationic resins are especially preferably used as the waterproofing agent. The examples of the cationic resins include polyamide polyamine epichlorohydrin, polyethyleneimine, polyaminesulfone, dimethyldiallylammonium chloride polymers, cationicpolyacrylamide and colloidal silica, and polyamide-polyamine epichlorohydrin is preferred among these cationic resins. These cationic resins are preferably used in an amount of from 1 to 15 wt % based on the total solid content of an ink-receiving layer, and particularly preferably from 3 to 10 wt %.

As a light fastness improver, zinc sulfate, zinc oxide, hindered amine antioxidants, and benzotriazole-based ultraviolet absorbers such as benzophenone are exemplified, and zinc sulfate is preferably used.

Surfactants function as a coating assistant, a peeling improver, a sliding improver or an antistatic agent. Surfactants are disclosed in JP-A-62-173463 and JP-A-62-183457.

Organic fluoro compounds may be used in place of surfactants. Organic fluoro compounds are preferably hydrophobic. The examples of organic fluoro compounds include fluorine surfactants, oily fluorine compounds (e.g., fluorine oil), and solid state fluorine compound resins (e.g., tetrafluoroethylene resins). Organic fluoro compounds are disclosed in JP-B-57-9053 (columns from 8 to 17), JP-A-61-20994 and JP-A-62-135826.

As the hardening agents, materials disclosed in JP-A-1-161236, p. 222.

As other additives to be added to an image-receiving layer, a pigment dispersant, a thickener, a defoaming agent, a dye, a fluorescent brightening agent, an antiseptic, a pH adjustor, a matting agent and a hardening agent are exemplified. An ink-receptive layer may comprise one layer or two layers.

A recording paper and a recording film may be provided with a back coat layer, and a white pigment, an aqueous binder and other ingredients may be added to a back coat layer.

As the white pigments which are added to a back coat layer, white inorganic pigments, e.g., light calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudoboehmite, aluminum hydroxide, alumina, lithopone, zeolite, hydrated halloysite, magnesium carbonate, and magnesium hydroxide, and white organic pigments, e.g., styrene series plastic pigments, acrylic series plastic pigments, polyethylene, microcapsules, urea resins, and melamine resins are exemplified.

As the aqueous binders to be contained in a back coat layer, water-soluble high polymers, e.g., styrene-maleate copolymers, styrene-acrylate copolymers, polyvinyl alcohol, silanol-modified polyvinyl alcohol, starch, cationic starch, casein, gelatin, carboxymethyl cellulose, hydroxyethyl cellulose and polyvinyl pyrrolidone, and water-dispersible high polymers, e.g., styrene-butadiene latices and acrylic emulsions are exemplified. As other ingredients to be added to a back coat layer, a defoaming agent, a foam inhibitor, a dye, a fluorescent brightening agent, an antiseptic, and a waterproofing agent are exemplified.

The constitutional layers of an ink jet recording paper and a recording film (including a backing layer) may contain a dispersed product of polymer fine particles. A dispersed product of polymer fine particles is used for the purpose of improving physical properties of films, e.g., the stabilization of dimension, prevention of curling, prevention of adhesion, and prevention of film cracking. Dispersed products of polymer fine particles are disclosed in JP-A-62-245258, JP-A-62-136648 and JP-A-62-110066. Cracking and curling of a layer can be prevented by adding a dispersed product of polymer fine particles having a low glass transition temperature (40° C. or lower) to a layer containing a mordant. Curing can also be prevented by adding a dispersed product of polymer fine particles having a high glass transition temperature to a backing layer.

Ink jet recording methods are not restricted and used in well-known systems, e.g., a charge control system of discharging ink by making use of electrostatic induction, a drop-on-demand system (a pressure pulse system) by making use of oscillation pressure of a piezoid, an acoustic ink jet system of converting electric signals to acoustic beams to thereby irradiate ink, and discharging the ink by making use of the pressure of radiation, and a thermal ink jet (bubble jet) system of heating ink to form bubbles, and discharging the ink by making use of the pressure generated.

Ink jet recording systems include a system of injecting ink called photo-ink having low density in a large number and in a small volume, a system of improving image quality by using a plurality of inks having substantially the same hue and different densities, and a system of using colorless and transparent ink.

In the present invention, the ink and ink set for ink jet recording, the concentrated ink composition may be used in combination with the sheet for the ink jet recroding of the present invention.

EXAMPLES

The present invention is described with reference to the examples below, but the present invention is not limited thereto.

In the examples, "parts" and "%" mean "parts by weight" and "weight %", and "average molecular weight" and "polymerization degree" mean "average molecular weight by weight" and "average polymerization degree by weight", unless otherwise indicated.

Manufacture of Support:

Wood pulp comprising 100 parts of LBKP was beaten by double disc refiner until Canadian freeness 300 ml, and 0.5 part of epoxidized behenic acid amide, 1.0 part of anionic polyacrylamide, 0.1 part of polyamide polyamine epichlorohydrin, and 0.5 part of cationic polyacrylamide were added to the pulp each in absolute dry mass ratio to the pulp, thereby base paper having a weight of 170 $g/m^2$ was made by a Fourdrinier.

For preparing the size for the surface of the above base paper, 0.04% of a fluorescent brightening agent (Whitex BB, manufactured by Sumitomo Chemical Co., Ltd.) was added to a 4% aqueous solution of polyvinyl alcohol, and the solution was impregnated into the base paper so as to reach 0.5 $g/m^2$ in terms of absolute dry mass. The base paper was dried, and then subjected to calendering treatment, thereby a substrate paper adjusted to a density of 1.05 g/ml was obtained.

After the wire side (rear side) of the obtained substrate paper was subjected to corona discharge treatment, high density polyethylene was coated on the rear side of the substrate paper with a melt extruder in a thickness of 19 μm, thereby a resin layer having a matt face was formed (hereinafter, a resin layer side is referred to as "rear side"). The resin layer of the rear side further underwent corona discharge treatment, and a dispersion solution, as an antistatic agent, which was obtained by dispersing aluminum oxide (Alumina Sol 100, manufactured by Nissan Chemical Industries, Ltd.) and silicon dioxide (Snowtex O, manufactured by Nissan Chemical Industries, Ltd.) in water in a mass ratio of 1/2 was coated thereon in a dry mass of 0.2 $g/m^2$.

Further, the felt side (front side) of the substrate on which the resin layer was not provided was subjected to corona discharge treatment, and then low density polyethylene having MFR (melt flow rate) of 3.8 and containing 10% of anatase type titanium dioxide, a trace amount of ultramarine, and 0.01% (based on polyethylene) of a fluorescent brightening agent was extruded with a melt extruder in a thickness of 29 μm to form a highly glossy thermoplastic resin layer on the front side of the substrate (hereinafter this highly glossy surface is referred to as "front side"), thereby a support was obtained.

Example 1

Preparation of Coating Solution A for Coloring Material-receiving Layer (1) Gas phase process silica fine particles, (2) ion exchange water, and (3) "PAS-M-1" in the composition shown below were mixed, and dispersed with KD-P (a polymer, manufactured by Shinmaru Enterprises Corporation) at 10,000 rpm over 20 minutes, and then a solution containing (4) polyvinyl alcohol, (5) boric acid, (6) polyoxyethylene lauryl ether, and (7) ion exchange water, each shown below, was added to the above dispersion, and the reaction mixture was further dispersed at 10,000 rpm over 20 minutes, thereby coating solution A for coloring material-receiving layer was prepared.

The ratio by weight of the silica fine particles to the water-soluble resin (PB ratio: (1)/(4)) was 4.5/1, the pH of coating solution A for coloring material-receiving layer was 3.5 of acid.

| Composition of coating solution A for coloring material-receiving layer | |
|---|---|
| (1) Gas phase process silica fine particles Leoseal QS-30 (an average primary particle size: 7 nm, manufactured by TOKUYAMA Corp.) | 10.0 parts |
| (2) Ion exchange water | 51.7 parts |
| (3) PAS-M-1 (a 60% aqueous solution, a dispersant, manufactured by Nitto Boseki Co., Ltd.) | 0.83 part |
| (4) A 8% aqueous solution of polyvinyl alcohol PVA 124 (a water-soluble resin, saponification degree: 98.5%, polymerization degree: 2,400, manufactured by KURARAY CO., LTD.) | 27.8 parts |
| (5) Boric acid (a crosslinking agent) | 0.4 part |
| (6) Polyoxyethylene lauryl ether EMULGEN 109P (a surfactant, a 10% aqueous solution, HLB value: 13.6, manufactured by Kao Corporation) | 1.2 parts |
| (7) Ion exchange water | 33.0 parts |

Preparation of Ink for Ink Jet Recording

After the front side of the above support was subjected to corona discharge treatment, the above-prepared coating solution A for a coloring material-receiving layer was coated on the front side of the support with an extrusion die coater in a coating amount of 200 ml/m² (coating process), and the coated layer was subjected to drying with a hot air dryer at 80° C. and an air speed of 3 to 8 m/sec until the solid content concentration of the coated layer became 20%. The coated layer showed constant-rate drying speed during this period of time. Immediately after that, the support was immersed in mordant solution B shown below for 30 seconds and 20 g/m² of mordant solution B was applied on the coated layer (mordant solution application process), and the coated layer further underwent drying at 80° C. for 10 minutes (drying process). Thus, ink jet recording sheet R-1 provided with a coloring material-receiving layer having a dry thickness of 32 μm of the present invention was obtained.

| Composition of mordant coating solution B | |
|---|---|
| (1) Boric acid (a crosslinking agent) | 0.65 part |
| (2) Polyallylamine PAA-10C (a 10% aqueous solution, a mordant, manufactured by Nitto Boseki Co., Ltd.) | 25 parts |
| (3) Ion exchange water | 59.7 parts |
| (4) Ammonium chloride (a surface pH adjustor) | 0.8 part |
| (5) Polyoxyethylene lauryl ether EMULGEN 109P (a surfactant, a 2% aqueous solution, HLB value: 13.6, manufactured by Kao Corporation) | 10 parts |
| (6) Megafac F1405 (a 10% aqueous solution, a fluorine surfactant, manufactured by Dainippon Chemicals and Ink Co., Ltd.) | 2.0 parts |

Ink jet recording sheets R-2 to R-8 having the same composition with R-1 respectively were prepared except for adding the additives shown in Table 25 below to R-1.

TABLE 25

| | Additive |
|---|---|
| R-1 (Comparison) | Not added |
| R-2 (Comparison) | 2.5 parts of POEP-1 to coating solution B of R-1 |
| R-3 (Comparison) | 2.5 parts of POEN-1 to coating solution B of R-1 |
| R-4 (Invention) | 2.5 parts of X-1 to coating solution B of R-1 |
| R-5 (Invention) | 2.5 parts of X-3 to coating solution B of R-1 |
| R-6 (Invention) | 2.5 parts of X-7 to coating solution B of R-1 |
| R-7 (Invention) | 2.5 parts of X-12 to coating solution B of R-1 |
| R-8 (Invention) | 2.5 parts of X-14 to coating solution B of R-1 |

POEP-1: Polyoxyethylene nonylphenyl ether (PEO chain, average 30)
POEN-1: Polyoxyethylene naphthyl ether (PEO chain, average 50)

Each of these ink jet recording sheet was charged in the paper feeder of ink jet printer PM-950C (manufactured by Epson Corporation), and a monochrome image of black was printed by using the ink set of PM-950C. Image fastness of the printed image under a high humidity condition was evaluated.

Test for Evaluation:

A print pattern consisting of four square patterns of black of 3 cm×3 cm forming two lines with a white space of 1 mm wide intervening between four square patterns was formed. After this image sample was stored at 25° C., 90% RH for 72 hours, blotting of the black dye in the white space was observed. At the same time, the density of blotting in the white space was found by scanning each image with a scanning micro-densitometer by setting the aperture of the micro-densitometer for 0.3 mmφ. The light source of the micro-densitometer for photometry was adjusted to spectral composition for measurement of visual density. The visual approximate density of the white ground to that just after printing of 0.01 or less was taken as A, from 0.01 to 0.05 as B, and 0.05 or more was taken as C.

The results obtained are shown in Table 26 below.

TABLE 26

| | Blotting of Black Dye |
|---|---|
| Genuine photographic paper PM Manufactured by Epson Corporation | C |
| R-1 (Comparison) | C |
| R-2 (Comparison) | C |
| R-3 (Comparison) | C |
| R-4 (Invention) | A |
| R-5 (Invention) | A |
| R-6 (Invention) | A |
| R-7 (Invention) | A |
| R-8 (Invention) | A |

It was known from the results in Table 26 that the examples in which the ink jet recording sheets of the present invention were used were superior to all the comparative examples in the point of blotting of black.

However, when the same experiment was performed by using the recording sheets containing 2% of a non-reacted monomer of polyallylamine mordant PAA-10C, evaluation of blotting of R-4 to R-8 was B, every one of them. From this fact the effect of the present invention was confirmed.

When the ink jet recording sheet of the present invention having a coloring material-receiving layer comprising a mordant and a tertiary or quaternary amine compound containing at least one carboxyl group is used, the ink jet-recorded image obtained hardly blots even when the image is stored under high humidity condition. Further, when images are overprinted, blotting is not induced by the overprinted ink and an excellent image quality can be maintained.

Example 3

Deionized water was added to the following ingredients to make the volume of the solution one liter, and the solution was stirred at 30 to 40° C. for one hour with heating. The solution was then filtered under reduced pressure through a microfilter having an average pore diameter of 0.25 μm, thereby Ink Solution LM-101 for light magenta was prepared.

Prescription of Light Magenta Ink LM-101:

| Solid content | |
| --- | --- |
| Magenta dye shown below (Exemplified Compound a-36) | 7.5 g/liter |
| Urea | 37 g/liter |
| Liquid ingredients | |
| Diethylene glycol (DEG) | 140 g/liter |
| Glycerol (GR) | 120 g/liter |
| Triethylene glycol monobutyl ether (TGB) | 120 g/liter |
| Triethanolamine (TEA) | 6.9 g/liter |
| Sarfinol STG (SW) | 10 g/liter |

Ink Solution M-101 for magenta was prepared by increasing the amount of magenta dye (a-36) to 23 g in the above prescription.

Prescription of Magenta Ink M-101:

| Solid content | |
| --- | --- |
| Magenta dye (a-36) | 23 g/liter |
| Urea | 37 g/liter |
| Liquid ingredients | |
| Diethylene glycol (DEG) | 140 g/liter |
| Glycerol (GR) | 120 g/liter |
| Triethylene glycol monobutyl ether (TGB) | 120 g/liter |
| Triethanolamine (TEA) | 6.9 g/liter |
| Sarfinol STG (SW) | 10 g/liter |

Inks LM-102 to 108, M-102 to 108 having the same composition with LM-101 and M-101 respectively were prepared except for adding the ingredient as shown in Table 27 below to LM-101 and M-101.

TABLE 27

| Sample No. | Additive |
| --- | --- |
| LM-101, M-101 (Comparison) | None |
| LM-102, M-102 (Comparison) | 10 g/liter of POEP-1 to LM-101 and M-101 |
| LM-103, M-103 (Comparison) | 10 g/liter of POEN-1 to LM-101 and M-101 |
| LM-104, M-104 (Invention) | 10 g/liter of X-1 to LM-101 and M-101 |
| LM-105, M-105 (Invention) | 10 g/liter of X-3 to LM-101 and M-101 |

TABLE 27-continued

| Sample No. | Additive |
| --- | --- |
| LM-106, M-106 (Invention) | 10 g/liter of X-7 to LM-101 and M-101 |
| LM-107, M-107 (Invention) | 10 g/liter of X-10 to LM-101 and M-101 |
| LM-108, M-108 (Invention) | 10 g/liter of X-14 to LM-101 and M-101 |

POEP-1: Polyoxyethylene nonylphenyl ether (PEO chain: about 30)
POEN-1: Polyoxyethylene naphthyl ether (PEO chain: about 50)

Each of these inks was charged in cartridges of magenta ink and light magenta ink of ink jet printer PM-950C (manufactured by Epson Corporation). The inks of PM-950C were used as inks of other colors, and a magenta monochrome image was printed. Ink jet paper photo-glossy paper EX (manufactured by Fuji Photo Film Co., Ltd.) was used as the image-receiving sheet, on which an image was printed and image fastness under a high humidity condition was evaluated.

Experiment for Evaluation:

A print pattern consisting of four square patterns (reversal image) of magenta of 3 cm×3 cm forming two lines with a white space of 1 mm wide intervening between four square patterns crossing at right angles was formed. After this image sample was stored at 25° C., 90% RH for 72 hours, blotting of the magenta dye in the white space was observed. At the same time, the density of blotting (reflection density by status A green filter light) in the white space was found by scanning with a scanning micro-densitometer by setting the aperture of the micro-densitometer for 0.3 mmφ. The magenta density increase in the white space immediately after printing of 0.01 or less was taken as A, from 0.01 to 0.05 as B, and 0.05 or more was taken as C.

The results obtained are shown in Table 28 below.

TABLE 28

| Sample No. | Blotting of M |
| --- | --- |
| Genuine Ink PM-950C (manufac-tured by Epson Corporation) | B |
| LM-101, M-101 (Comparison) | C |
| LM-102, M-102 (Comparison) | C |
| LM-103, M-103 (Comparison) | C |
| LM-104, M-104 (Invention) | A |
| LM-105, M-105 (Invention) | A |
| LM-106, M-106 (Invention) | A |
| LM-107, M-107 (Invention) | A |
| LM-108, M-108 (Invention) | A |

From the results in Table 28, it was found that the samples in which the ink sets of the present invention were used were superior to all the comparative samples in the point of blotting of magenta. In visual evaluation, too, blotting was not observed in every image of the invention, and it was confirmed that the samples of the invention showed excellent hue.

Example 4

Deionized water was added to the following ingredients to make the volume of the solution one liter, and the solution was stirred at 30 to 40° C. for one hour with heating. The solution was then filtered under reduced pressure through a microfilter having an average pore diameter of 0.25 μm, thereby Ink Solution LC-101 for light cyan was prepared.

Prescription of Light Cyan Ink LC-101:

| Solid content | |
|---|---|
| Cyan dye (Exemplified Compound 154) | 17.5 g/liter |
| Proxel | 3.5 g/liter |
| (2-benzisothiazolin-3-one) | |
| Liquid ingredients | |
| Diethylene glycol | 150 g/liter |
| Glycerol | 130 g/liter |
| Triethylene glycol monobutyl ether | 130 g/liter |
| Triethanolamine | 6.9 g/liter |
| Sarfinol STG (SW: nonionic surfactant) | 10 g/liter |

Ink Solution C-101 for cyan was prepared by increasing the amount of cyan dye (Exemplified Compound 154) to 68 g in the above prescription.

Prescription of Cyan Ink C-101:

| Solid content | |
|---|---|
| Cyan dye (Exemplified Compound 154) | 68 g/liter |
| Proxel | 3.5 g/liter |
| (2-benzisothiazolin-3-one) | |
| Liquid ingredients | |
| Diethylene glycol | 150 g/liter |
| Glycerol | 130 g/liter |
| Triethylene glycol monobutyl ether | 130 g/liter |
| Triethanolamine | 6.9 g/liter |
| Sarfinol STG | 10 g/liter |

Inks LC-102 to 108, C-102 to 108 having the same composition with LC-101 and C-101 respectively were prepared except for adding the ingredient as shown in Table 29 below to LC-101 and C-101.

TABLE 29

| Sample No. | Additive |
|---|---|
| LC-101, C-101 (Comparison) | None |
| LC-102, C-102 (Comparison) | 10 g/liter of POEP-1 to LC-101 and C-101 |
| LC-103, C-103 (Comparison) | 10 g/liter of POEN-1 to LC-101 and C-101 |
| LC-104, C-104 (Invention) | 10 g/liter of X-1 to LC-101 and C-101 |
| LC-105, C-105 (Invention) | 10 g/liter of X-4 to LC-101 and C-101 |
| LC-106, C-106 (Invention) | 10 g/liter of X-8 to LC-101 and C-101 |
| LC-107, C-107 (Invention) | 10 g/liter of X-11 to LC-101 and C-101 |
| LC-108, C-108 (Invention) | 10 g/liter of X-13 to LC-101 and C-101 |

POEP-1: Polyoxyethylene nonylphenyl ether (PEO chain: about 30)
POEN-1: Polyoxyethylene naphthyl ether (PEO chain: about 50)

Each of these inks was charged in cartridges of cyan ink and light cyan ink of ink jet printer PM-950C (manufactured by Epson Corporation), and evaluation was performed according to the same experimental method and evaluation criteria as in Example 3. Status A red filter light was used in the measurement of density.

The results obtained are shown in Table 30 below.

TABLE 30

| Sample No. | Blotting of C |
|---|---|
| Genuine Ink PM-950C (manufac-tured by Epson Corporation) | B |
| LC-101, C-101 (Comparison) | C |
| LC-102, C-102 (Comparison) | C |
| LC-103, C-103 (Comparison) | C |
| LC-104, C-104 (Invention) | A |
| LC-105, C-105 (Invention) | A |
| LC-106, C-106 (Invention) | A |
| LC-107, C-107 (Invention) | A |
| LC-108, C-108 (Invention) | A |

From the results in Table 30, it was found that the samples in which the ink sets of the present invention were used were superior to all the comparative samples in the point of blotting of cyan. That is, it was shown that when the ink sets of the present invention were used, not only the blotting of the ink itself recorded on the image-receiving sheet was prevented as shown in Example 1, but also the cyan and light cyan inks on the image-receiving sheet effectively inhibited the action of inducing blotting by the overprinted ink as shown in Example 2. In visual evaluation, too, blotting was not observed in every image of the invention, and it was confirmed that the samples of the invention showed excellent hue.

The ink jet recording image formed by the ink jet ink of the invention comprising a dye, water, a water-soluble organic solvent and a carboxyl group-containing tertiary or quaternary amine compound represented by formula (1) hardly generates blotting even under high humidity condition, blotting by the overprinted ink is not induced when overprinted, and excellent image quality can be maintained.

The entire disclosure of each and every foreign patent application: Japanese Patent Application Nos. 2002-269170 and 2002-269171, from which the benefit of foreign priority has been claimed in the present application is incorporated herein by reference, as if fully set forth.

What is claimed is:
1. A sheet for ink jet recording, comprising:
a support; and
a coloring material-receiving layer containing a mordant and a compound represented by the following formula (1):

$$(R_k)_p\text{—N-}[(L_m\text{-}(COOM_n)_q]_r \qquad (1)$$

wherein R represents an alkyl group, an aryl group or a heterocyclic group; when a plural number of R's are present, the plurality of R's may be the same or different; at least two of a plurality of R's may be linked with each other to form a cyclic structure; L represents a divalent or higher linking group; M represents a hydrogen atom, an alkali metal cation, an ammonium ion, an organic amine cation, or a negative ion sign; q and r each represents an integer of 1 or more; k and m each represents 0 or an integer of 1 or more; n represents an integer of 1 or more; p represents 0 or an integer of 1 or more; (p+r) is 3 or 4, and when (p+r) is 4, the N atom represents a quaternary ammonium cation and one of the M's represents a negative ion sign;
wherein the coloring material-receiving layer further contains a water-soluble resin and fine particles;

wherein the compound represented by the formula (1) is a compound represented by the following formula (2):

$$R\text{—}N\text{-}(L\text{-}COOM)_2 \qquad (2)$$

wherein R, L and M each has the same meaning as in formula (1);

wherein the coloring material-receiving layer has a porous structure; and wherein the solid content of the fine particles in the coloring material-receiving layer is 60 wt % or more.

2. The sheet for ink jet recording as claimed in claim 1, wherein at least one of R and L in the formula (2) contains a hydrocarbon group having 8 or more carbon atoms.

3. The sheet for ink jet recording as claimed in claim 1, wherein the water-soluble resin is at least one resin selected from the group consisting of polyvinyl alcohol resins, cellulose resins, resins having an ether bond, resins having a carbamoyl group, resins having a carboxyl group, and gelatins.

4. The sheet for ink jet recording as claimed in claim 1, wherein the fine particles comprise at least one fine particle selected from the group consisting of silica, colloidal silica, alumina and pseudo-boehmite.

5. The sheet for ink jet recording as claimed in claim 1, wherein the coloring material-receiving layer further contains a crosslinking agent capable of crosslinking the water-soluble resin.

6. The sheet for ink jet recording as claimed in claim 5, wherein the crosslinking agent is a boron compound.

7. The sheet for ink jet recording as claimed in claim 1, wherein the coloring material-receiving layer is a layer obtained by crosslinking a coated layer of a coating solution containing the fine particles, the water-soluble resin and a crosslinking agent, and the crosslinking is performed by applying a basic solution having a pH value of 8 or more to the coated layer, in which the application of the basic solution is performed (1) simultaneously with the coating of the above coating solution, or (2) in the middle of a drying of the coated layer of the coating solution and before the coated layer shows falling-rate-drying.

8. An ink jet recording method which comprises recording an image by using the sheet for ink jet recording as claimed in claim 1.

9. The sheet for ink jet recording as claimed in claim 1, wherein the content of the water-soluble resin is from 9 to 40 wt % based on the total solid content weight of the coloring material-receiving layer.

10. The sheet for ink jet recording as claimed in claim 1, wherein the ratio by weight of the fine particles to the water-soluble resin in the coloring material-receiving layer is from 1.5/1 to 10/1.

* * * * *